US012795606B2

(12) United States Patent
Zhou et al.

(10) Patent No.: US 12,795,606 B2
(45) **Date of Patent: *Nov. 10, 2026**

(54) SEARCH SPACES FOR INITIAL BANDWIDTH PARTS FOR REDUCED CAPABILITY WIRELESS DEVICES

(71) Applicant: Ofinno, LLC, Reston, VA (US)

(72) Inventors: Hua Zhou, Vienna, VA (US); Yunjung Yi, Vienna, VA (US); Esmael Hejazi Dinan, McLean, VA (US); Ali Cagatay Cirik, Chantilly, VA (US); Hyoungsuk Jeon, Centreville, VA (US); Nazanin Rastegardoost, McLean, VA (US)

(73) Assignee: Ofinno, LLC, Reston, VA (US)

( * ) Notice: Subject to any disclaimer, the term of this patent is extended or adjusted under 35 U.S.C. 154(b) by 192 days.

This patent is subject to a terminal disclaimer.

(21) Appl. No.: 18/615,818

(22) Filed: Mar. 25, 2024

(65) Prior Publication Data

US 2024/0236947 A1 Jul. 11, 2024

Related U.S. Application Data

(63) Continuation of application No. 18/238,237, filed on Aug. 25, 2023, now Pat. No. 11,943,742, which is a (Continued)

(51) Int. Cl.
*H04W 68/02* (2009.01)
*H04L 5/00* (2006.01)
(Continued)

(52) U.S. Cl.
CPC ............ *H04W 68/02* (2013.01); *H04L 5/001* (2013.01); *H04W 72/232* (2023.01);
(Continued)

(58) Field of Classification Search
CPC ... H04W 68/02; H04W 72/232; H04W 76/20; H04L 5/0048; H04L 5/0051; H04L 5/001; H04L 5/0053; Y02D 30/70
See application file for complete search history.

(56) References Cited

U.S. PATENT DOCUMENTS

2019/0159165 A1 5/2019 Agiwal et al.
2019/0223086 A1 7/2019 Jung et al.
(Continued)

FOREIGN PATENT DOCUMENTS

CN 110831125 A 2/2020
CN 110944341 A 3/2020
(Continued)

OTHER PUBLICATIONS

Chinese Office Action mailed Feb. 22, 2025 in CN Patent Application No. 2022800341808.
(Continued)

*Primary Examiner* — Ovidio Escalante
(74) *Attorney, Agent, or Firm* — Patrick Moon; Kavon Nasabzadeh; Jacob L. Mangan

(57) ABSTRACT

A method may include receiving, by a wireless device, radio resource control (RRC) messages that include configuration parameters indicating a first search space (SS), for receiving a paging early indication (PEI), on a first initial bandwidth part (BWP) of a cell. The parameters also include a second SS, for receiving the PEI, on a second initial BWP of the cell. A reduced capability (RedCap) wireless device type may use the second initial BWP rather than using the first initial BWP for receiving the PEI. The method may also include monitoring, based on the wireless device being the RedCap wireless device type, the second SS on the second initial BWP for receiving a first PEI. The method may further include receiving, based on receiving the first PEI
(Continued)

and via the second initial BWP, a downlink control information scheduling a paging message.

20 Claims, 36 Drawing Sheets

Related U.S. Application Data continuation of application No. PCT/US2022/028547, filed on May 10, 2022.

(60) Provisional application No. 63/186,486, filed on May 10, 2021.

(51) Int. Cl.
*H04W 72/232* (2023.01)
*H04W 76/20* (2018.01)

(52) U.S. Cl.
CPC ........... *H04W 76/20* (2018.01); *H04L 5/0048* (2013.01); *H04L 5/0051* (2013.01); *H04L 5/0053* (2013.01); *Y02D 30/70* (2020.08)

(56) References Cited

U.S. PATENT DOCUMENTS

| | | | | |
|---|---|---|---|---|
| 2020/0100209 | A1* | 3/2020 | Lin | H04J 3/02 |
| 2021/0168738 | A1 | 6/2021 | Shih et al. | |
| 2021/0345308 | A1* | 11/2021 | Liu | H04L 5/0053 |
| 2021/0410106 | A1 | 12/2021 | Wang et al. | |
| 2022/0046585 | A1* | 2/2022 | Wu | H04L 5/0094 |
| 2022/0116911 | A1 | 4/2022 | Lee et al. | |
| 2023/0133097 | A1 | 5/2023 | Xu et al. | |
| 2023/0155873 | A1* | 5/2023 | Yao | H04L 5/0053 370/329 |
| 2024/0172272 | A1* | 5/2024 | Xiong | H04L 1/189 |

FOREIGN PATENT DOCUMENTS

| | | | |
|---|---|---|---|
| CN | 111567126 | A | 8/2020 |
| CN | 111699731 | A | 9/2020 |
| CN | 112771950 | A | 5/2021 |
| WO | 2021/180206 | A1 | 9/2021 |
| WO | 2021/238993 | A1 | 12/2021 |
| WO | 2022/151365 | A1 | 7/2022 |
| WO | 2022/207180 | A1 | 10/2022 |
| WO | 2022/212133 | A1 | 10/2022 |

OTHER PUBLICATIONS

3GPP TS 36.331 V16.3.0 (Dec. 2020); Technical Specification; 3rd Generation Partnership Project; Technical Specification Group Radio Access Network; Evolved Universal Terrestrial Radio Access (E-UTRA); Radio Resource Control (RRC); Protocol specification; (Release 16).
3GPP TS 38.212 V16.4.0 (Dec. 2020); Technical Specification; 3rd Generation Partnership Project; Technical Specification Group Radio Access Network; NR; Multiplexing and channel coding; (Release 16).
3GPP TS 38.213 V16.4.0 (Dec. 2020); Technical Specification; 3rd Generation Partnership Project; Technical Specification Group Radio Access Network; NR; Physical layer procedures for control (Release 16).
3GPP TS 38.214 V16.4.0 (Dec. 2020); Technical Specification; 3rd Generation Partnership Project; Technical Specification Group Radio Access Network; NR; Physical layer procedures for data; (Release 16).
3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).
3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).
3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).
R1-2102316; 3GPP TSG RAN WG1 Meeting #104bis-e; E-meeting, Apr. 12-20, 2021; Agenda Item: 8.7.1.1; Source: Huawei, Hiilicon; Title: Paging enhancements for UE power saving in Idle/inactive mode; Document for: Discussion and Decision.
R1-2102405; 3GPP TSG RAN WG1 #104b-e; e-Meeting, Apr. 12-20, 2021; Source: OPPO; Title: Further discussion on Paging enhancements for power saving; Agenda Item: 8.7.1.1; Document for: Discussion.
R1-2102461; 3GPP TSG RAN WG1 #104b-e; e-Meeting, Apr. 12-20, 2021; Agenda Item: 8.6.1.2; Source: Spreadtrum Communications; Title: Discussion on aspects related to reduced No. of Rx branches; Document for: Discussion and decision.
R1-2102463; 3GPP TSG RAN WG1 #104b-e; e-Meeting, Apr. 12-20, 2021; Agenda Item: 8.7.1.1; Source: Spreadtrum Communications; Title: Discussion on potential paging enhancements; Document for: Discussion and decision.
R1-2102532; 3GPP TSG RAN WG1 #104b-e; e-Meeting, Apr. 12-20, 2021; Source: vivo; Title: Paging enhancements for idle/inactive mode UE power saving; Agenda Item: 8.7.1.1; Document for: Discussion and Decision.
R1-2102565; 3GPP TSG RAN WG1 #104bis-e;e-Meeting, Apr. 12-Apr. 20, 2021; Source: ZTE, Sanechips; Title: Discussion on power saving enhancements for paging; Agenda item: 8.7.1.1; Document for: Discussion and decision.
R1-2102641; 3GPP TSG RAN WG1 #104b-e; e-Meeting, Apr. 12-20, 2021; Source: CATT; Title: Paging enhancement for UE power saving; Agenda Item: 8.7.1.1; Document for: Discussion and Decision.
R1-2102681; 3GPP TSG RAN WG1 #104-bis-e; e-Meeting, Apr. 12-Apr. 20, 2021; Agenda Item: 8.7.1.1; Source: MediaTek Inc.; Title: On Paging Enhancements for Idle/Inactive Mode UE Power Saving; Document for: Discussion and Decision.
R1-2102805; 3GPP TSG RAN WG1 Meeting #104-e; e-Meeting , Apr. 12-20, 2021; Agenda item: 8.7.1.1; Source: Panasonic; Title: On Paging Enhancement; Document for: Discussion/Decision.
R1-2102890; 3GPP TSG RAN WG1 #104b-e; e-Meeting, Apr. 12-20, 2021; Source: CMCC; Title: Discussion on reduced number of Rx branches; Agenda item: 8.6.1.2; Document for: Discussion & Decision.
R1-2102892; 3GPP TSG RAN WG1 #104b-e; e-Meeting, Apr. 12-20, 2021; Source: CMCC; Title: Discussion on paging early indication design; Agenda item: 8.7.1.1; Document for: Discussion & Decision.
R1-2102989; 3GPP TSG RAN WG1 #104b-e; e-Meeting, Apr. 12-20, 2021; Source: Xiaomi; Title: Aspects on reduced number of Rx branches; Agenda item: 8.6.1.2; Document for: Discussion.
R1-2103039; 3GPP TSG RAN WG1 Meeting #104bis-E; e-Meeting, Apr. 12-20, 2021; Source: Intel Corporation; Title: On reduced number of Rx branches for RedCap devices; Agenda item: 8.6.1.2; Document for: Discussion and Decision.
R1-2103115; 3GPP TSG RAN WG1 #104bis-e; e-Meeting, Apr. 12-Apr. 20, 2021; Agenda Item: 8.7.1.1; Source: Apple Inc.; Title: Paging early indication for idle/inactive-mode UE; Document for: Discussion/Decision.
R1-2103175; 3GPP TSG-RAN WG1 Meeting #104b; e-Meeting, Apr. 12-20, 2021; Agenda item: 8.6.1.2; Source: Qualcomm Incorporated; Title: RX Branch Reduction for RedCap UE; Document for: Discussion/Decision.
R1-2103177; 3GPP TSG-RAN WG1 #104-bis-e; e-Meeting, Apr. 12-20, 2021; Agenda item: 8.7.1.1; Source: Qualcomm Incorporated; Title: Paging enhancements for idle/inactive UE power saving; Document for: Discussion/ Decision.
R1-2103247; 3GPP TSG RAN WG1 #104b-e; e-Meeting, Apr. 12-Apr. 20, 2021; Agenda Item: 8.6.1.2; Source: Samsung; Title:

(56) References Cited

OTHER PUBLICATIONS

Discussion on reduced number of RX branches for RedCap UEs; Document for: Discussion and decision.
R1-2103249; 3GPP TSG RAN WG1 #104b-e; e-Meeting, Apr. 12-Apr. 20, 2021; Agenda Item: 8.7.1.1; Source: Samsung; Title: Discussion on paging enhancements; Document for: Discussion and decision.
R1-2103310; 3GPP TSG RAN WG1 #104-bis-e; e-Meeting, Apr. 12-Apr. 20, 2021; Source: Sony; Title: Discussion on potential paging enhancements; Agenda Item: 8.7.1.1; Document for: Discussion.
R1-2103355; 3GPP TSG RAN WG1 #104b-e; e-Meeting, Apr. 12-Apr. 20, 2021; Agenda Item: 8.7.1.1; Source: LG Electronics; Title: Discussion on potential paging enhancements; Document for: Discussion and decision.
R1-2103586; 3GPP TSG RAN WG1 #104b-e; e-Meeting, Apr. 12-20, 2021; Source: NTT Docomo, Inc .; Title: Discussion on paging enhancements; Agenda Item: 8.7.1.1; Document for: Discussion and decision.
R1-2103614; 3GPP TSG RAN WG1 Meeting #104bis-e; e-Meeting, Apr. 12-Apr. 20, 2021; Agenda item: 8.7.1.1; Source: Lenovo, Motorola Mobility; Title: Paging enhancement for UE power saving; Document for: Discussion and Decision.
R1-2103642; 3GPP TSG RAN WG1 #104bis-eTdoc; e-Meeting, Apr. 12-Apr. 20, 2021; Agenda Item: 8.7.1.1; Source: Ericsson; Title: Design of Paging Enhancements; Document for: Discussion and Decision.
R1-2103653; 3GPP TSG RAN WG1 #104b; e-Meeting, Apr. 12-Apr. 24, 2020; Agenda item: 8.7.1.1; Source: Nordic Semiconductor ASA; Title: On paging early indication; Document for: Discussion and Decision.
R1-2103768; 3GPP TSG RAN WG1 #104b; e-Meeting, Apr. 12-20, 2021; Agenda item: 8.7.1.1; Source: Xiaomi; Title: Paging enhancements for power saving; Document for: Discussion.
ETSI TS 138 304 V15.4.0 (Jul. 2019); Technical Specification; 5G; NR; User Equipment (UE) procedures in idle mode and in RRC; Inactive state; (3GPP TS 38.304 version 15.4.0 Release 15).
International Search Report and Written Opinion of the International Searching authority mailed Dec. 19, 2022, in International Application No. PCT/US2022/028547.
R1-2101052; 3GPP TSG RAN WGI #104-e; e-Meeting, Jan. 25-Feb. 5, 2021; Source: CMCC; Title: Discussion on paging early indication design; Agenda item: 8.7.1.1; Document for: Discussion & Decision.

* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 23

```
MIB ::=                       SEQUENCE {
    systemFrameNumber             BIT STRING (SIZE (6)),
    subCarrierSpacingCommon       ENUMERATED {scs15or60, scs30or120},
    ssb-SubcarrierOffset          INTEGER (0..15),
    dmrs-TypeA-Position           ENUMERATED {pos2, pos3},
    pdcch-ConfigSIB1              PDCCH-ConfigSIB1,
    cellBarred                    ENUMERATED {barred, notBarred},
    intraFreqReselection          ENUMERATED {allowed, notAllowed},
    spare                         BIT STRING (SIZE (1))}

PDCCH-ConfigSIB1 ::=          SEQUENCE {
    controlResourceSetZero        ControlResourceSetZero,
    searchSpaceZero               SearchSpaceZero}
```

FIG. 24A

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | *O* | Number of search space sets per slot | *M* | First symbol index |
|---|---|---|---|---|
| 0 | 0 | 1 | 1 | 0 |
| 1 | 0 | 2 | 1/2 | {0, if *i* is even}, {*N*, if is odd} |
| 2 | 2 | 1 | 1 | 0 |
| 3 | 2 | 2 | 1/2 | {0, if *i* is even}, {*N*, if *i* is odd} |
| 4 | 5 | 1 | 1 | 0 |
| 5 | 5 | 2 | 1/2 | {0, if *i* is even}, *N*, if *i* is odd |
| 6 | 7 | 1 | 1 | 0 |
| 7 | 7 | 2 | 1/2 | {0, if *i* is even}, {*N*, if *i* is odd} |
| ... | ... | ... | ... | ... |

FIG. 24C

```
SIB1 ::=        SEQUENCE {
   cellSelectionInfo              SEQUENCE {
      q-RxLevMin                     Q-RxLevMin,
      q-RxLevMinOffset                 INTEGER (1..8) ...}
   cellAccessRelatedInfo           CellAccessRelatedInfo,
   connEstFailureControl           ConnEstFailureControl
   si-SchedulingInfo              SI-SchedulingInfo
   servingCellConfigCommon           ServingCellConfigCommonSIB
   ims-EmergencySupport            ENUMERATED {true}
   eCallOverIMS-Support            ENUMERATED {true}
   ue-TimersAndConstants            UE-TimersAndConstants
   uac-BarringInfo                SEQUENCE { ...}
   useFullResumeID                 ENUMERATED {true}
   lateNonCriticalExtension         OCTET STRING
   nonCriticalExtension            SIB1-v16xy-IEs  }

ServingCellConfigCommonSIB ::=     SEQUENCE {
   downlinkConfigCommon             DownlinkConfigCommonSIB,
   uplinkConfigCommon              UplinkConfigCommonSIB
   supplementaryUplink             UplinkConfigCommonSIB
   n-TimingAdvanceOffset            ENUMERATED { n0, n25600, n39936 }
   ssb-PositionsInBurst           SEQUENCE {
      inOneGroup                  BIT STRING (SIZE (8)),
      groupPresence                 BIT STRING (SIZE (8)) },
   ssb-PeriodicityServingCell       ENUMERATED {ms5, ms10, ms20, ms40, ms80, ms160},
   tdd-UL-DL-ConfigurationCommon      TDD-UL-DL-ConfigCommon
   ss-PBCH-BlockPower                INTEGER (-60..50),
   ...,}

DownlinkConfigCommonSIB ::=    SEQUENCE {
   frequencyInfoDL              FrequencyInfoDL-SIB,
   initialDownlinkBWP            BWP-DownlinkCommon,
   bcch-Config                  BCCH-Config,
   pcch-Config                  PCCH-Config,  ...}

PCCH-Config ::=          SEQUENCE {
   defaultPagingCycle              PagingCycle,
   nAndPagingFrameOffset              CHOICE {
      oneT                        NULL,
      halfT                      INTEGER (0..1), ...},
   ns                      ENUMERATED {four, two, one},
   firstPDCCH-MonitoringOccasionOfPO   CHOICE {
      sCS15KHZoneT       SEQUENCE (SIZE (1..maxPO-perPF)) OF INTEGER (0..139),...}
   ...,
   [[   nrofPDCCH-MonitoringOccasionPerSSB-InPO-r16  INTEGER (2..4)  ]]
}
```

FIG. 25

```
BWP-DownlinkCommon ::=          SEQUENCE {
   genericParameters            BWP,
   pdcch-ConfigCommon              SetupRelease { PDCCH-ConfigCommon }
   pdsch-ConfigCommon              SetupRelease { PDSCH-ConfigCommon }
   ...
}


PDCCH-ConfigCommon ::=          SEQUENCE {
   controlResourceSetZero          ControlResourceSetZero
   commonControlResourceSet           ControlResourceSet
   searchSpaceZero              SearchSpaceZero
   commonSearchSpaceList            SEQUENCE (SIZE(1..4)) OF SearchSpace
   searchSpaceSIB1              SearchSpaceId
   searchSpaceOtherSystemInformation   SearchSpaceId
   pagingSearchSpace              SearchSpaceId
   ra-SearchSpace              SearchSpaceId
    [[
   firstPDCCH-MonitoringOccasionOfPO   CHOICE {
      sCS15KHZoneT    SEQUENCE (SIZE (1..maxPO-perPF)) OF INTEGER (0..139),
      ...
   }OPTIONAL   -- Cond OtherBWP
    ]]
   ...,}


ControlResourceSet ::=          SEQUENCE {
   controlResourceSetId           ControlResourceSetId,
   frequencyDomainResources          BIT STRING (SIZE (45)),
   duration                INTEGER (1..maxCoReSetDuration),
   cce-REG-MappingType            CHOICE {
      interleaved              SEQUENCE {
         reg-BundleSize              ENUMERATED {n2, n3, n6},
         interleaverSize            ENUMERATED {n2, n3, n6},
         shiftIndex            INTEGER(0..maxNrofPhysicalResourceBlocks-1)},
      nonInterleaved            NULL},
   precoderGranularity          ENUMERATED {sameAsREG-bundle, allContiguousRBs},
   pdcch-DMRS-ScramblingID             INTEGER (0..65535)
   ...,
  }
```

FIG. 26

```
SearchSpace ::=                       SEQUENCE {
   searchSpaceId                        SearchSpaceId,
   controlResourceSetId                    ControlResourceSetId
   monitoringSlotPeriodicityAndOffset     CHOICE {
      sl1                             NULL,
      sl2                             INTEGER (0..1),...}
   duration                          INTEGER (2..2559)
   monitoringSymbolsWithinSlot           BIT STRING (SIZE (14))
   nrofCandidates                     SEQUENCE {
      aggregationLevel1                   ENUMERATED {n0, n1, n2, ... n8},
      aggregationLevel2                   ENUMERATED {n0, n1, n2, ... n8},
      ...}
   searchSpaceType                      CHOICE {
      common                          SEQUENCE {
         dci-Format0-0-AndFormat1-0           SEQUENCE {...}
         dci-Format2-0                     SEQUENCE {
            nrofCandidates-SFI                SEQUENCE {
               aggregationLevel1                ENUMERATED {n1, n2}
               aggregationLevel2                ENUMERATED {n1, n2}...},
            ...}
         dci-Format2-1                     SEQUENCE {...}
...
      },
      ue-Specific                          SEQUENCE {
         dci-Formats      ENUMERATED {formats0-0-And-1-0, formats0-1-And-1-1},
         ...,}
   }
 }
```

FIG. 27

| | UE with Reduced Capability (RedCap) | UE with Normal Capability (Non-RedCap) |
|---|---|---|
| Number of Antenna | 1 | 2 or 4 |
| Bandwidth | 20MHz for FR1; 50MHz for FR2 | 100MHz for FR 1; 200MHz for FR2 |
| MIMO Layers | 1~2 layers | 2~4 layers |
| PDSCH/PUSCH processing time | 16~20 symbols | 8~10 symbols |
| FDD mode | Half Duplex FDD | Full Duplex FDD |
| ... | ... | ... |

FIG. 31

SEARCH SPACES FOR INITIAL BANDWIDTH PARTS FOR REDUCED CAPABILITY WIRELESS DEVICES

CROSS-REFERENCE TO RELATED APPLICATIONS

This application is a continuation of U.S. application Ser. No. 18/238,237, filed Aug. 25, 2023, which is a continuation of International Application No. PCT/US2022/028547, filed May 10, 2022, which claims the benefit of U.S. Provisional Application No. 63/186,486, filed May 10, 2021, all of which are hereby incorporated by reference in their entireties.

BRIEF DESCRIPTION OF THE DRAWINGS

Examples of several of the various embodiments of the present disclosure are described herein with reference to the drawings.

FIG. 19 illustrates an example of multiple LCIDs of downlink.

FIG. 20 illustrates an example of multiple LCIDs of uplink.

FIG. 23 illustrates examples of various DCI formats.

FIG. 24A illustrates an example MIB message.

FIG. 24B illustrates an example configuration of CORESET 0.

FIG. 24C illustrates an example configuration of search space 0.

FIG. 25 illustrates an example SIB1 message.

FIG. 26 illustrates an example of RRC configurations of a BWP, PDCCH, and a CORESET.

FIG. 27 illustrates an example of RRC configuration of a search space.

FIG. 31 illustrates an example chart comparing characteristics and capabilities of a RedCap wireless device with a non-RedCap wireless device, according to some embodiments.

DETAILED DESCRIPTION

Figure 1A:
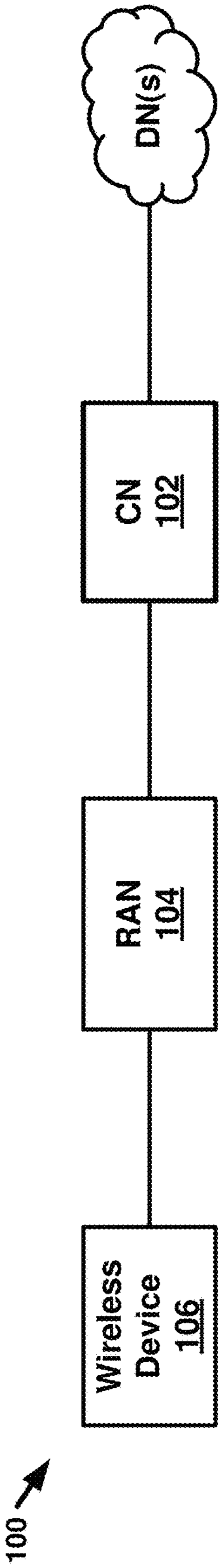
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprisc at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
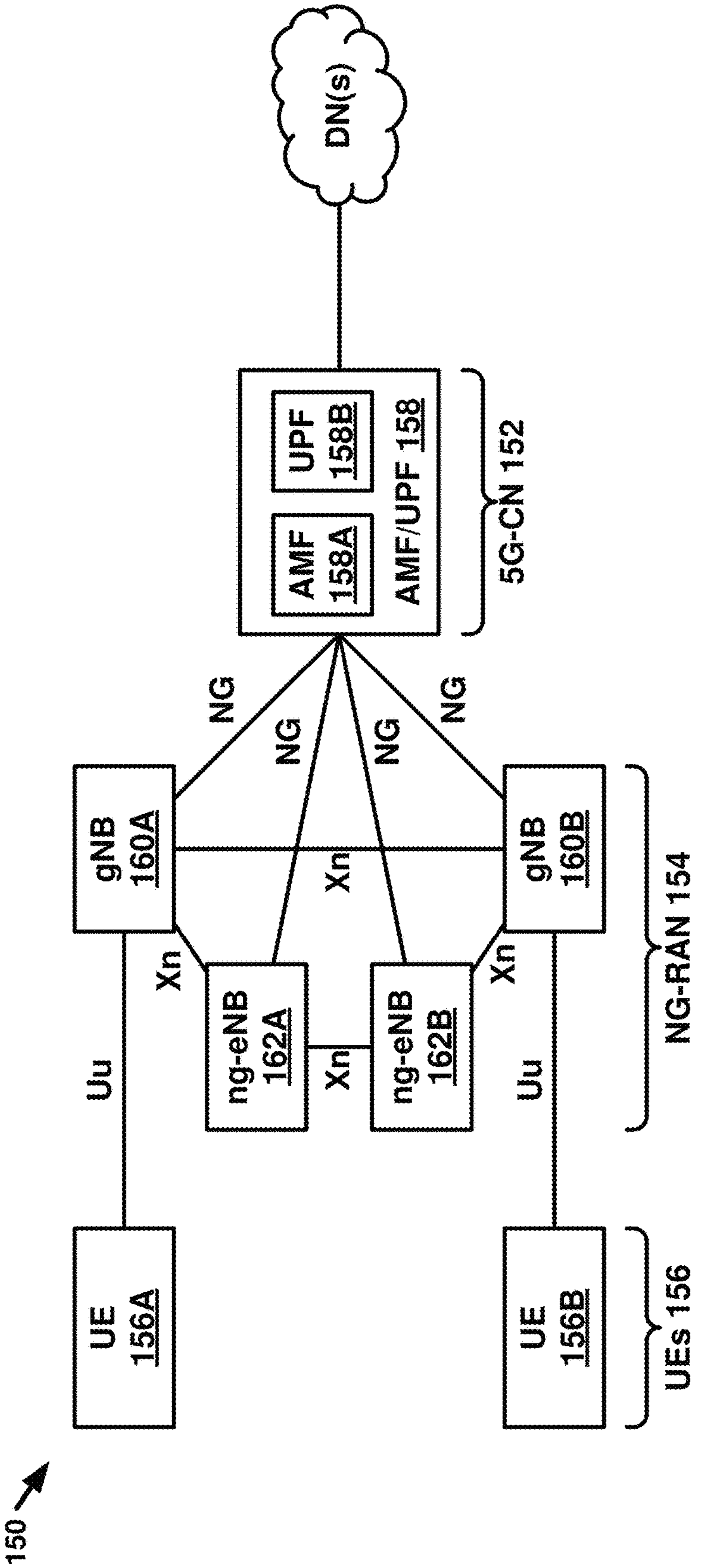

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for case of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
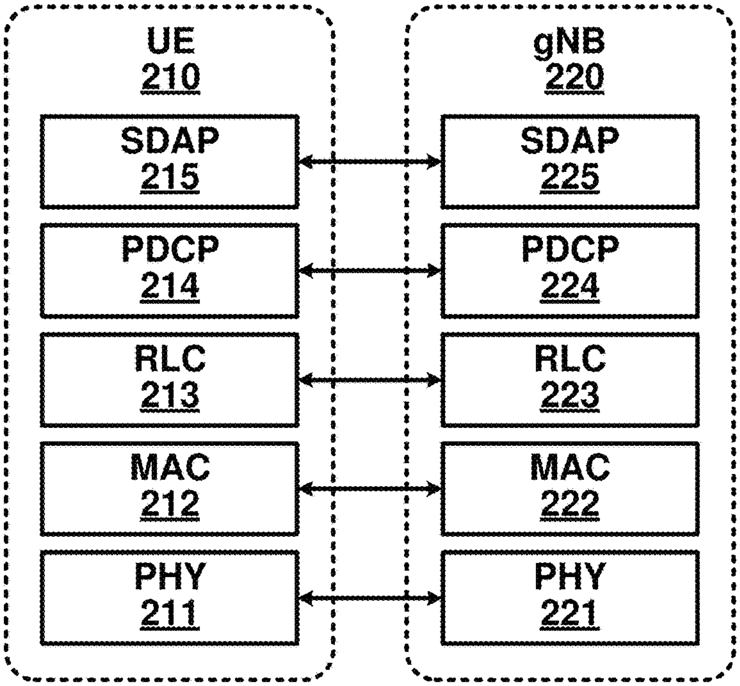
FIG. 2A and FIG. 2B respectively illustrate a New Radio (NR) user plane and control plane protocol stack.
Figure 2B:
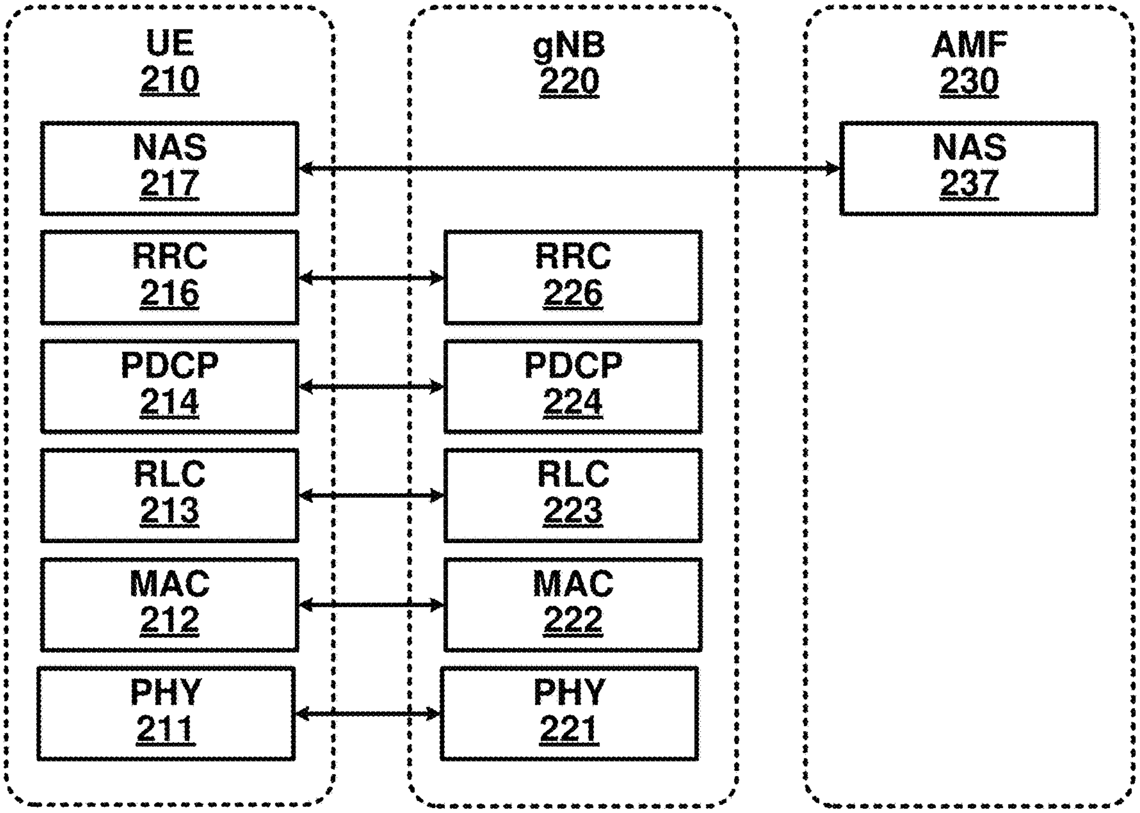

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
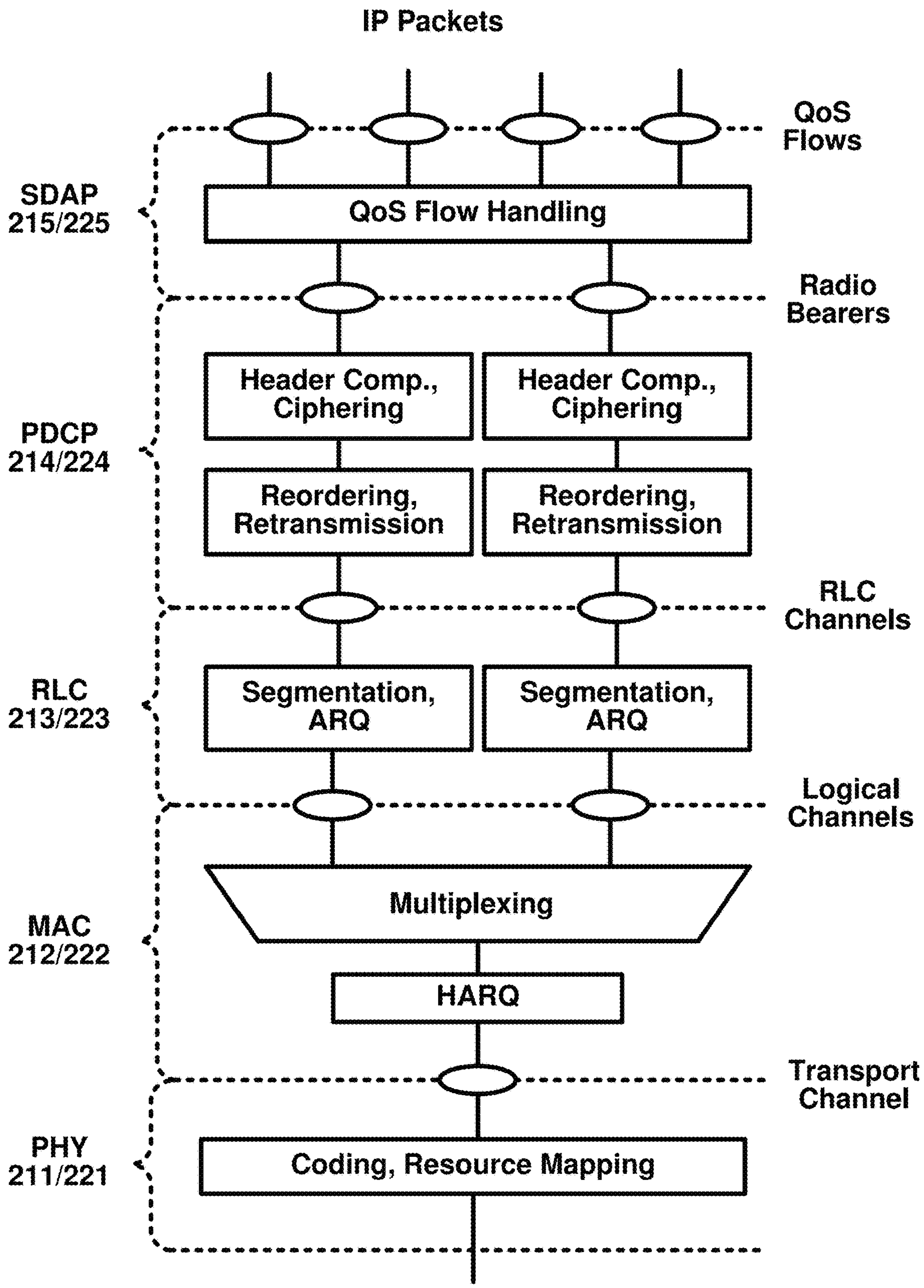
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
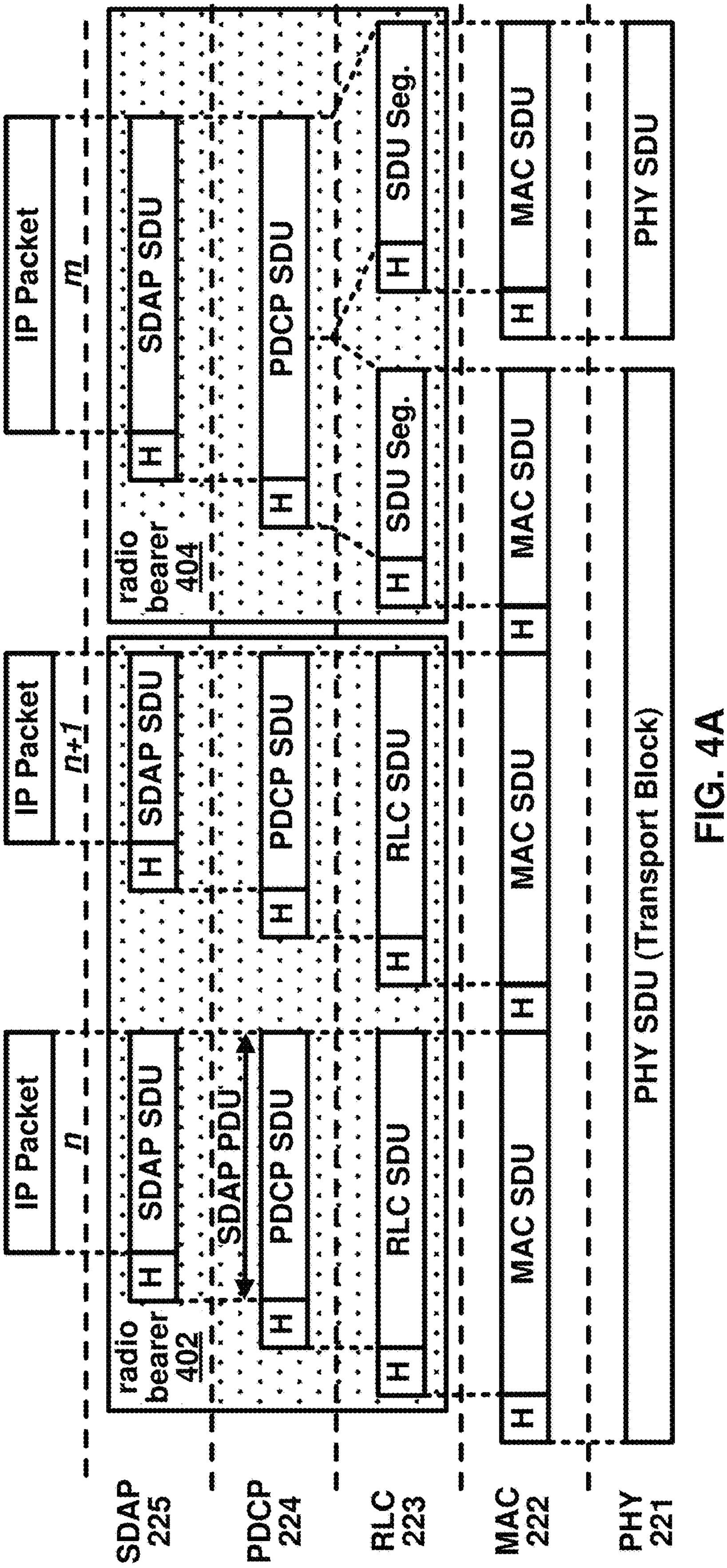
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG.

4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
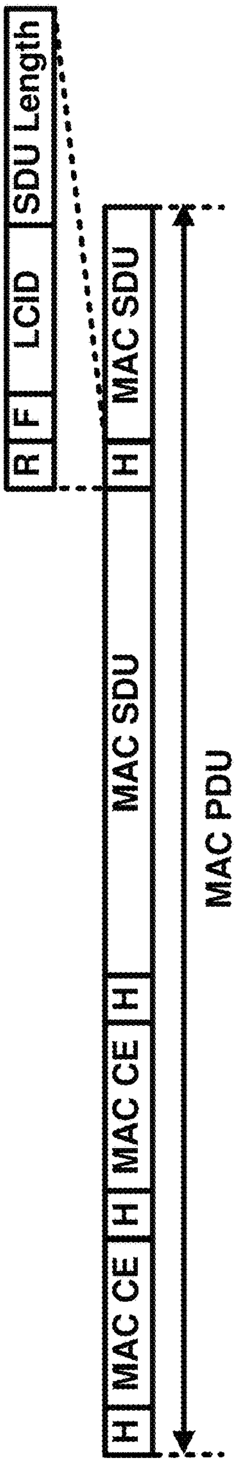
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
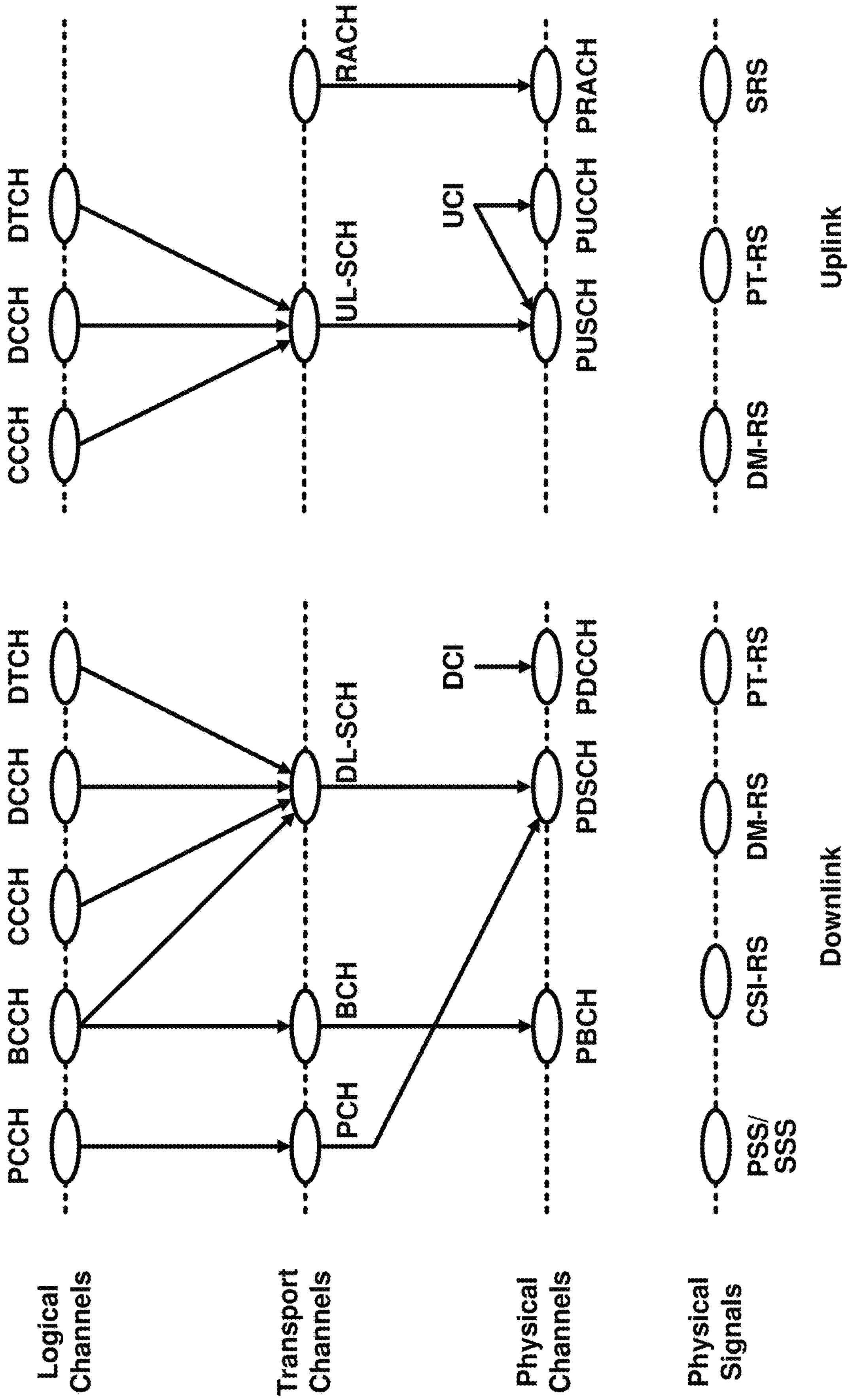
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
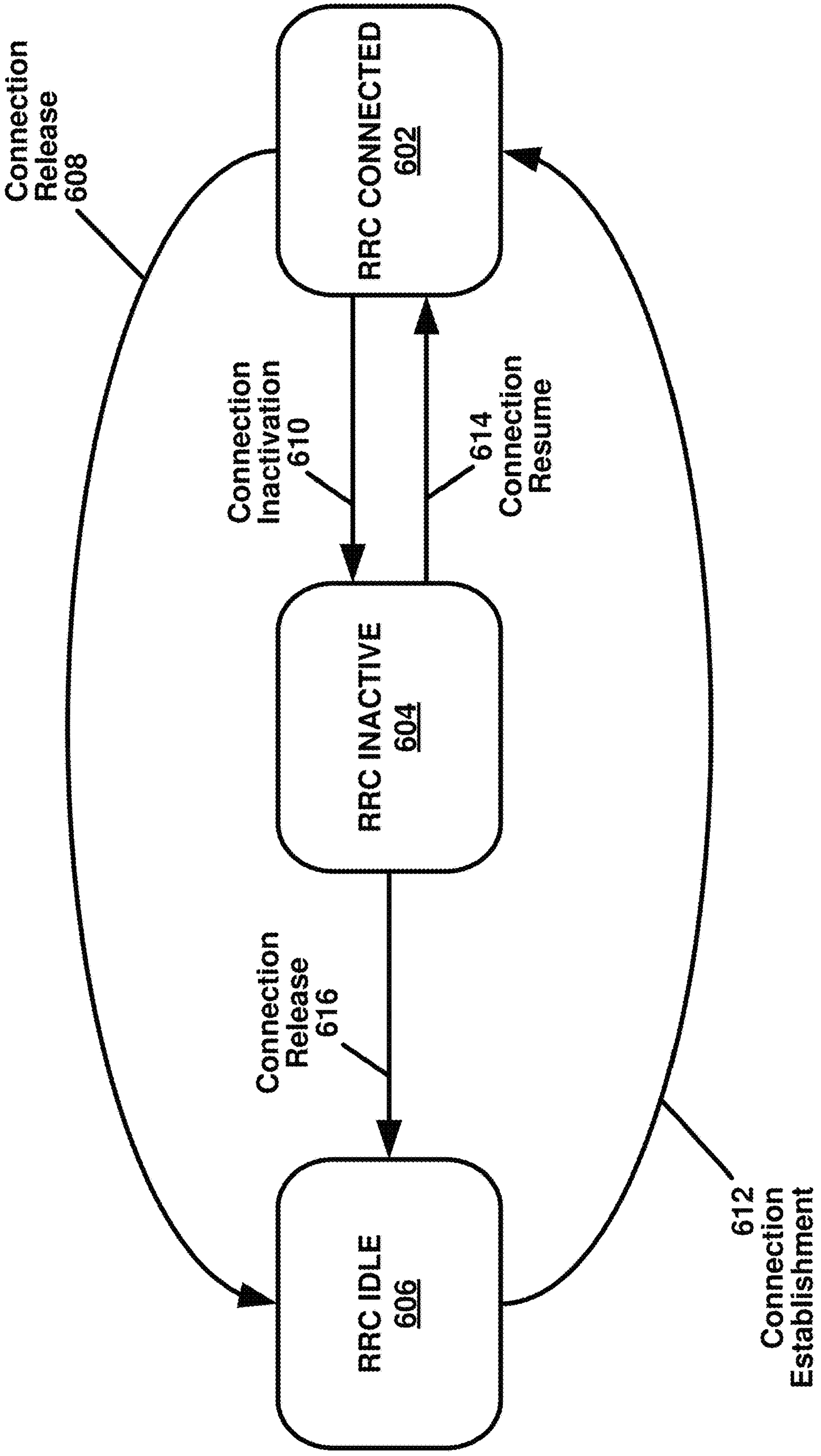
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
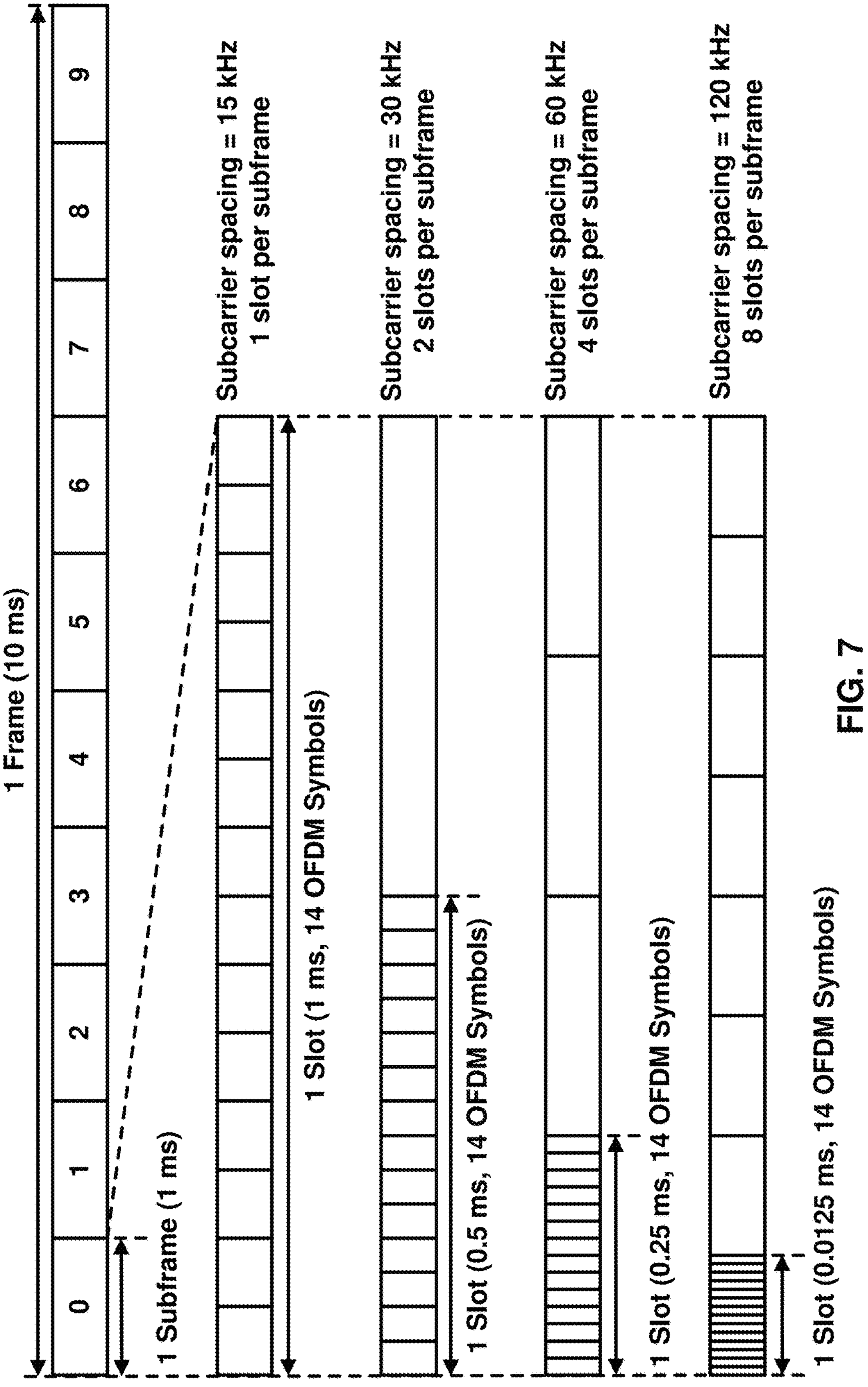
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for case of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
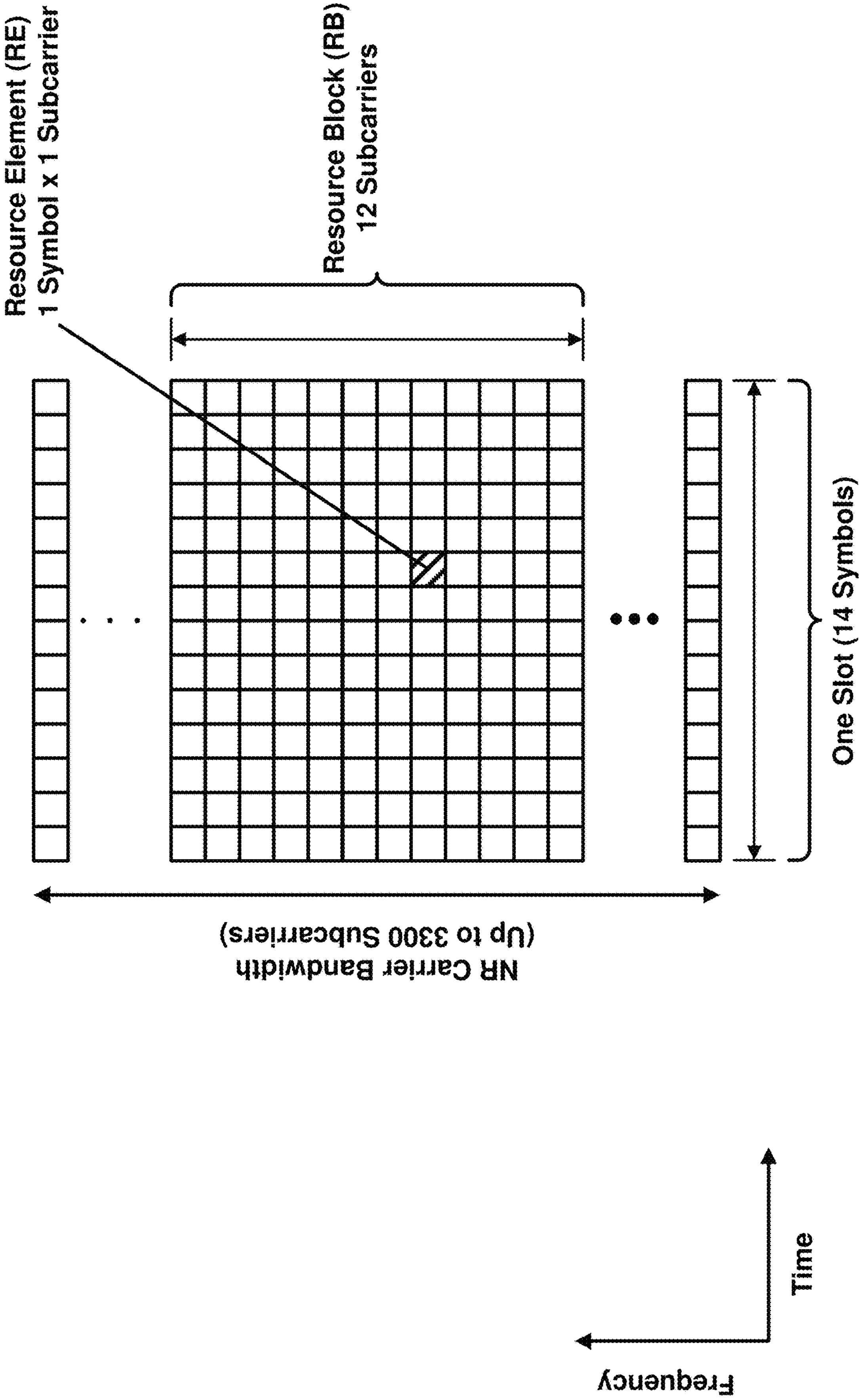
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
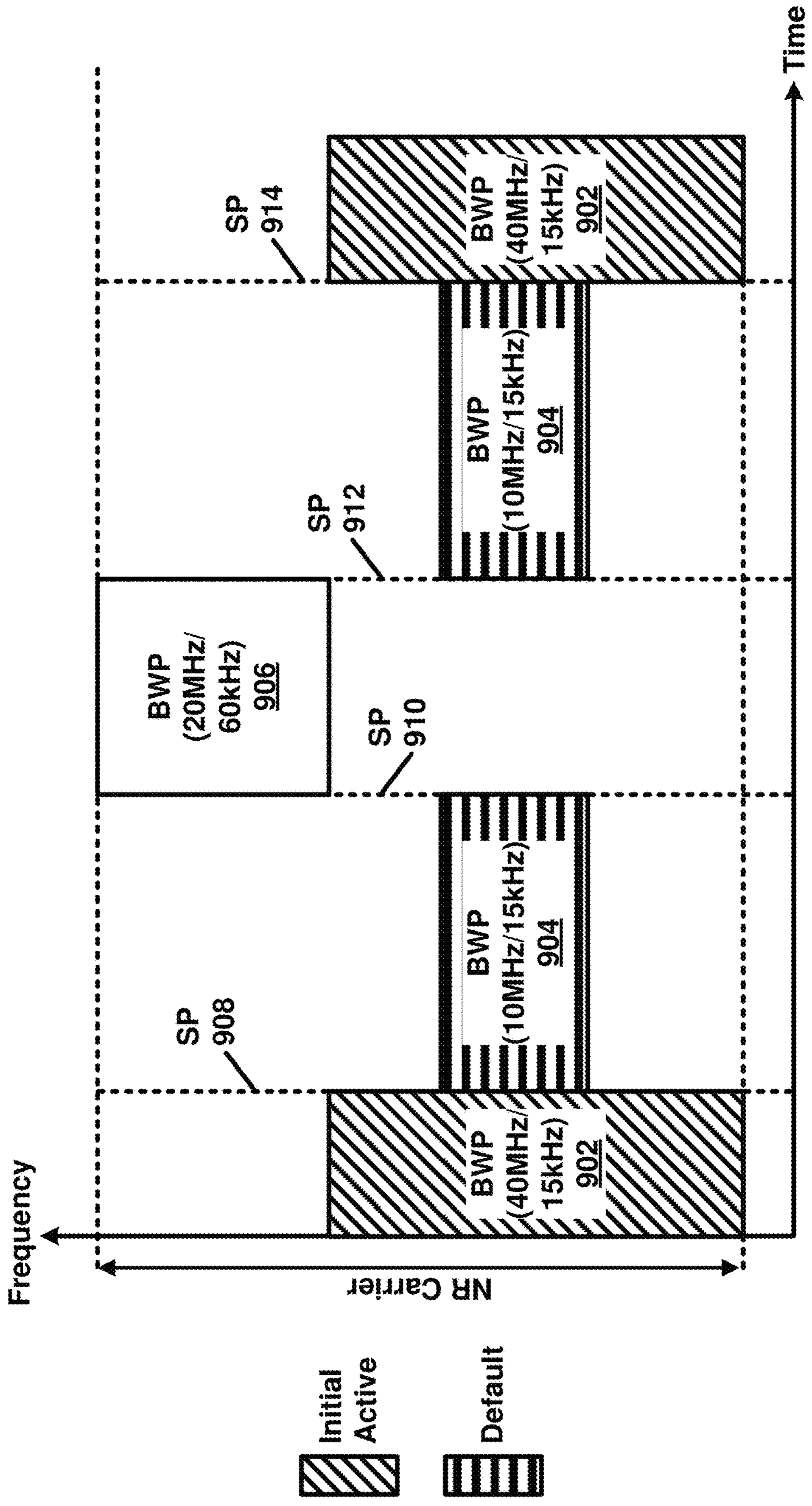
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
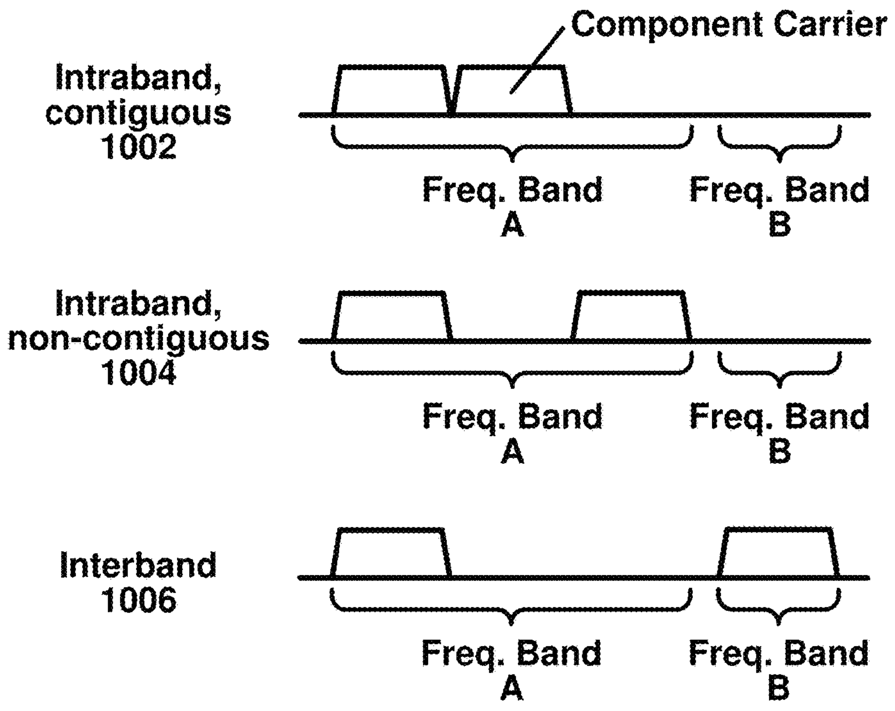
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
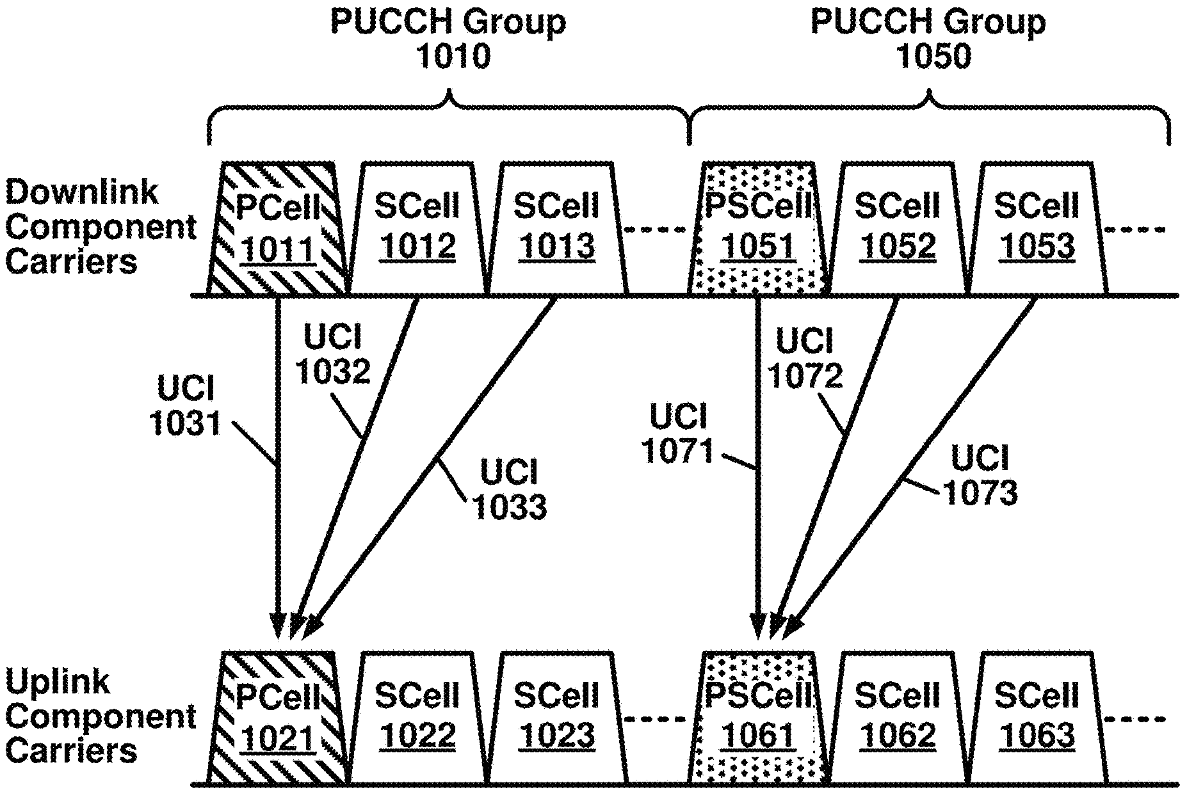
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
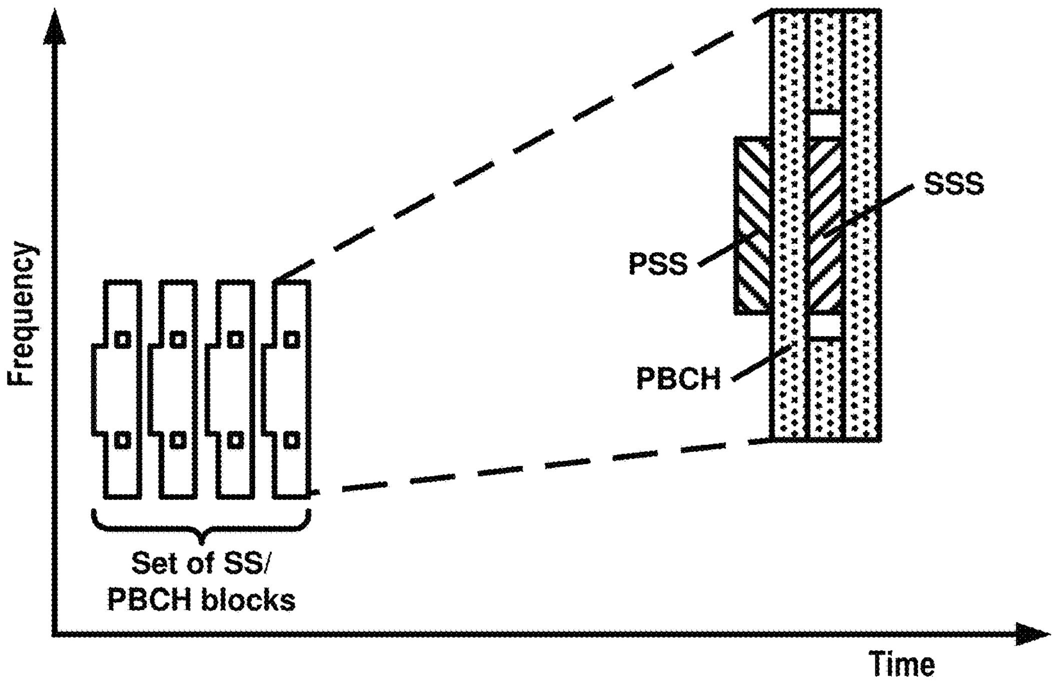
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
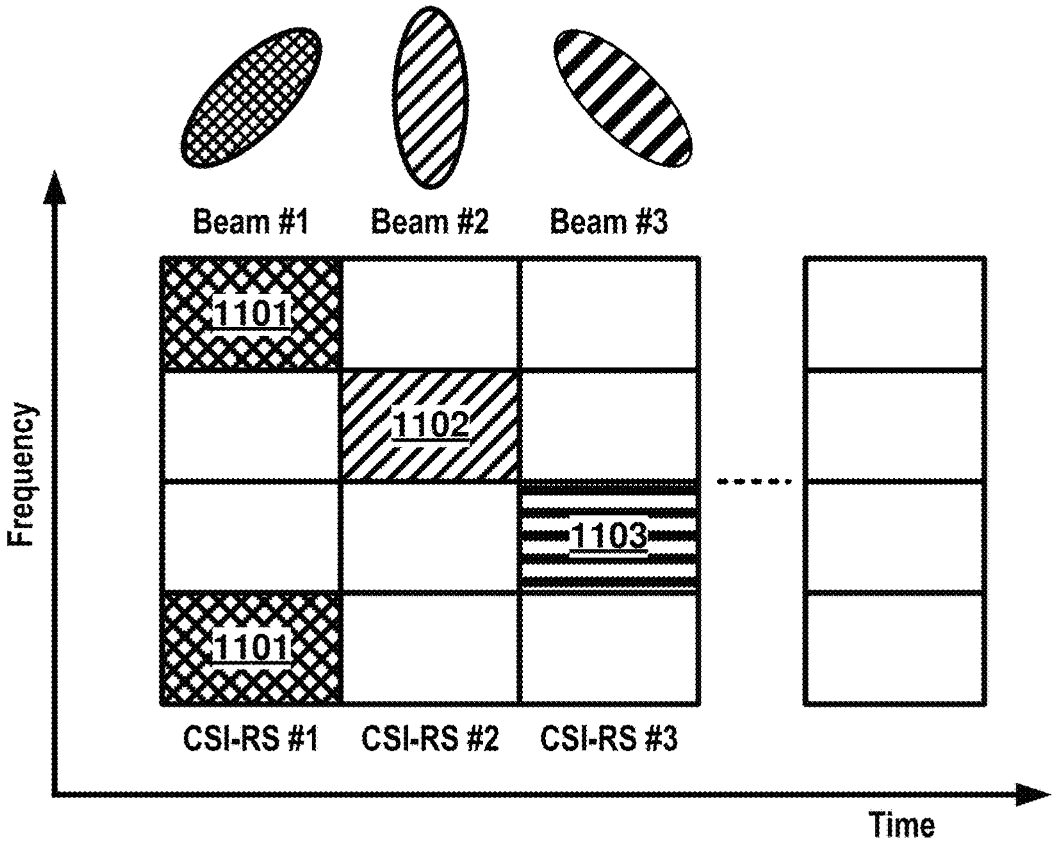
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
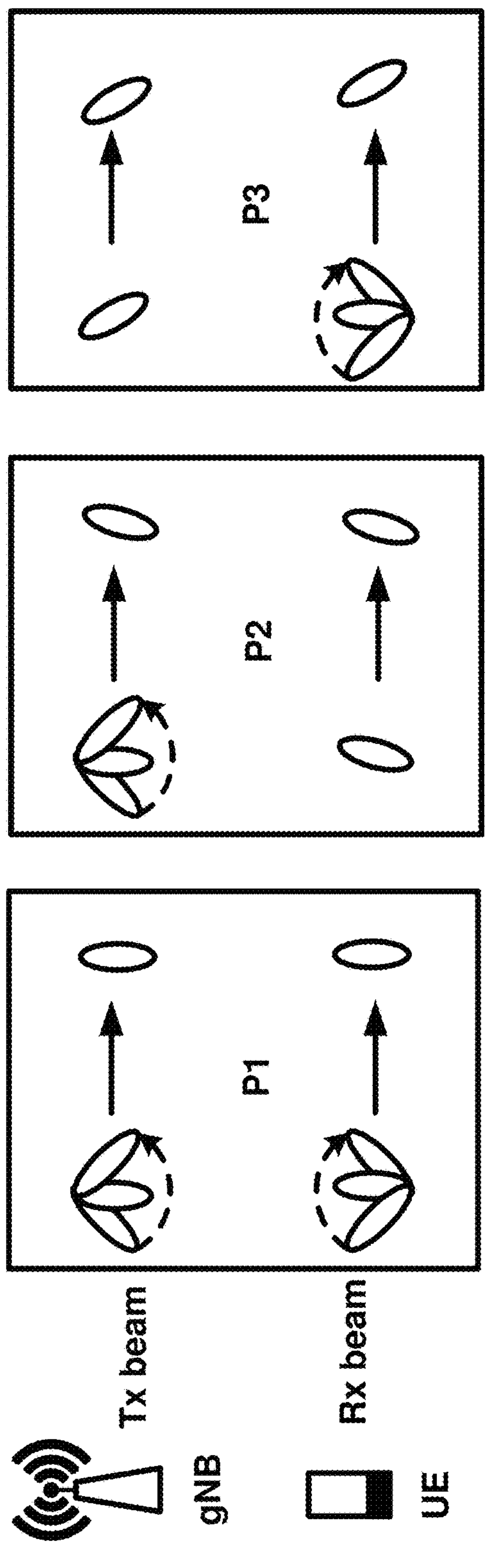
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
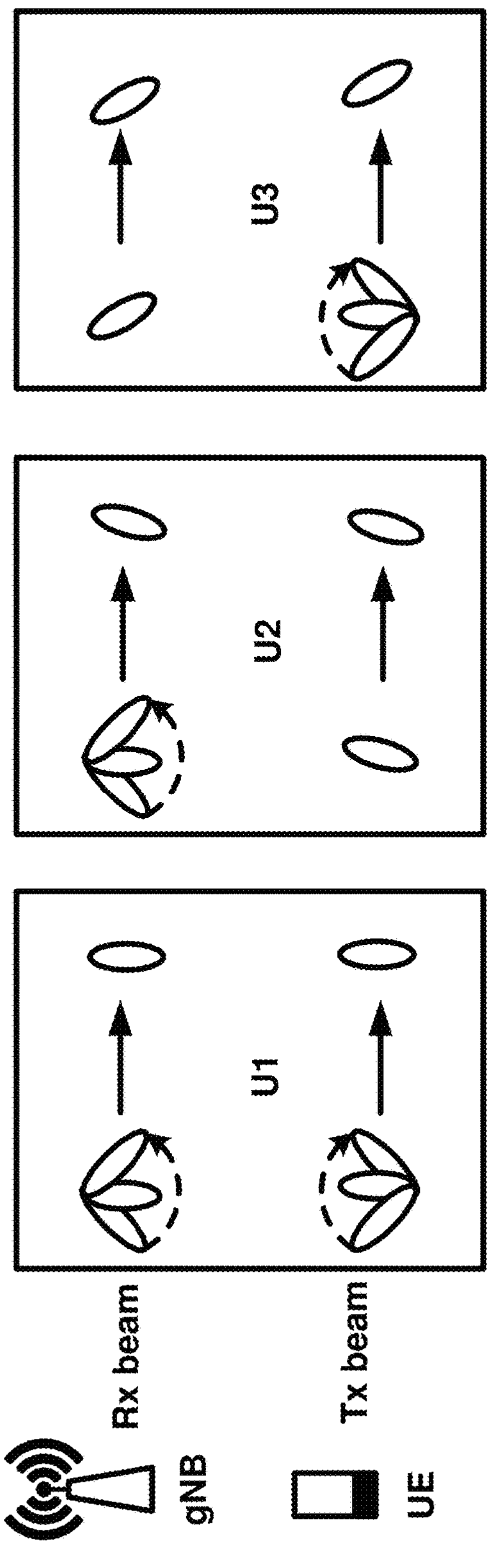

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
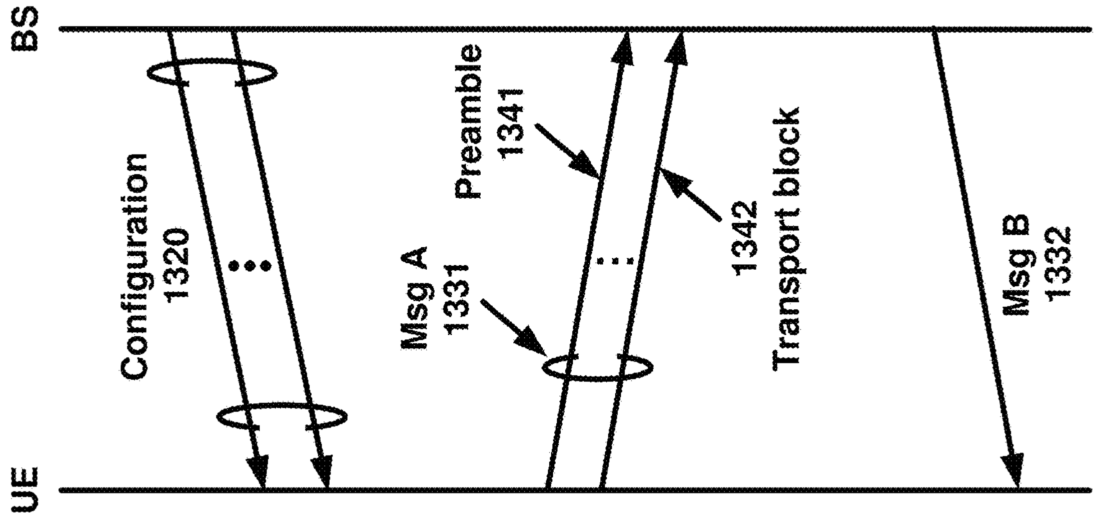
FIG. 13A, FIG. 13B, and FIG. 13C respectively illustrate a four-step contention-based random access procedure, a two-step contention-free random access procedure, and another two-step random access procedure.
Figure 13B:
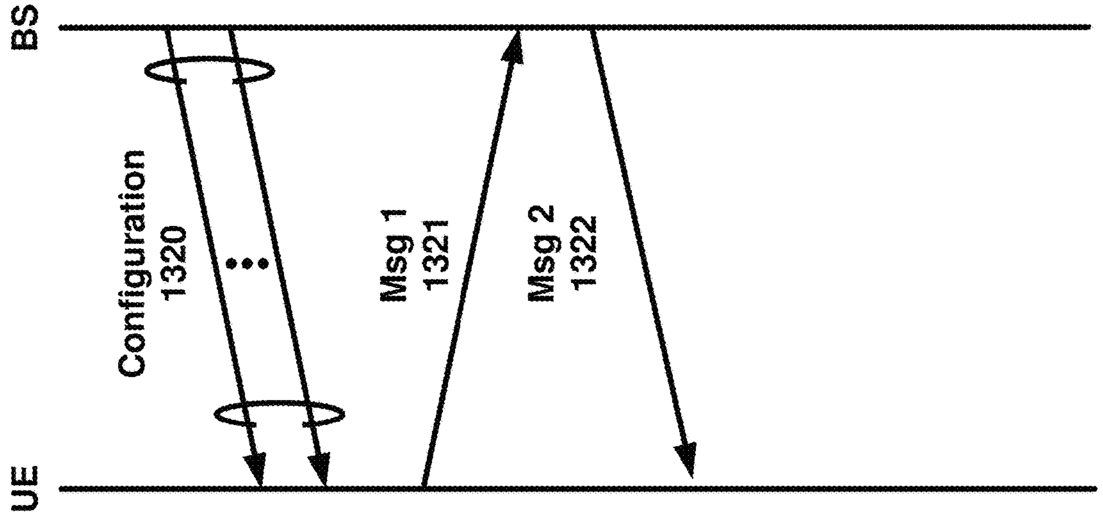
Figure 13A:
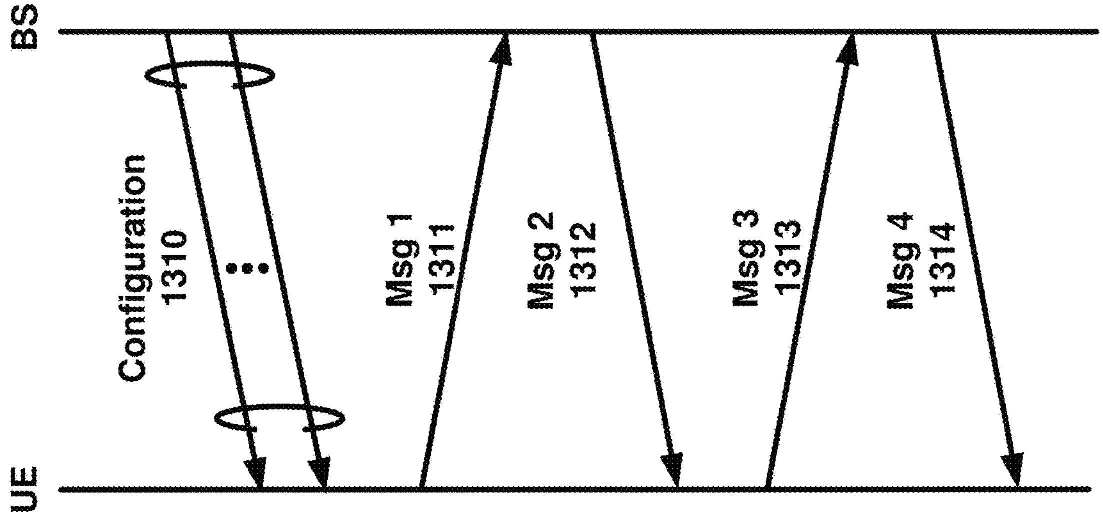

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_\text{id}+14\times t\_\text{id}+14\times 80\times f\_\text{id}+14\times 80\times 8\times \text{ul\_carrier\_id}$$

where s_id may be an index of a first OFDM symbol of the PRACH occasion (e.g., $0\le s\_id<14$), t_id may be an index of a first slot of the PRACH occasion in a system frame (e.g., $0\le t\_id<80$), f_id may be an index of the PRACH occasion in the frequency domain (e.g., $0\le f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-Response Window) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE;

and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
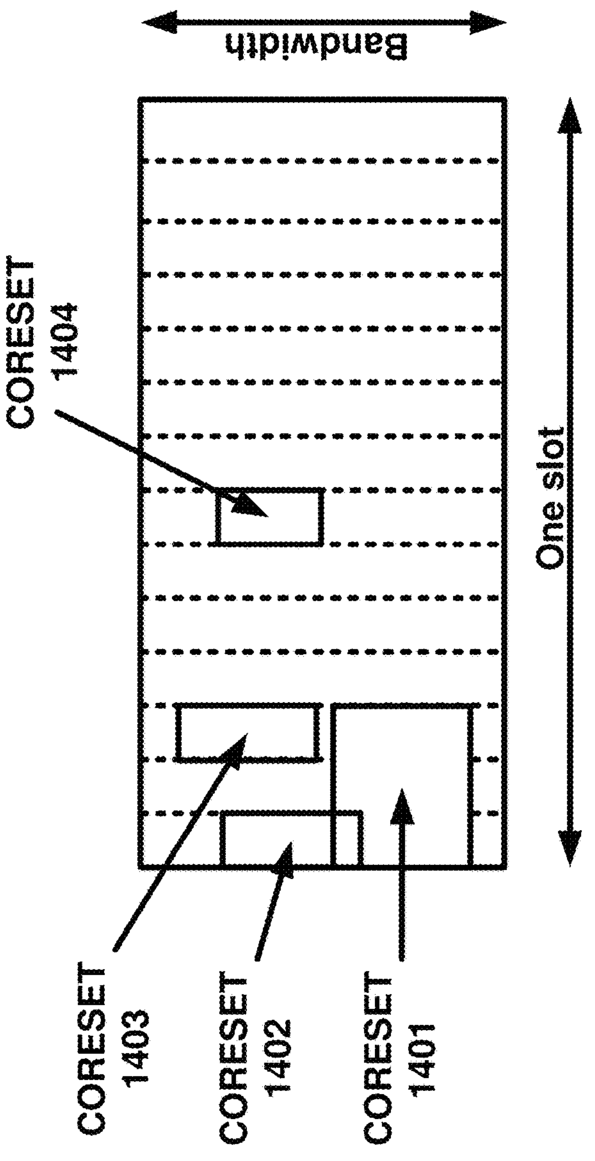
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
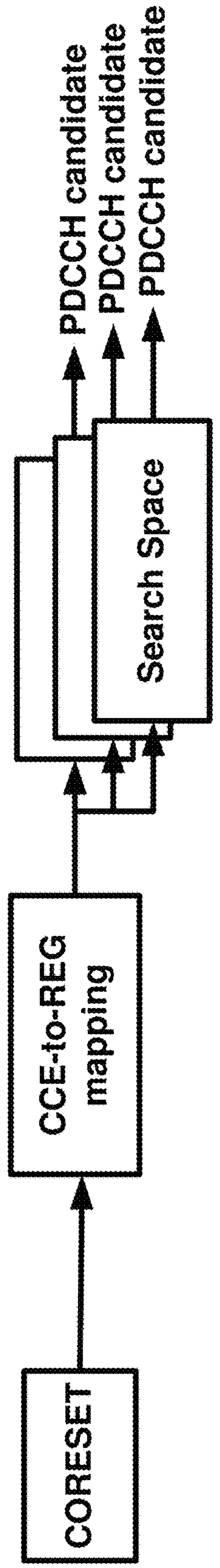
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
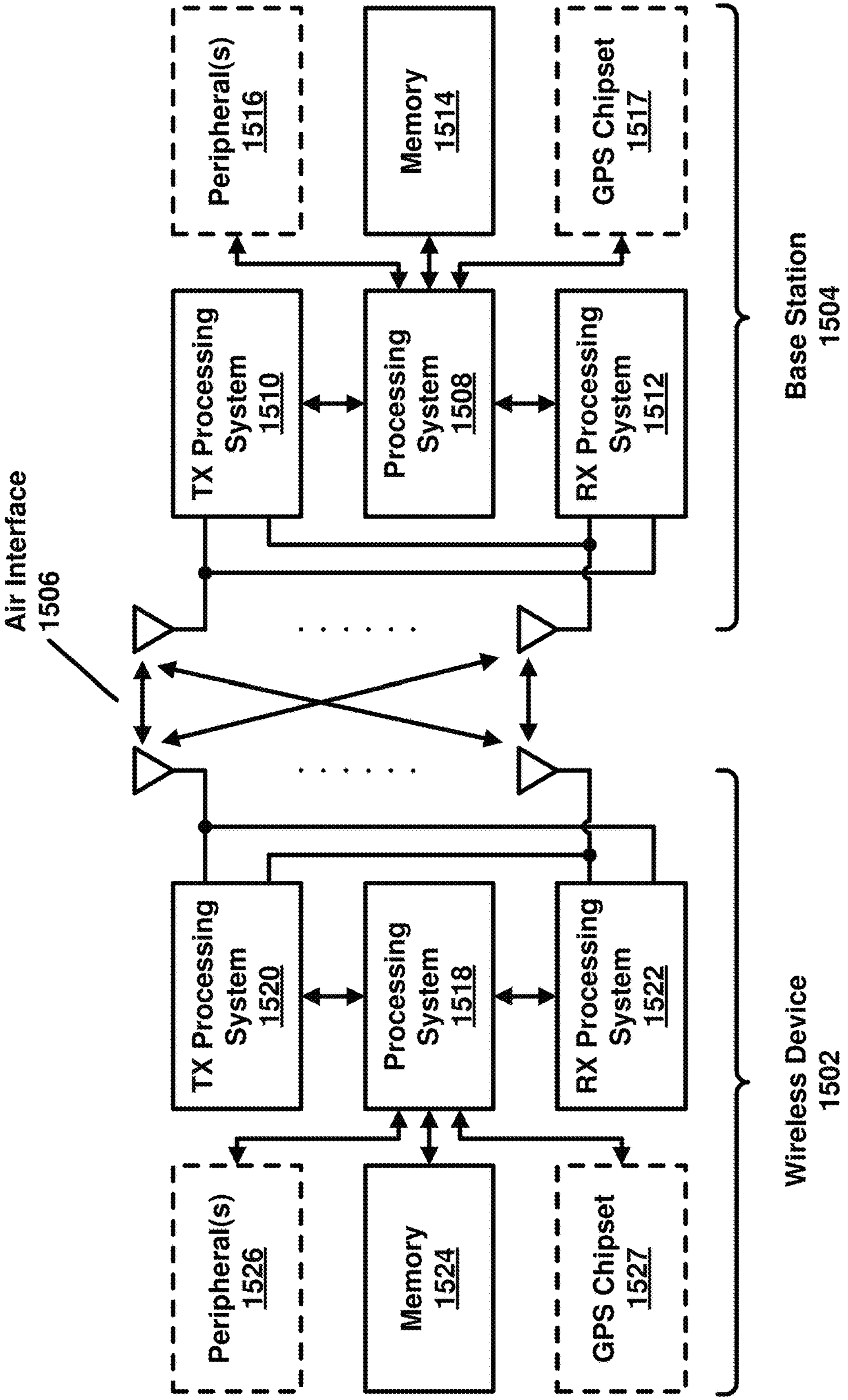
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
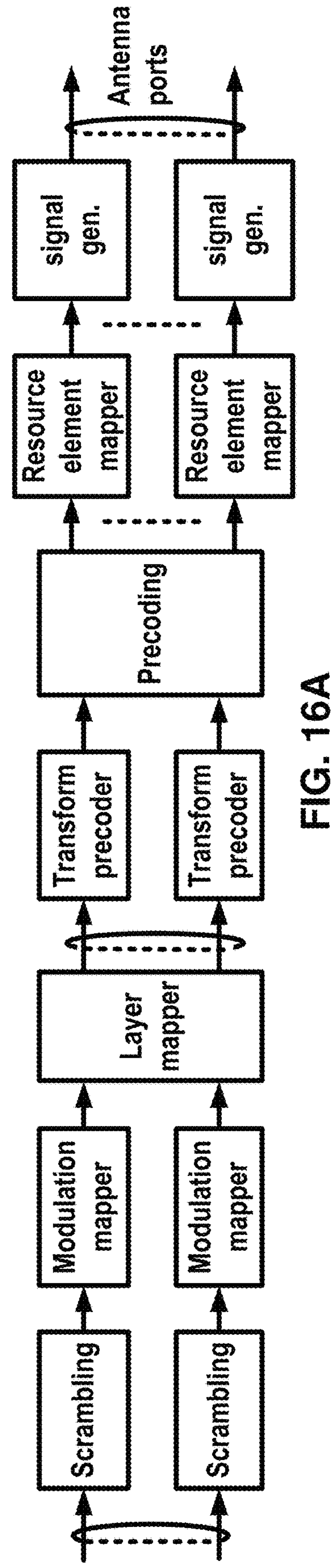
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of:

scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

Figure 16B:
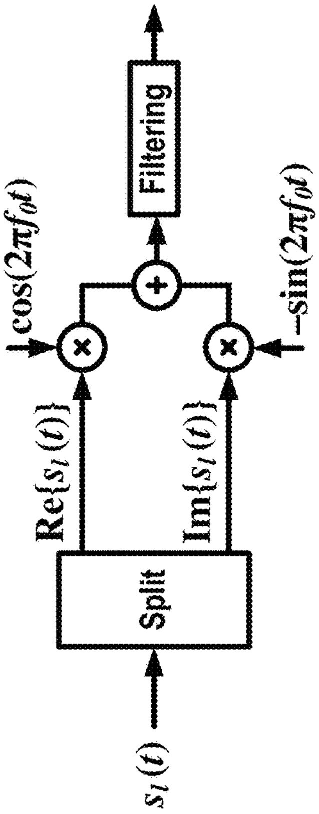

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16C:
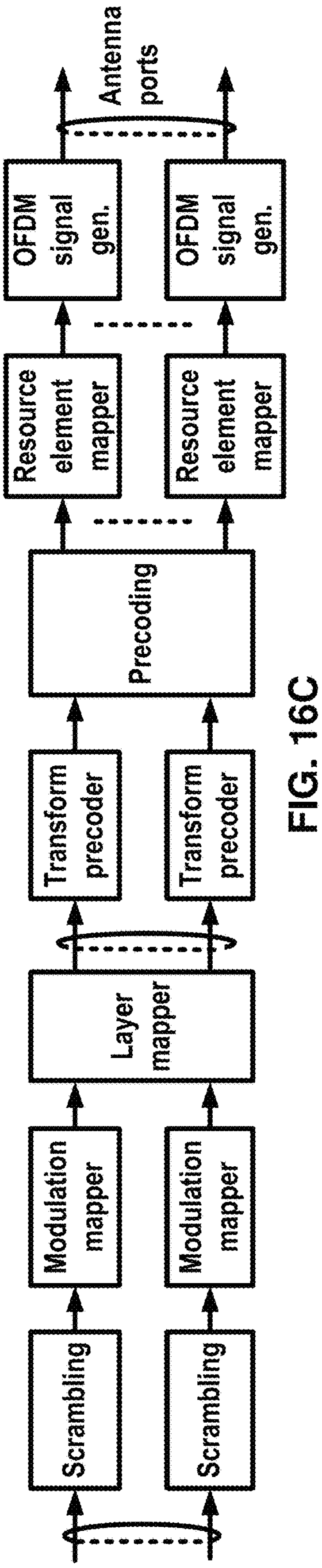

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

Figure 16D:
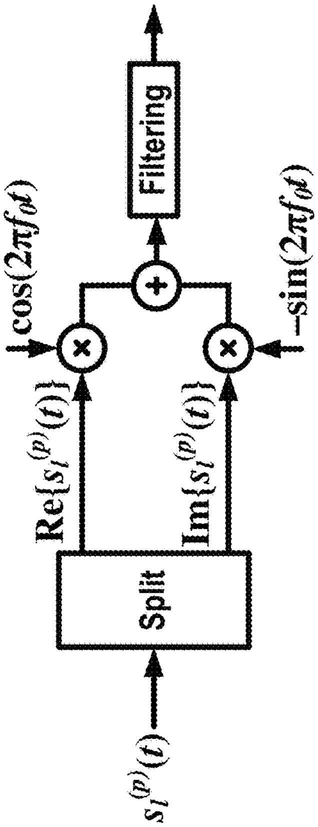

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one-bit length; an LCID field with a multi-bit length; an L field with a multi-bit length, or a combination thereof.

Figure 17A:
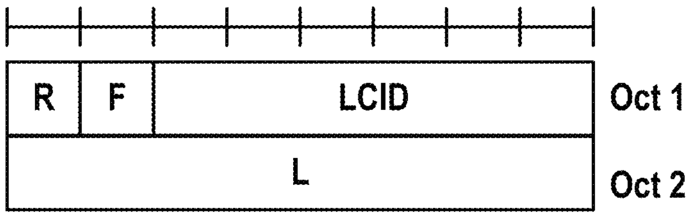
FIG. 17A, FIG. 17B and FIG. 17C illustrate examples of MAC subheaders.
Figure 17B:
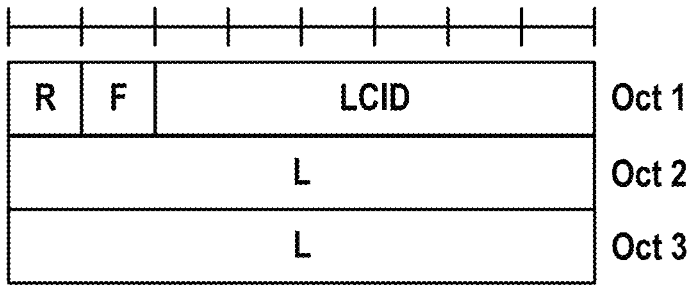
Figure 17C:
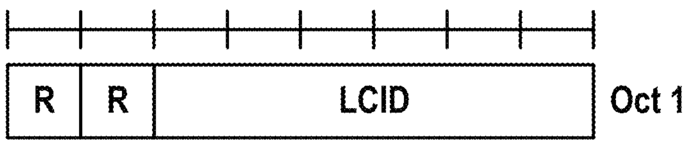

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, an F field, an LCID field, and an L field. In the example MAC subheader shown in FIG. 17B, the LCID field may be six bits in length, and the L field may be sixteen bits in length. When a MAC subheader corresponds to a fixed sized MAC CE or padding, the MAC subheader may comprise: an R field with a two-bit length and an LCID field with a multi-bit length. FIG. 17C shows an example of a MAC subheader with an R field and an LCID field. In the example MAC subheader shown in FIG. 17C, the LCID field may be six bits in length, and the R field may be two bits in length.

Figure 18A:
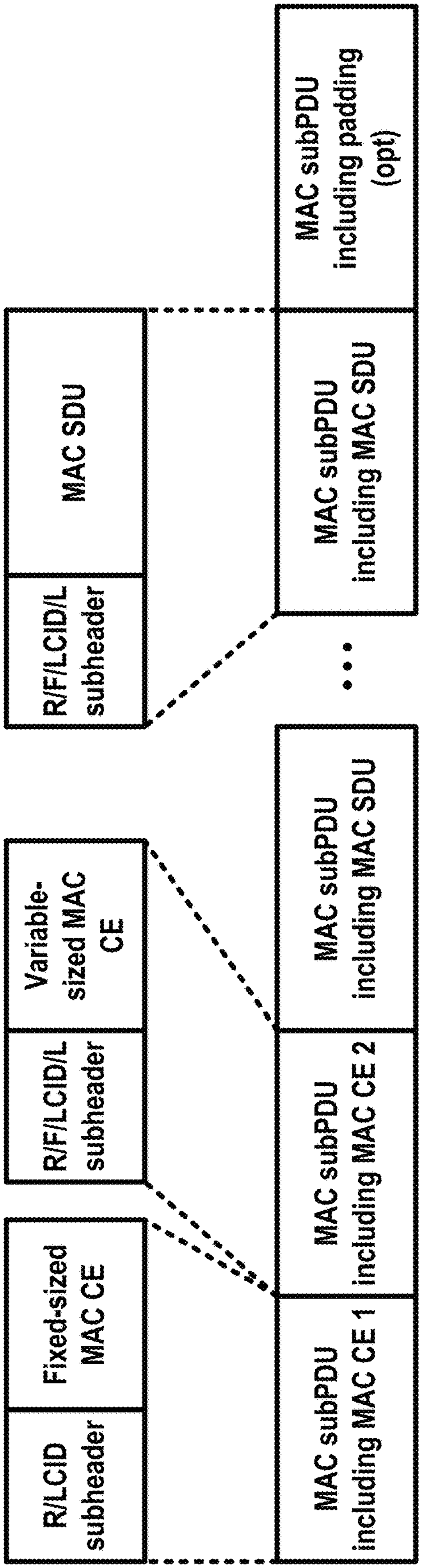
FIG. 18A illustrates an example of a DL MAC PDU.
Figure 18B:
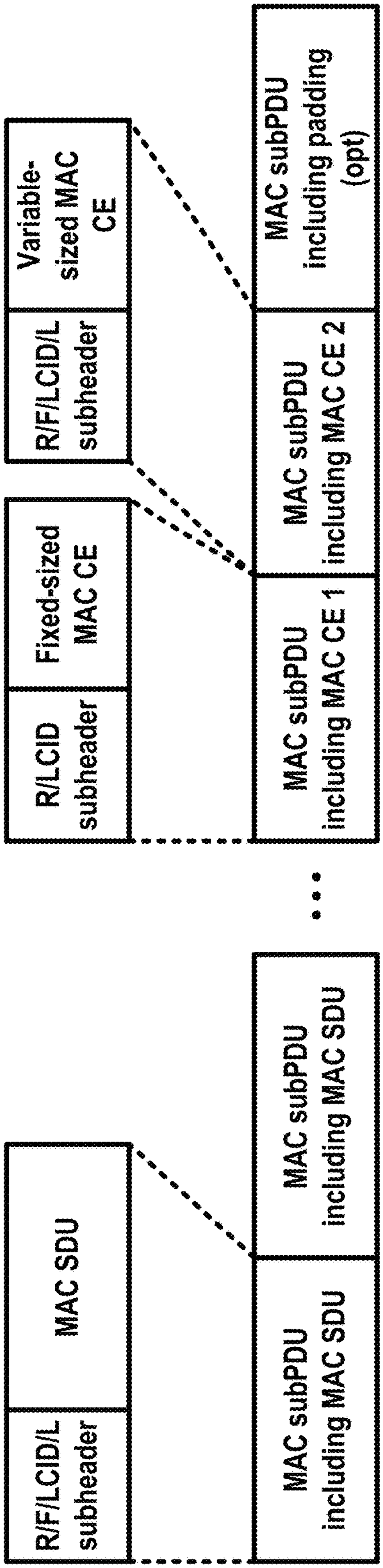
FIG. 18B illustrates an example of a UL MAC PDU.

FIG. 18A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. FIG. 18B shows an example of a UL MAC PDU. Multiple MAC CEs, such as MAC CE 1 and 2, may be placed together. In an embodiment, a MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. FIG. 19 shows an example of multiple LCIDs that may be associated with the one or more MAC CEs. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. FIG. 20 shows an example of the one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an embodiment, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant".

A wireless device may activate/deactivate an SCell in response to receiving an SCell Activation/Deactivation MAC CE. In an example, a base station may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell;

monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g., a PCell or an SCell configured with PUCCH, i.e., PUCCH SCell) scheduling the activated SCell indicates an uplink grant or a downlink assignment for the activated SCell, a wireless device may restart the first SCell timer (e.g., sCellDeactivationTimer) associated with the activated SCell. In an example, when an SCell is deactivated, if there is an ongoing random access procedure on the SCell, a wireless device may abort the ongoing random access procedure on the SCell.

Figure 21A:
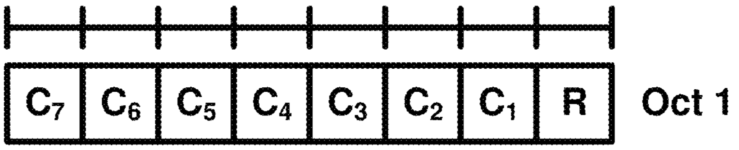
FIG. 21A and FIG. 21B illustrate examples of SCell activation/deactivation MAC CE formats.

FIG. 21A shows an example of an SCell Activation/Deactivation MAC CE of one octet. A first MAC PDU subheader with a first LCID (e.g., '111010' as shown in FIG. 19) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g., seven) and a second number of R-fields (e.g., one).

Figure 21B:
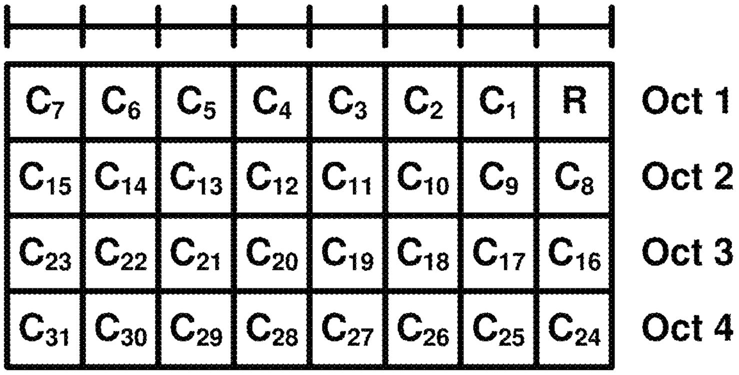

FIG. 21B shows an example of an SCell Activation/Deactivation MAC CE of four octets. A second MAC PDU subheader with a second LCID (e.g., '111001' as shown in FIG. 19) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a Ci field may indicate an activation/deactivation status of an SCell with an SCell index i if an SCell with SCell index i is configured. In an example, when the Ci field is set to one, an SCell with an SCell index i may be activated. In an example, when the Ci field is set to zero, an SCell with an SCell index i may be deactivated. In an example, if there is no SCell configured with SCell index i, the wireless device may ignore the Ci field. In FIG. 21A and FIG. 21B, an R field may indicate a reserved bit. The R field may be set to zero.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

In an example, a base station and/or a wireless device may switch a BWP between configured BWPs by means of a DCI or a BWP inactivity timer. When the BWP inactivity timer is configured for a serving cell, the base station and/or the wireless device may switch an active BWP to a default BWP in response to an expiry of the BWP inactivity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 22:
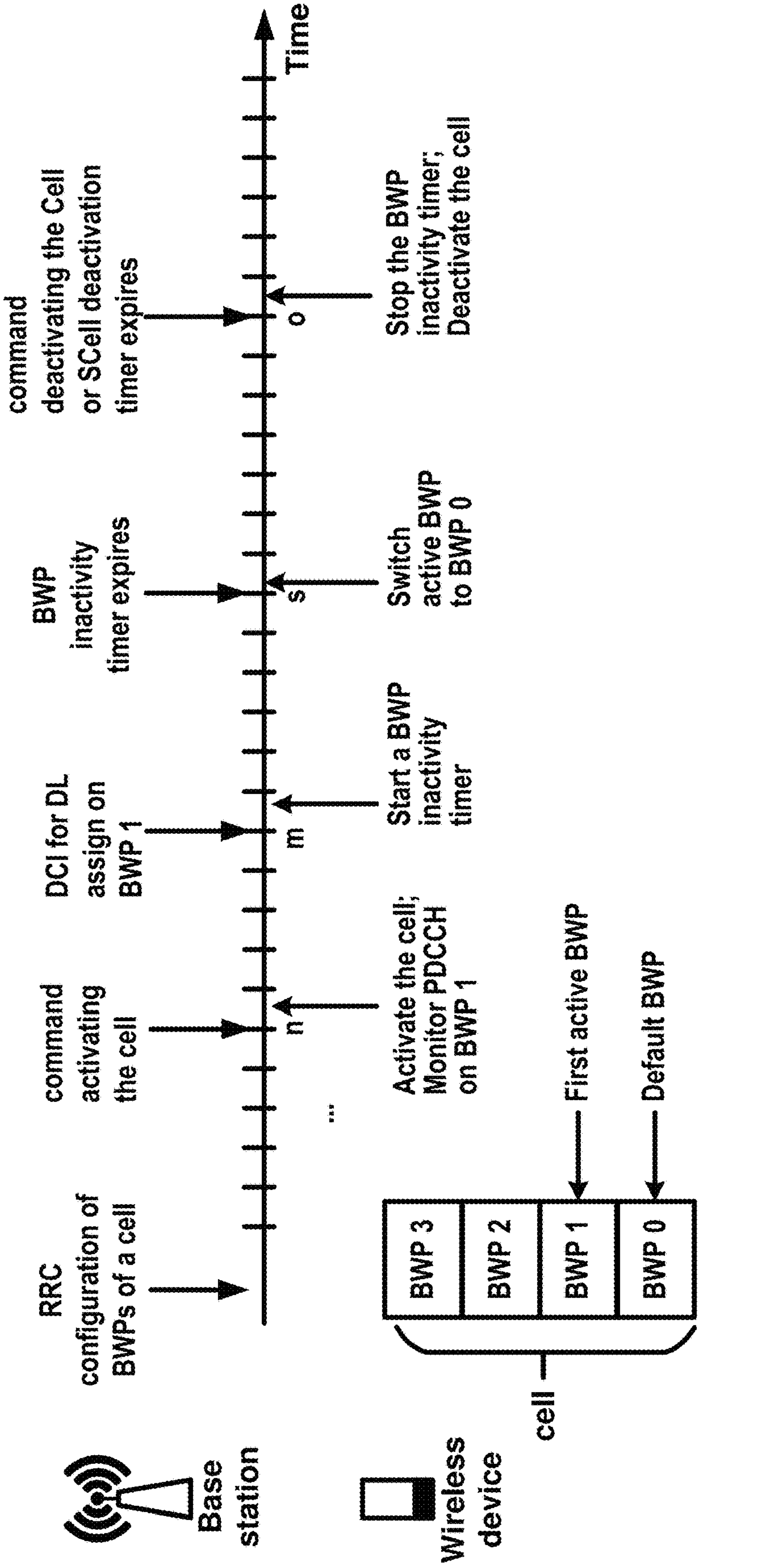
FIG. 22 illustrates an example of BWP activation/deactivation on a cell.

FIG. 22 shows an example of BWP switching on a cell (e.g., PCell or SCell). In an example, a wireless device may receive, from a base station, at least one RRC message comprising parameters of a cell and one or more BWPs associated with the cell. The RRC message may comprise: RRC connection reconfiguration message (e.g., RRCReconfiguration); RRC connection reestablishment message (e.g., RRCReestablishment); and/or RRC connection setup message (e.g., RRCSetup). Among the one or more BWPs, at least one BWP may be configured as the first active BWP (e.g., BWP 1), one BWP as the default BWP (e.g., BWP 0). The wireless device may receive a command (e.g., RRC message, MAC CE or DCI) to activate the cell at an nth slot. In case the cell is a PCell, the wireless device may not receive the command activating the cell, for example, the wireless device may activate the PCell once the wireless device receives RRC message comprising configuration parameters of the PCell. The wireless device may start monitoring a PDCCH on BWP 1 in response to activating the cell.

In an example, the wireless device may start (or restart) a BWP inactivity timer (e.g., bwp-InactivityTimer) at an mth slot in response to receiving a DCI indicating DL assignment on BWP 1. The wireless device may switch back to the default BWP (e.g., BWP 0) as an active BWP when the BWP inactivity timer expires, at sth slot. The wireless device may deactivate the cell and/or stop the BWP inactivity timer when the sCellDeactivationTimer expires (e.g., if the cell is a SCell). In response to the cell being a PCell, the wireless device may not deactivate the cell and may not apply the sCellDeactivationTimer on the PCell.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a wireless device may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a wireless device may be provided by a higher layer parameter Default-DL-BWP a default DL BWP among the configured DL BWPs. If a wireless device is not provided a default DL BWP by the higher layer parameter Default-DL-BWP, the default DL BWP is the initial active DL BWP. In an example, a wireless device may be provided by higher layer parameter bwp-InactivityTimer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

In an example, if a wireless device is configured for a secondary cell with higher layer parameter Default-DL-BWP indicating a default DL BWP among the configured DL BWPs and the wireless device is configured with higher layer parameter bwp-InactivityTimer indicating a timer value, the wireless device procedures on the secondary cell may be same as on the primary cell using the timer value for the secondary cell and the default DL BWP for the secondary cell.

In an example, if a wireless device is configured by higher layer parameter Active-BWP-DL-SCell a first active DL BWP and by higher layer parameter Active-BWP-UL-SCell a first active UL BWP on a secondary cell or carrier, the wireless device may use the indicated DL BWP and the indicated UL BWP on the secondary cell as the respective first active DL BWP and first active UL BWP on the secondary cell or carrier.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type 1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpace Type=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpace Type=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device determines a PDCCH monitoring occasion on an active DL BWP based on one or more PDCCH configuration parameters (e.g., based on example embodiment of FIG. 27) comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.\ M_{slot}^{frame,\mu}$$

is a number of slots in a slot frame when numerology μ is configured. $o_s$ is a slot offset indicated in the PDCCH configuration parameters (e.g., based on example embodiment of FIG. 27). $k_s$ is a PDCCH monitoring periodicity indicated in the PDCCH configuration parameters (e.g., based on example embodiment of FIG. 27). The wireless device monitors PDCCH candidates for the search space set for $T_s$ consecutive slots, starting from slot $$n_{s,f}^{\mu}$$

and does not monitor PDCCH candidates for search space set s for the next $k_s - T_s$ consecutive slots. In an example, a USS at CCE aggregation level L∈{1, 2, 4, 8, 16} is defined by a set of PDCCH candidates for CCE aggregation level L.

In an example, a wireless device decides, for a search space set s associated with CORESET p, CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where, $$Y_{p,n^{\mu}_{s,f}} = 0$$

for any CSS;

$$Y_{p,n^{\mu}_{s,f}} = \left(A_p \cdot Y_{p,n^{\mu}_{s,f}-1}\right)$$

mod D for a USS, $Y_{p,-1}=N_{RNTI}\neq 0$, $A_p=39827$ for p mod 3=0, $A_p=39829$ for p mod 3=1, $A_p=39839$ for p mod 3=2, and D=65537; i=0, . . . , L−1; $N_{CCE,p}$ is the number of CCEs, numbered from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $$n_{CI} = 0;\ m_{s,n_{CI}} = 0, \ldots, M^{(L)}_{s,n_{CI}} - 1, \text{ where } M^{(L)}_{s,n_{CI}}$$

the number of PDCCH candidates the wireless device is configured to monitor for aggregation level L of a search space set s for a serving cell corresponding to $n_{CI}$; for any CSS, $$M^{(L)}_{s,max} = M^{(L)}_{s,0};$$

for a USS, $$M^{(L)}_{s,max}$$

is the maximum of $$M^{(L)}_{s,n_{CI}}$$

over all configured $n_{CI}$ values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. A CORESET may be configured based on example embodiment of FIG. 26. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding. The possible DCI formats may be based on example embodiments of FIG. 23.

FIG. 23 shows examples of DCI formats which may be used by a base station transmit control information to a wireless device or used by the wireless device for PDCCH monitoring. Different DCI formats may comprise different DCI fields and/or have different DCI payload sizes. Different DCI formats may have different signaling purposes. In an example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc. The DCI format(s) which the wireless device may monitor in a SS may be configured.

FIG. 24A shows an example of configuration parameters of a master information block (MIB) of a cell (e.g., PCell). In an example, a wireless device, based on receiving primary synchronization signal (PSS) and/or secondary synchronization signal (SSS), may receive a MIB via a PBCH. The configuration parameters of a MIB may comprise six bits (systemFrameNumber) of system frame number (SFN), subcarrier spacing indication (subCarrierSpacingCommon), a frequency domain offset (ssb-SubcarrierOffset) between SSB and overall resource block grid in number of subcarriers, an indication (cellBarred) indicating whether the cell is bared, a DMRS position indication (dmrs-TypeA-Position) indicating position of DMRS, parameters of CORESET and SS of a PDCCH (pdcch-ConfigSIB1) comprising a common CORESET, a common search space and necessary PDCCH parameters, etc.

In an example, a pdcch-ConfigSIB1 may comprise a first parameter (e.g., controlResourceSetZero) indicating a common ControlResourceSet (CORESET) with ID #0 (e.g., CORESET #0) of an initial BWP of the cell. controlResourceSetZero may be an integer between 0 and 15. Each integer between 0 and 15 may identify a configuration of CORESET #0.

FIG. 24B shows an example of a configuration of CORESET #0. As shown in FIG. 24B, based on a value of the integer of controlResourceSetZero, a wireless device may determine a SSB and CORESET #0 multiplexing pattern, a number of RBs for CORESET #0, a number of symbols for CORESET #0, an RB offset for CORESET #0.

In an example, a pdcch-ConfigSIB1 may comprise a second parameter (e.g., searchSpaceZero) indicating a common search space with ID #0 (e.g., SS #0) of the initial BWP of the cell. searchSpaceZero may be an integer between 0 and 15. Each integer between 0 and 15 may identify a configuration of SS #0.

FIG. 24C shows an example of a configuration of SS #0. As shown in FIG. 24C, based on a value of the integer of searchSpaceZero, a wireless device may determine one or more parameters (e.g., O, M) for slot determination of PDCCH monitoring, a first symbol index for PDCCH monitoring and/or a number of search spaces per slot.

In an example, based on receiving a MIB, a wireless device may monitor PDCCH via SS #0 of CORESET #0 for receiving a DCI scheduling a system information block 1 (SIB1). A SIB1 message may be implemented based on example embodiment of FIG. 25. The wireless device may receive the DCI with CRC scrambled with a system information radio network temporary identifier (SI-RNTI) dedicated for receiving the SIB1.

FIG. 25 shows an example of RRC configuration parameters of system information block (SIB). A SIB (e.g., SIB1) may be transmitted to all wireless devices in a broadcast way. The SIB may contain information relevant when evaluating if a wireless device is allowed to access a cell, information of paging configuration and/or scheduling configuration of other system information. A SIB may contain radio resource configuration information that is common for all wireless devices and barring information applied to a unified access control. In an example, a base station may transmit to a wireless device (or a plurality of wireless devices) one or more SIB information. As shown in FIG. 25, parameters of the one or more SIB information may comprise: one or more parameters (e.g., cellSelectionInfo) for cell selection related to a serving cell, one or more configuration parameters of a serving cell (e.g., in ServingCellConfigCommonSIB IE), and one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, and other parameters.

In an example, a DownlinkConfigCommonSIB IE may comprise parameters of an initial downlink BWP (initialDownlinkBWP IE) of the serving cell (e.g., SpCell). The parameters of the initial downlink BWP may be comprised in a BWP-DownlinkCommon IE (as shown in FIG. 26). The BWP-DownlinkCommon IE may be used to configure common parameters of a downlink BWP of the serving cell. The base station may configure the locationAndBandwidth so that the initial downlink BWP contains the entire CORESET #0 of this serving cell in the frequency domain. The wireless device may apply the locationAndBandwidth upon reception of this field (e.g., to determine the frequency position of signals described in relation to this locationAndBandwidth) but it keeps CORESET #0 until after reception of RRCSetup/RRCResume/RRCReestablishment.

In an example, the DownlinkConfigCommonSIB IE may comprise parameters of a paging channel configuration. The parameters may comprise a paging cycle value (T, by defaultPagingCycle IE), a parameter (nAndPagingFrameOffset IE) indicating total number N) of paging frames (PFs) and paging frame offset (PF_offset) in a paging DRX cycle, a number (Ns) for total paging occasions (POs) per PF, a first PDCCH monitoring occasion indication parameter (firstPDCCH-MonitoringOccasionofPO IE) indicating a first PDCCH monitoring occasion for paging of each PO of a PF. The wireless device, based on parameters of a PCCH configuration, may monitor PDCCH for receiving paging message, e.g., based on example embodiments of FIG. 28A and/or FIG. 28B.

In an example, the parameter first-PDCCH-MonitoringOccasionOfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

FIG. 26 shows an example of RRC configuration parameters (e.g., BWP-DownlinkCommon IE) in a downlink BWP of a serving cell. A base station may transmit to a wireless device (or a plurality of wireless devices) one or more configuration parameters of a downlink BWP (e.g., initial downlink BWP) of a serving cell. As shown in FIG. 26, the one or more configuration parameters of the downlink BWP may comprise: one or more generic BWP parameters of the downlink BWP, one or more cell specific parameters for PDCCH of the downlink BWP (e.g., in pdcch-ConfigCommon IE), one or more cell specific parameters for the PDSCH of this BWP (e.g., in pdsch-ConfigCommon IE), and one or more other parameters. A pdcch-ConfigCommon IE may comprise parameters of CORESET #0 (e.g., controlResourceSetZero) which can be used in any common or UE-specific search spaces. A value of the controlResourceSetZero may be interpreted like the corresponding bits in MIB pdcch-ConfigSIB1. A pdcch-ConfigCommon IE may comprise parameters (e.g., in commonControlResourceSet) of an additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET #0. A pdcch-ConfigCommon IE may comprise parameters (e.g., in commonSearchSpaceList) of a list of additional common search spaces. Parameters of a search space may be implemented based on example of FIG. 27. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

As shown in FIG. 26, a control resource set (CORESET) may be associated with a CORESET index (e.g., ControlResourceSetId). The CORESET index with a value of 0 may identify a common CORESET configured in MIB and in ServingCellConfigCommon (controlResourceSetZero) and may not be used in the ControlResourceSet IE. The CORESET index with other values may identify CORESETs configured by dedicated signaling or in SIB1. The controlResourceSetId is unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET in number of symbols. In an example, as shown in FIG. 26, configuration parameters of a CORESET may comprise at least one of: frequency resource indication (e.g., frequencyDomainResources), a CCE-REG mapping type indicator (e.g., cce-REG-MappingType), a plurality of TCI states, an indicator indicating whether a TCI is present in a DCI, and the like. The frequency resource indication, comprising a number of bits (e.g., 45 bits), may indicate frequency domain resources, each bit of the indication corresponding to a group of 6 RBs, with grouping starting from the first RB group in a BWP of a cell (e.g., SpCell, SCell). The first (left-most/most significant) bit may correspond to the first RB group in the BWP, and so on. A bit that is set to 1 may indicate that an RB group, corresponding to the bit, belongs to the frequency domain resource of this CORESET. Bits corresponding to a group of RBs not fully contained in the BWP within which the CORESET is configured may be set to zero.

FIG. 27 shows an example of configuration of a search space (e.g., SearchSpace IE). In an example, one or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbols WithinSlot), a number of candidates for an aggregation level (nrofCandidates), and/or a SS type indicating a common SS type or a UE-specific SS type (searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

In an example, a wireless device, in RRC_IDLE or RRC_INACTIVE state, may periodically monitor paging occasions (POs) for receiving paging message for the wireless device. Before monitoring the POs, the wireless device, in RRC_IDLE or RRC_INACTIVE state, may wake up at a time before each PO for preparation and/or turn all components in preparation of data reception (warm up). The gap between the waking up and the PO may be long enough to accommodate all the processing requirements. The wireless device may perform, after the warming up, timing acquisition from SSB and coarse synchronization, frequency and time tracking, time and frequency offset compensation, and/or calibration of local oscillator. After that, the wireless device may monitor a PDCCH for a paging DCI in one or more PDCCH monitoring occasions based on configuration parameters of the PCCH configuration configured in SIB1. The configuration parameters of the PCCH configuration may be implemented based on example embodiments described above with respect to FIG. 25.

Figure 28A:
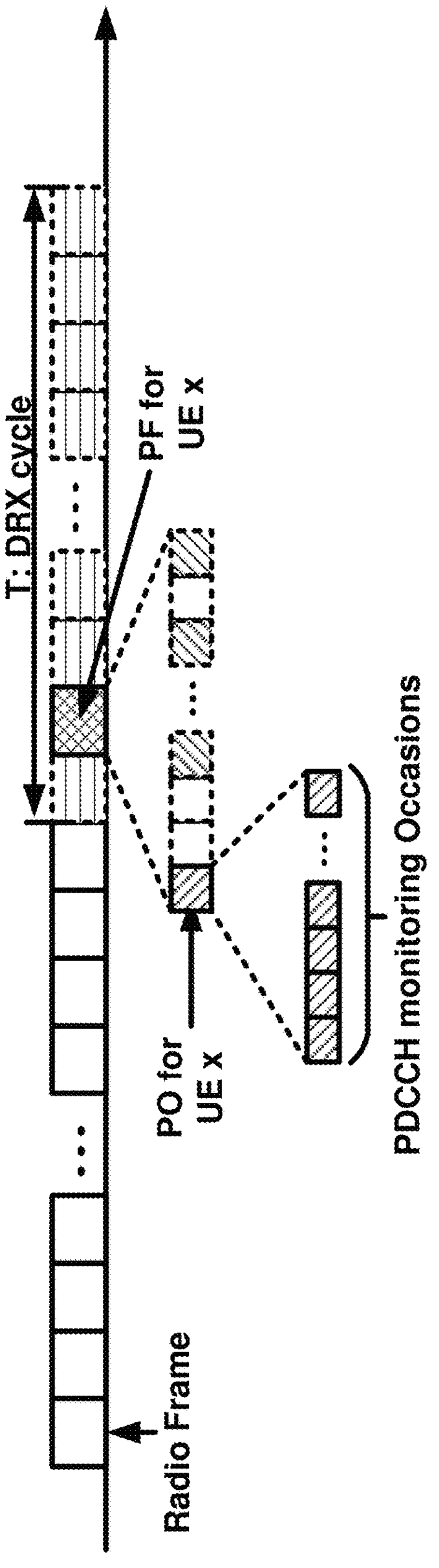
FIG. 28A and FIG. 28B illustrate examples of paging, according to some embodiments.

FIG. 28A shows an example of paging reception (or monitoring). In an example, a wireless device may use DRX for paging monitoring in RRC_IDLE and RRC_INACTIVE state in order to reduce power consumption. The wireless device may monitor a PO per DRX cycle. As shown in FIG. 28A, a DRX cycle may have a length (T) of radio frames, which may be configured in the PCCH configuration. A PO may comprise a set of PDCCH monitoring occasions. A PO may consist of multiple time slots (e.g., subframe or OFDM symbol) where paging DCI can be sent. One Paging Frame (PF) may be one Radio Frame and may contain one or multiple PO(s) or starting point of a PO.

In an example, a wireless device may determine a radio frame for a PF based on configuration parameters (e.g., T, N, PF_offset) of the PCCH configuration and an identifier (UE_ID) of the wireless device. The wireless device may determine whether a radio frame with a radio frame number (SFN) comprises a PF, for the wireless device, based on whether (SFN+PF_offset) mod T=(T div N)*(UE_ID mod N).

In an example, a wireless device, in each PF, may determine an index (i_s) of a PO based on configuration parameters (e.g., N, Ns) of the PCCH configuration and the identifier (UE_ID) of the wireless device. The wireless device may determine the index (i_s) of the PO as floor (UE_ID/N) mod Ns.

In an example, a UE_ID of a wireless device may be determined based on 5G-S-TMSI of the wireless device. 5G-S-TMSI may be a 48 bit long bit string. In the formulae above (PF calculation and PO calculation), 5G-S-TMSI may be interpreted as a binary number where the left most bit represents the most significant bit. If the wireless device has no 5G-S-TMSI, e.g., when the wireless device has not yet registered onto the network, the wireless device may use UE_ID=0 as default identity in determination of the PF and i_s.

In an example, after determining the PO and the PF in a DRX cycle, the wireless device may determine PDCCH monitoring occasions. The wireless device may determine the PDCCH monitoring occasions for paging based on PDCCH configuration parameters for the paging in SIB1. The PDCCH configuration parameters for the paging may comprise at least one of: pagingSearchSpace, firstPDCCH-MonitoringOccasionOfPO and nrofPDCCH-MonitoringOccasionPerSSB-InPO, etc.

In an example, When SearchSpaceId=0 is configured for pagingSearchSpace, the PDCCH monitoring occasions for paging may be same as for other system information (e.g., RMSI) reception. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

In an example, When SearchSpaceId other than 0 is configured for pagingSearchSpace, the wireless device may monitor the (i_s+1)th PO, wherein i_s is determined based on example embodiments described above. In an example, a PO may comprise a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise.

In an example, a [x*S+K]th PDCCH monitoring occasion for paging in the PO may correspond to the Kth transmitted SSB, where x=0, 1 . . . , X−1, K=1, 2 . . . , S.

In an example, the PDCCH monitoring occasions for paging which do not overlap with UL symbols (determined according to tdd-UL-DL-ConfigurationCommon) may be sequentially numbered from zero starting from the first PDCCH monitoring occasion for paging in the PF. When firstPDCCH-MonitoringOccasionOfPO is present, the starting PDCCH monitoring occasion number of (i_s+1)th PO may be the (i_s+1)th value of the firstPDCCH-MonitoringOccasionOfPO parameter; otherwise, it is equal to i_s*S*X. If X>1, when the wireless device detects a PDCCH transmission addressed to P-RNTI within its PO, the wireless device may be not required to monitor the subsequent PDCCH monitoring occasions for this PO.

In an example, in multi-beam operations, the wireless device may determine that the same paging message and the same Short Message are repeated in all transmitted beams. The selection of the beam(s) for the reception of the paging message and Short Message may be up to UE implementation. The paging message may be same for both RAN initiated paging and CN initiated paging.

In an example, after determining the PDCCH monitoring occasions for a PO of a PF, the wireless device may monitor PDCCH for receiving a DCI scheduling a paging message. In response to receiving the DCI scheduling the paging message, the wireless device may retrieve the paging information. If the UE ID of the wireless device is comprised in the paging message, the wireless device may perform the subsequent processing. The wireless device may initiate RRC Connection Resume procedure upon receiving RAN initiated paging. If the wireless device receives a CN initiated paging in RRC_INACTIVE state, the wireless device may move to RRC_IDLE and inform NAS. If the UE ID of the wireless device is not comprised in the paging message, the wireless device may go back to sleep, e.g., without RRC state change (staying in RRC_IDLE and/or RRC_INACTIVE state).

Figure 28B:
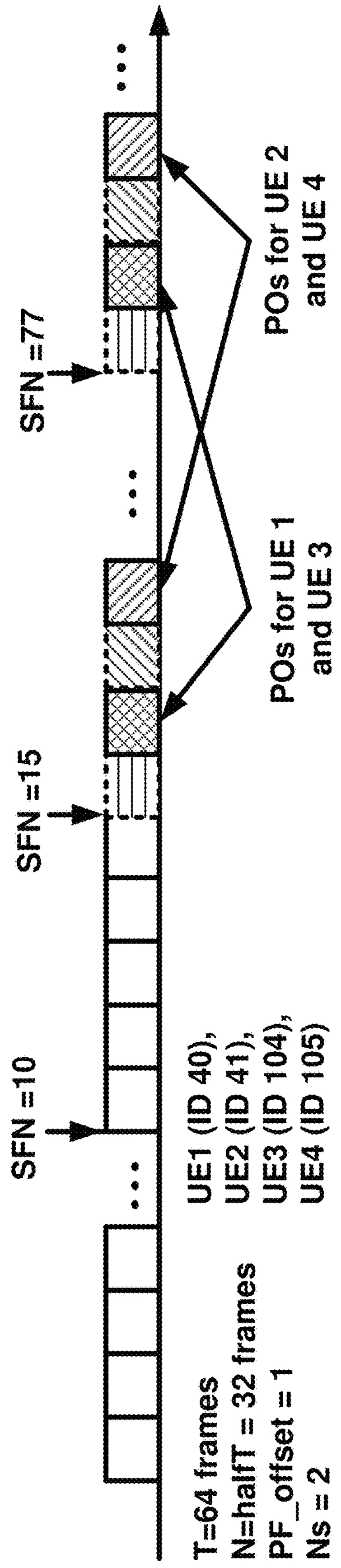

FIG. 28B shows an example of paging monitoring for different wireless devices. In an example, the configuration parameters of a PCCH may indicate that T=64 frames, N=32 frames (e.g., half frame), PF_offset=1 and Ns=2. As shown in FIG. 28B, there may be four wireless devices (e.g., UE1 with ID=40, UE2 with ID=41, UE3 with ID=104, UE4 with ID=105). Based on the example embodiments of FIG. 28A, each wireless device may determine a PO of a PF in each DRX cycle. In an example, UE1 may monitor PO in SFN=16 of a first DRX cycle and PO in SFN=78 of a second DRX cycle. UE 2 may monitor PO in SFN=18 of the first DRX cycle and PO in SFN=80 of the second DRX cycle. As shown in FIG. 28B, UE3 may share the same PO with UE1, UE4 may share the same PO with UE2, based on the PO and PF calculation formulas as shown above. Sharing a same PO of a PF with multiple wireless devices grouped based on UE_IDs and PCCH configuration parameters may reduce signaling overhead of paging PDCCH transmission. Each wireless device within the same group (e.g., sharing the same PO in the same PF) may further check whether the wireless device is paged based on whether the paging message, scheduled by the paging DCI received in the PO, comprises the UE ID of the wireless device.

In an example, based on PF and PO determination formula shown above, a wireless device may wake up to monitor a PO (e.g., comprising time/frequency synchronization, blind PDCCH decoding, PDSCH reception for paging message, etc.) periodically for each DRX cycle, even if the base station has not paging message for the wireless device. In some system, a possibility of a wireless device being paged may be as low as 10%. In such cases, the wireless device, in most time of paging monitoring occasions, may waste power for waking up although there is no paging message for the wireless device. Some technologies may improve the power consumption for paging monitoring by introducing a paging early indication (PEI) before the actual PO. The PEI may be a signal sequence, e.g., SSB/CSI-RS/TRS, etc. The PEI may be comprised in a DCI via a PDCCH. The PEI may indicate whether the wireless device shall wake up to monitor a paging PDCCH in a PO. In response to the PEI indicating that the wireless device shall monitor the PO, the wireless device may wake up to monitor the PO. Otherwise, the wireless device may skip monitoring the PO. Based on this technology, the base station may dynamically indicate whether a wireless device shall monitor a PO. The wireless device may reduce power consumption for receiving a paging message. In an example, a wireless device may have different behavior when the wireless device does not detect the PEI.

Figure 29A:
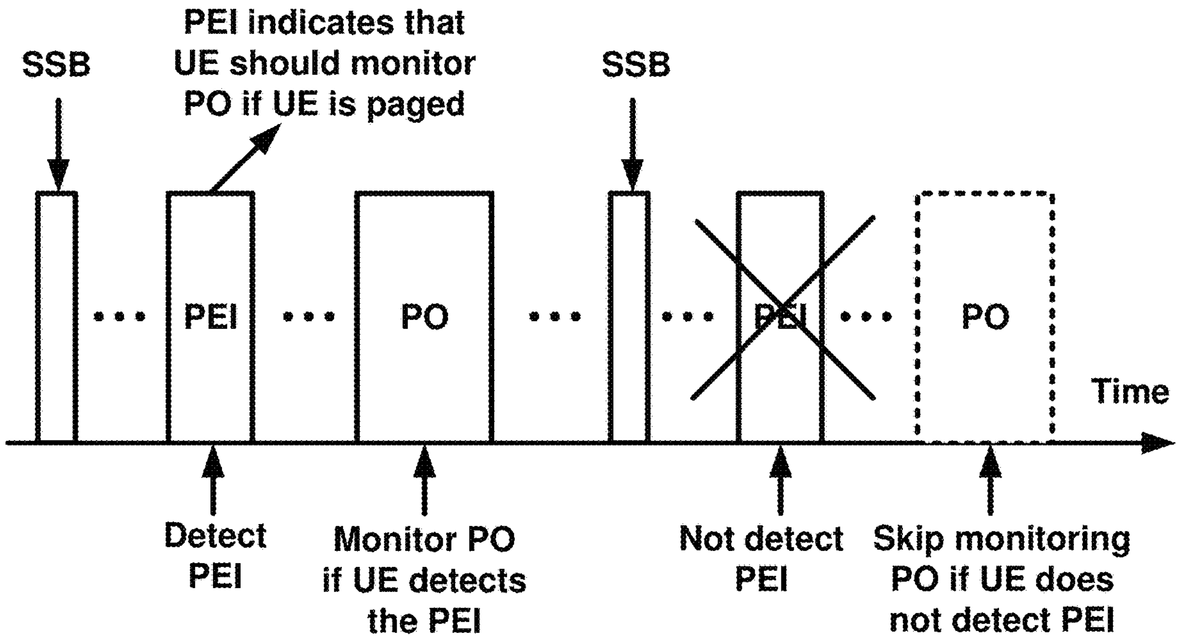
FIG. 29A and FIG. 29B illustrate examples of PEI based paging, according to some embodiments.

FIG. 29A shows an example of PEI processing. In an example, a wireless device may monitor a PEI (e.g., a signal sequence, or a PDCCH) in a monitoring occasion before a PO (e.g., the PO may be determined based on example embodiments described above with respect to FIG. 28A and/or FIG. 28B). In response to receiving the PEI indicating that the wireless device shall monitor the PO (e.g., in case the base station decides that the wireless device is paged), the wireless device may monitor the PO according to the PCCH configuration. In an example, the wireless device may not receive the PEI, e.g., in case the base station decides not to page the wireless device. In response to not detecting/receiving the PEI, the wireless device may skip monitoring the PO. Not transmitting the PEI (or skipping the PEI on purpose), in case that there is no wireless device to be paged, may reduce signal overhead of the base station and/or reduce collision of the PEI transmission with other downlink signal (PDCCH/PDSCH) transmission. Not monitoring the PO (or skipping monitoring the PO), in case no PEI is detected, by the wireless device, may reduce power consumption of the wireless device.

Figure 29B:
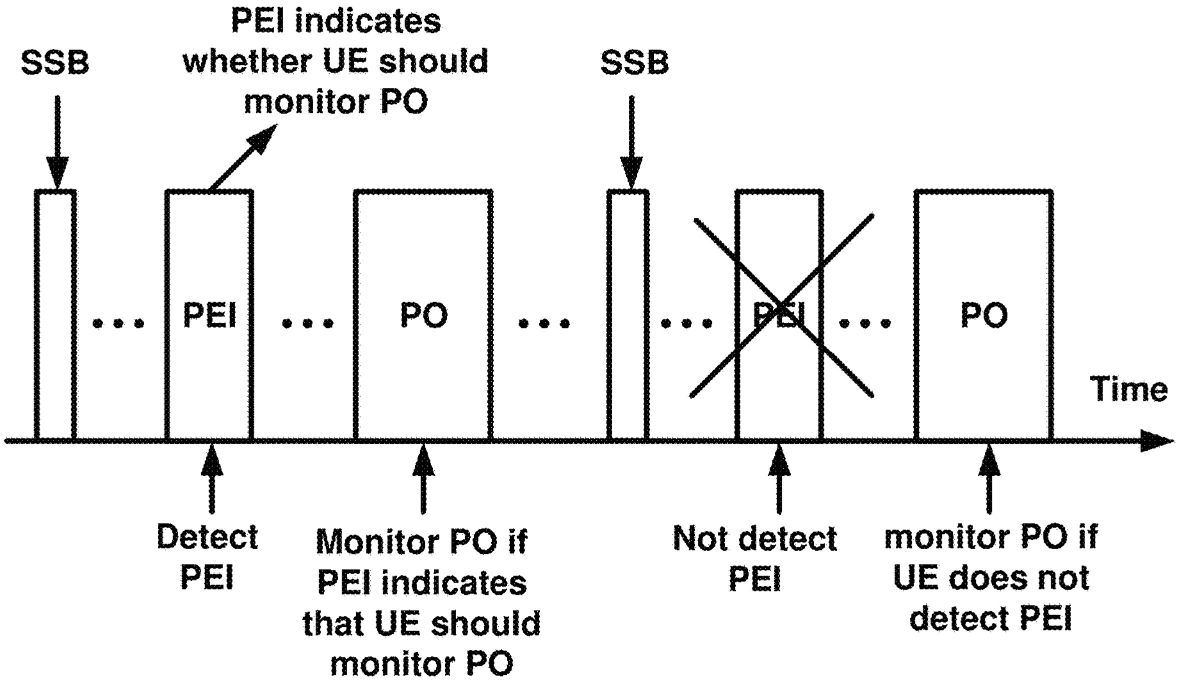

FIG. 29B shows an example of PEI processing. In an example, a wireless device may monitor a PEI (e.g., a signal sequence, or a PDCCH) in a monitoring occasion before a PO (e.g., the PO may be determined based on example embodiments described above with respect to FIG. 28A and/or FIG. 28B). In response to receiving the PEI indicating that the wireless device shall monitor the PO (e.g., in case the base station decides that the wireless device is paged), the wireless device may monitor the PO according to the PCCH configuration. In response to receiving the PEI indicating that the wireless device shall not monitor the PO (e.g., in case the base station decides that the wireless device is not paged), the wireless device may skip monitoring the PO. In an example, the wireless device may not receive the PEI, e.g., in case the base station decides to drop the transmission of the PEI due to collision with other channels. In response to not detecting/receiving the PEI, the wireless device may monitor the PO according to the PCCH configuration. Not transmitting, by the base station, the PEI in case that there is collision of the PEI transmission with other downlink signal (PDCCH/PDSCH) transmission, may reduce collision of the PEI transmission with the other downlink signals. Monitoring the PO, in case the PEI is not detected, may reduce paging latency for the wireless device.

In a 5G system, a base station may transmit SSBs with multiple beams. For each SSB transmission of a plurality of SSB transmissions, a base station may transmit a paging DCI over a plurality of PDCCH monitoring occasions, to increase reliability of the delivery of the paging DCI to a wireless device. A SSB transmission may be implemented based on example embodiments described above with respect FIG. 11A, FIG. 11B, FIG. 24A, FIG. 24B and/or FIG. 25. To facilitate the wireless device to monitor the paging PDCCH correctly, the base station may configure (e.g., in SIB1 message) a first number (e.g., X) indicating a quantity of PDCCH monitoring occasions per SSB, of the plurality of SSBs, in a paging occasion (e.g., nrofPDCCH-MonitoringOccasionPerSSB-InPO IE as shown in FIG. 25) and a second number (e.g., S) of actual transmitted SSBs (e.g., ssb-PositionsInBurst IE as shown in FIG. 25). Based on the first number and the second number, the wireless device may determine the total number of PDCCH monitoring occasions in the paging occasion as X*S. In addition, the base station may further indicate a time offset (e.g., firstPDCCH-MonitoringOccasionOfPO as shown in FIG. 25) indicating the starting PDCCH monitoring occasion, of the total number of PDCCH monitoring occasions, related to the starting frame of the paging occasion. Based on the nrofPDCCH-MonitoringOccasionPerSSB-InPO, ssb-PositionsInBurst and firstPDCCH-MonitoringOccasionOfPO, the wireless device may determine correct PDCCH monitoring occasions for receiving the paging DCI scheduling a paging message for the wireless device.

In an example, to further reduce power consumption of a wireless device for monitoring a paging PDCCH for receiving a paging message, there are some proposals (e.g., as shown in FIG. 29A and/or FIG. 29B) introducing a paging early indication (PEI), before the paging occasion, indicating whether the wireless device may skip monitoring the paging PDCCH. For improving reliability of the PEI transmission in high frequency scenarios, the base station may transmit the PEI with multiple beams.

In this disclosure, a PDCCH monitoring occasion (MO) for receiving the PEI (comprised in a DCI) may be referred to as a PEI PDCCH MO. A PDCCH MO for receiving the paging DCI may be referred to as a paging PDCCH MO.

In an example, a base station may configure a starting PEI PDCCH MO (e.g., firstPDCCH-MonitoringOccasionOfPEI) of a plurality of PEI PDCCH MOs for receiving a PEI in a PEI occasion. The starting PEI PDCCH MO may be separately configured from the starting paging PDCCH MO (e.g., firstPDCCH-MonitoringOccasionOfPO) of a plurality of paging PDCCH MOs for receiving a paging DCI in a paging occasion. Each PEI PDCCH MO corresponds to a respective SSB of a plurality of SSBs. However, existing technologies may not support multiple PEI PDCCH MOs being configured in a single SSB. Existing technologies may reduce transmission opportunities of a PEI in a SSB and therefore increase PEI transmission latency.

In an example, implementing existing technologies, a base station may configure (e.g., in SIB1 message) a first number (e.g., nrofPDCCH-MonitoringOccasionPerSSB-In-PEI) indicating a quantity of PEI PDCCH MOs, per SSB of a plurality of SSBs, for receiving a PEI in a PEI occasion. The first number may be separately configured from a second number (e.g., nrofPDCCH-MonitoringOccasion-PerSSB-InPO) indicating a quantity of paging PDCCH MOS, per SSB of a plurality of SSBs, for receiving a paging DCI in a paging occasion. However, separately configuring two values, comprising first value indicating a quantity of PEI PDCCH MOs per SSB for the PEI and second value indicating a quantity of paging PDCCH MOs per SSB for the paging, may increase signaling overhead for SIB1 message transmission, since the SIB1 message is broadcasted to all wireless devices in the cell and is transmitted with a limited amount of radio resources. Existing technologies may increase signaling overhead and/or increase power consumption of a wireless device for detecting the SIB1 message.

Therefore, there is a need to improve reliability of PEI transmission when multiple SSBs are configured and/or improve signaling overhead for SIB1 transmission for configuring the PEI parameters and/or reduce power consumption of a wireless device for receiving the SIB1 message.

Example embodiments may comprise receiving by a wireless device and/or transmitting by a base station, SIB1 messages comprising configuration parameters for a PEI. The configuration parameters may comprise a first number indicating a quantity of PDCCH MOs, per SSB of SSBs, in a paging occasion. The configuration parameters may comprise a first location of a starting PDCCH MO of PDCCH MOs of a PEI occasion and a second location of a starting PDCCH MO of PDCCH MOs of the paging occasion. The wireless device may monitor, starting from the first location and over a second number of the PDCCH MOs of the PEI occasion, a first PDCCH (e.g., a PEI PDCCH). The second number is determined based on the first number and a quantity of the SSBs. For example, the second number may be a product of the first number by the quantity. The wireless device may receive a PEI based on monitoring the first PDCCH. In an example, the wireless device, in response to receiving the PEI indicating to monitor the paging occasion (or indicating to monitor a second PDCCH for receiving a paging DCI), may monitor, starting from the second location and over the second number of the PDCCH MOs of the paging occasion, a second PDCCH. The wireless device may receive a DCI scheduling a paging message for the wireless device, during monitoring the second PDCCH. In an example, the wireless device, in response to receiving the PEI indicating not to monitor the paging occasion, may skip monitoring, starting from the second location and over the second number of the PDCCH MOs of the paging occasion, the second PDCCH.

In the example embodiment, the wireless device may determine that the total number of the PEI PDCCH MOs in a PEI occasion is same as the total number of paging PDCCH MOs in a paging occasion, when multiple PDCCH MOs are supported in a single SSB of a plurality of SSBs. In the example embodiment, the base station may determine that the total number of the PEI PDCCH MOs in the PEI occasion is same as the total number of the paging PDCCH MOs in the paging occasion, when multiple PDCCH MOs are supported in a single SSB of a plurality of SSBs. In the example embodiment, the total number of the PDCCH MOs for the PEI occasion or for the paging occasion are determined as a multiplication of a number (S) of SSBs and a number (X) of PDCCH MOs per SSB, wherein S and X are configured in SIB1 message.

By implementing example embodiments, the base station may reduce signaling overhead for configuring parameters of PEI, e.g., by configuring a single value (X) for both the PEI and the paging, therefore reducing power consumption of a wireless device for receiving the SIB1 message. By implementing example embodiments, the base station may configure separate starting PDCCH MOs for the PEI occasion and the paging occasion to flexibly adjust the transmission time of the PEI and the paging DCI in different radio frames.

Figure 30:
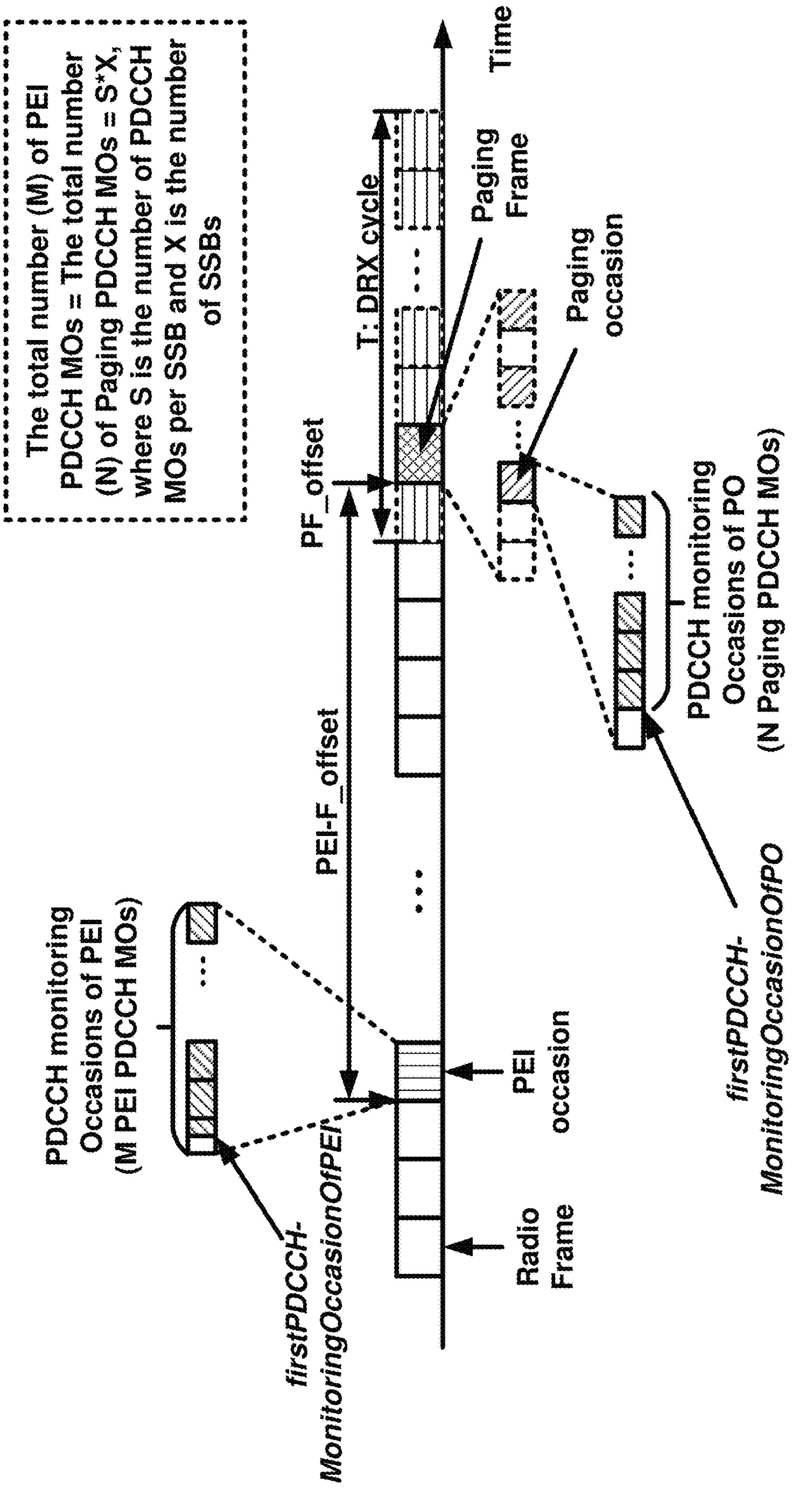
FIG. 30 illustrates an example embodiment of PDCCH monitoring for PEI.

FIG. 30 shows an example embodiment of PEI transmission for power saving. In an example, a base station may transmit to a wireless device an RRC message (e.g., MIB/SIB1/SIB2 message) comprising configuration parameters of a PEI occasion and a paging occasion. The configuration parameters may comprise a first number (e.g., S in FIG. 30) indicating a quantity of PDCCH MOs per SSB of a plurality of SSBs in a paging occasion. The first number may be implemented based on example embodiment of FIG. 25 (e.g., nrofPDCCH-MonitoringOccasionPerSSB-InPO). The configuration parameters may comprise a second number (e.g., X in FIG. 30) indicating a total number of actually transmitted SSBs. The wireless device may use S and X for determining a total number of PDCCH MOs both for the PEI occasion and the paging occasion (although the first number is configured only for the paging occasion).

In the example of FIG. 30, based on S and X, the wireless device may determine M PEI PDCCH MOs in the PEI occasion and N paging PDCCH MOs in the paging occasion, wherein M=N=S*X.

In an example, the configuration parameters may further comprise a location indication (e.g., firstPDCCH-MonitoringOccasionOfPEI as shown in FIG. 30) of the starting PDCCH MO of the M PEI PDCCH MOs. The configuration parameters may further comprise a location indication (e.g., firstPDCCH-MonitoringOccasionOfPO as shown in FIG. 30) of the starting PDCCH MO of the N paging PDCCH MOs.

In an example, the configuration parameters may further comprise a time offset (e.g., PEI-F_offset as shown in FIG. 30) between a staring frame of the paging occasion and a starting frame of the PEI occasion.

In an example, the configuration parameters may further comprise configuration parameters of a PEI search space and a paging search space. A search space may be implemented based on example embodiments described above with respect to FIG. 27.

In an example, the configuration parameters may further comprise parameters (e.g., T indicating paging/DRX cycle, PF_offset indicating paging frame offset, etc.) of the paging occasion, e.g., based on example embodiments described above with respect to FIG. 25.

In an example, based on the configuration parameters, the wireless device may determine the M PEI PDCCH MOs starting from the location indicated by the firstPDCCH-MonitoringOccasionOfPEI, as M=S*X. The wireless device may monitor the PEI PDCCH (or a PDCCH for receiving the PEI) via the PEI search space over the M PEI PDCCH MOs for receiving the PEI. The wireless device may receive a DCI comprising the PEI.

In an example, based on the configuration parameters, in response to receiving the PEI indicating to monitor the paging occasion (or monitor the paging PDCCH), the wireless device may determine the N paging PDCCH MOs starting from the location indicated by the firstPDCCH-MonitoringOccasionOfPO, as N=S*X. The wireless device may monitor the paging PDCCH (or a PDCCH for receiving the paging DCI) via the paging search space over the N paging PDCCH MOs for receiving the paging DCI. The wireless device may receive a DCI scheduling a paging message for the wireless device.

By implementing example embodiments, configuring a single value indicating a number of PDCCH MOs per SSB for a PEI occasion and a paging occasion and configuring two separate values for a starting PDCCH MO of PEI PDCCH MOs and a starting PDCCH MO of paging PDCCH MOs may enable the wireless device to correctly locate PEI PDCCH MOs and paging PDCCH MOs when multiple PDCCH MOs are supported in an SSB and when the base station has different signal (DL/UL, PDCCH/PDSCH/CSI-RS/SSBs) configurations in a PEI frame (where a PEI occasion occurs) and a paging frame.

In an example, when different radio frames are configured with different TDD formats, a PEI PDCCH occasion may overlap with uplink transmissions on a first symbol in the PEI frame. In an example, a paging PDCCH occasion may overlap with uplink transmission on a second symbol in the paging frame. The first symbol may not be at the same location within a PEI frame as the second symbol within a paging frame. In order to save power consumption of the wireless device for receiving the PEI when configured with TDD formats in a plurality of radio frames, there is a need to define the behavior of the wireless device for PDCCH monitoring for receiving the PEI.

In an example, based on the determined M PDCCH MOs of the PEI occasion (e.g., by implementing example embodiments described above with respect to FIG. 30), the wireless device may further determine whether a first PDCCH MO, among the M PDCCH MOs of the PEI occasion in the PEI radio frame, overlaps with first uplink transmissions according to TDD configuration parameters (e.g., tdd-UL-DL-ConfigurationCommon as shown in FIG. 25) indicated by RRC messages. In response to the first PDCCH MO overlapping with UL symbols (determined according to tdd-UL-DL-ConfigurationCommon), the wireless device may skip monitoring the first PDCCH MO of the M PDCCH MOs. The wireless device may sequentially number, the M PDCCH MOs after excluding PDCCH MOs overlapping with UL symbols, from zero starting from the starting PDCCH monitoring occasion (indicated by firstPDCCH-MonitoringOccasionOfPEI) for the PEI in the PEI occasion. The wireless device may, based on numbering the M PDCCH MOs, monitor the PDCCH for the PEI.

In an example, based on the determined N PDCCH MOs of the paging occasion (e.g., by implementing example embodiments described above with respect to FIG. 30), the wireless device may further determine whether a second PDCCH MO, among the N PDCCH MOs of the paging occasion in the paging radio frame, overlaps with second uplink transmissions according to TDD configuration parameters (e.g., tdd-UL-DL-ConfigurationCommon as shown in FIG. 25) indicated by RRC messages. In response to the second PDCCH MO overlapping with UL symbols (determined according to tdd-UL-DL-ConfigurationCommon), the wireless device may skip monitoring the second PDCCH MO of the N PDCCH MOs. The wireless device may sequentially number, the N PDCCH MOs after excluding PDCCH MOs overlapping with UL symbols, from zero starting from the starting PDCCH monitoring occasion (indicated by firstPDCCH-MonitoringOccasionOfPO) for the paging in the paging occasion. The wireless device may, based on numbering the N PDCCH MOs, monitor the paging PDCCH for the paging DCI in response to receiving the PEI indicating to monitor the paging PDCCH.

By implementing the example embodiments, the wireless device may determine whether a PEI PDCCH MO overlaps with UL symbols in a PEI occasion and separately and/or independently determine whether a paging PDCCH MO overlaps with UL symbols in a paging occasion, based on TDD configuration parameters of SIB1 message. Example embodiments may allow the base station to change TDD configurations in different radio frames (e.g., a first frame comprising the PEI occasion and a second frame comprising the paging occasion) and allow the wireless device to correctly locate PEI PDCCH MOs in the PEI frame (e.g., by omitting/skipping PDCCH monitoring on PEI PDCCH MO(s) overlapping with UL symbols) and correctly locate paging PDCCH MOs (e.g., by omitting/skipping PDCCH monitoring on paging PDCCH MO(s) overlapping with UL symbols) in the paging frame. Otherwise, by implementing existing technologies where the wireless device may perform the checking of whether a paging PDCCH MO overlaps with UL symbols in a paging frame comprising a paging occasion, the wireless device may incorrectly locate PEI PDCCH MOs in a PEI frame which may have different TDD configuration parameter from the paging frame. The existing technologies may not require the wireless device to perform the checking of whether a PEI PDCCH MO overlaps with UL symbols in the PEI frame comprising the PEI occasion.

In an example, 5G system may be used in connected industries which may require high flexibility, high productivity and efficiency, low maintenance cost, and high operational safety. Wireless devices in such environment may comprise pressure sensors, humidity sensors, thermometers, motion sensors, accelerometers, actuators, etc. The requirements for these services may be higher than LPWA (e.g., LTE-MTC/NB-IoT) but lower than URLLC and eMBB in current 5G system. In an example, a smart city vertical may cover data collection and processing to more efficiently monitor and control city resources, and to provide services to city residents. Surveillance cameras may be an essential part of the smart city, factories and/or industries. Wearables use case may comprise smart watches, eHealth related devices, personal protection equipment (PPE), and medical monitoring devices for use in public safety applications, etc. One characteristic for the use case may be that the device is small in size. A wireless device, deployed in connected industries, smart city vertical and/or wearable use cases, etc., may have limited capability compared with a normal wireless device (e.g., a wireless device capable of processing URLLC and/or eMBB). In this specification, a wireless device (e.g., used in connected industries, smart city vertical, wearable use cases, etc.) with limited capabilities, compared with a wireless device with normal capabilities, may be referred to as a reduced capability (RedCap) UE. The wireless device with normal capabilities may be referred to as a non-RedCap UE, or a NorCap UE equivalently.

FIG. 31 shows an example of capability comparison between a RedCap UE and a Non-RedCap UE. A RedCap UE may support a limited set of configurations due to implementation cost and power consumption consideration. In an example, a RedCap UE may be configured with at most one reception antenna, compared with a Non-RedCap UE configured with 2 or 4 reception antennas. A RedCap UE may support working within 20 MHz (e.g., in FR1), or 50 MHZ (e.g., in FR2), in contrast to a Non-RedCap UE supporting 100 MHz (in FR1) or 200 MHz (in FR2). A RedCap UE may be capable of relaxed processing PDSCH/PUSCH within 16~20 symbols, compared with the non-RedCap UE being capable of tightly processing PDSCH/PUSCH within 8~10 symbols. A RedCap UE may support at most 2 layers of MIMO transmission, compared with the non-RedCap UE supporting at most 4 layers of MIMO transmission. A RedCap UE may support half duplex FDD transmission in which case the UE is not able to transmit at a first frequency band and receive at a second frequency band simultaneously, compared with a non-RedCap UE supporting full duplex FDD transmission in which case the UE is able to transmit at a first frequency band and receive at a second frequency band simultaneously, etc.

In existing technologies, paging configuration (e.g., search space, CORESET, PCCH configuration) may be broadcasted to all wireless devices (e.g., via SIB1 as shown in FIG. 25, FIG. 26 and/or FIG. 27). A wireless device, in RRC_INACTIVE state or in RRC_IDLE state different from an RRC_CONNECTED state, is not connected to a base station, in which case, the base station may not be able to transmit wireless device specific messages to the wireless device. A wireless device, in RRC_INACTIVE state or in RRC_IDLE state, may periodically monitor PO in each DRX cycle based on the paging configuration and a UE_ID of the wireless device. To save power consumption for monitoring the PO, some existing technologies disclosed a paging early indication (PEI) based power saving mechanism.

In some existing technologies, a base station may transmit a PEI before transmitting a paging DCI scheduling a paging message for a wireless device or a group of wireless devices. The PEI may indicate that there is a paging message for the wireless device or the group of wireless devices. Based on receiving a PEI transmitted by a base station and before starting to monitor the PO, a wireless device may determine whether to skip monitoring the PO. The PEI may be transmitted as a signal sequence (e.g., SSB/CSI-RS/TRS), or in a DCI via a PDCCH.

In an example, the base station may transmit common RRC message (e.g., in SIB1) indicating configuration parameters (e.g., search space, CORESET, DCI format, etc.) of the PDCCH dedicated for the PEI. Due to the common RRC message being broadcasted, the configuration parameters of the PEI may be applied for all wireless devices in RRC_IDLE state or in RRC_INACTIVE state. The PEI configuration may be different from a wakeup (or power saving) configuration for a wireless device in RRC_CONNECTED state. The wakeup configuration for the wireless device in RRC_CONNECTED state may be transmitted in a wireless device specific RRC message.

In an example, a RedCap wireless device may be more power limited than a non-RedCap wireless device. The RedCap wireless device may implement a power saving operation for paging monitoring in RRC_INACTIVE state or in RRC_IDLE state. The RedCap wireless device may implement the PEI based power saving operation for paging monitoring.

However, due to limited capability of the RedCap wireless device, the RedCap wireless device, based on existing PEI based power saving operation, may not be able to receive the PEI. In an example, if the PEI is transmitted in frequency resources spread on a bandwidth greater than the maximum bandwidth supported by the RedCap wireless device, the RedCap wireless device may not receive/detect the PEI. In an example, if the PEI is transmitted in a search space with small aggregation level, the RedCap wireless device may not receive/detect the PEI due to reduced reception diversity gain caused by one reception antenna configured for the RedCap wireless device. In an example, if the gap between the PEI and the PO is shorter than the processing capability of the RedCap wireless device, the RedCap wireless device may not process quick enough to monitor the PO after receiving the PEI.

Given the capability differences of a RedCap wireless device and a non-RedCap wireless device, a single PEI configuration, e.g., broadcasted blindly to all wireless devices in RRC_IDLE state or RRC_INACTIVE state, may not be received by both the RedCap wireless device and the non-RedCap wireless device. The RedCap wireless device, based on existing PEI technologies, may miss-detect the PEI. Miss-detecting the PEI may increase latency of paging message delivery if the RedCap wireless device skips PO monitoring when the RedCap wireless device miss-detects the PEI and the PEI notifies the RedCap wireless device that there is a paging message for it. Miss-detecting the PEI may increase power consumption of the wireless device if the RedCap wireless device monitors the PO when the RedCap wireless devices miss-detects the PEI and the PEI notifies the RedCap wireless device that there is no paging message for it. There is a need to reduce power consumption and/or paging message latency for a RedCap wireless device when monitoring paging occasion(s).

In an example embodiment, for PEI transmission, a base station may configure separate initial BWPs on a cell, e.g., comprising a first initial BWP for configuration of PEI and paging for a RedCap wireless device and a second initial BWP for configuration of PEI and paging for a non-Redcap wireless device. A Redcap wireless device may receive both PEI and paging DCI on the first initial BWP of the cell. A non-Redcap wireless device may receive both PEI and paging DCI on the second initial BWP of the cell. The Redcap wireless device may not switch from the first initial BWP to the second initial BWP for receiving the PEI. The RedCap wireless device may not switch from the second initial BWP for receiving a paging DCI after receiving the PEI in the second initial BWP. A PEI search space may be configured on both the first initial BWP and the second initial BWP. When a wireless device is a RedCap wireless device, the wireless device may monitor a PEI PDCCH according to configuration parameters of the PEI search space on the first initial BWP. When a wireless device is a non-RedCap wireless device, the wireless device may monitor a PEI PDCCH according to configuration parameters of the PEI search space on the second initial BWP.

In an example embodiment, a base station may separate PEI configurations (search space, CORESET, DCI format, RNTI, etc.) for a RedCap wireless device and a non-RedCap wireless device. A RedCap wireless device may monitor a PEI based on a PEI configuration dedicated for the RedCap wireless device. In an example, a RedCap wireless device may be with lower paging rate than a non-RedCap wireless device, e.g., when the RedCap wireless device (e.g., sensor, camera, wearable device, etc.) has more uplink data transmission than downlink data transmission (or is uplink data centric). Example embodiment may improve power consumption of the RedCap wireless device.

In an example embodiment, a base station may configure different gaps between a PEI and a PO for different wireless device types (e.g., RedCap type, non-RedCap, etc.), e.g., based on different capabilities of the different wireless device types. Example embodiments may reduce possibility of miss-detecting a paging DCI after receiving a PEI for a RedCap wireless device.

In an example embodiment, a base station may configure different processing behaviors, when not detecting a PEI, for a RedCap type and a non-RedCap type. The base station may indicate that a RedCap wireless device skips monitoring a PO (or any PO in a PF) in response to not detecting a PEI. The RedCap wireless device, by skipping monitoring the PO in response to not detecting a PEI, may reduce power consumption for paging, e.g., when the RedCap wireless device is power limited and/or is uplink data centric. The base station may indicate that a non-RedCap wireless device monitors a PO (or any PO in a PF) in response to not detecting a PEI. A non-RedCap wireless device, by monitoring a PO (in a PF) in response to not detecting a PEI, may reduce latency of paging message delivery.

Figure 32:
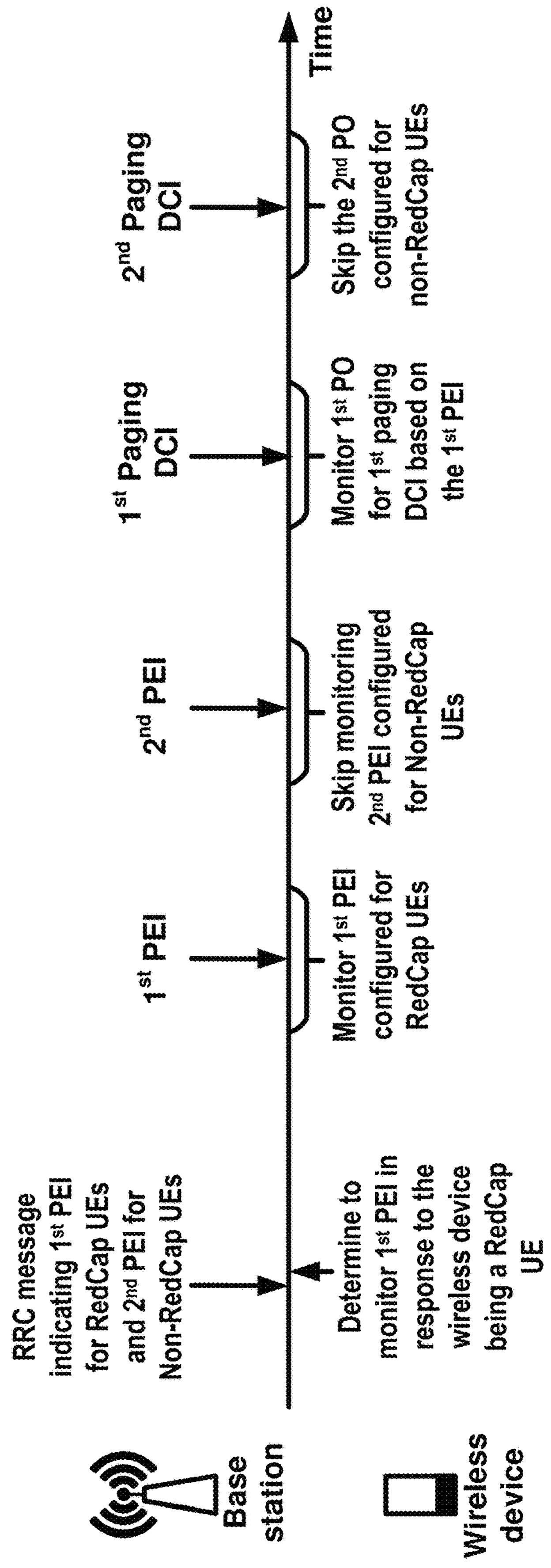
FIG. 32 illustrates an example of PEI based paging for a RedCap wireless device, according to some embodiments.

FIG. 32 shows an example embodiment of PEI based power saving for paging a wireless device. In an example embodiment, a base station may transmit to a wireless device (or a plurality of wireless devices), one or more RRC messages comprising configuration parameters of PEI configurations. The one or more RRC messages may be cell common messages comprising MIB, SIB1, SIB2, etc. The one or more RRC messages may be broadcasted to the plurality of wireless devices comprising the wireless device. The wireless device (or the plurality of wireless devices) may be in RRC_INACTIVE state or in RRC_IDLE state, based on example embodiments described above with respect to FIG. 6.

In an example embodiment, the PEI configurations may comprise at least a first PEI configuration dedicated for a RedCap wireless device type (or wireless device category) and second at least a second PEI configuration dedicated for a non-RedCap wireless device type (or wireless device category).

In an example embodiment, the configuration parameters of the at least first PEI configuration (dedicated for the RedCap wireless device type) may, for transmission of a first DCI comprising a first PEI, indicate: a first CORESET for a first PDCCH, one or more first SSBs associated with the first CORESET, one or more first search spaces, a first DCI format, a first PEI-RNTI dedicated for receiving the first PEI, a first time offset between the first PEI and a first PO. The first PO may be configured for the RedCap wireless device type. In an example, the first CORESET of the at least first PEI configuration may be predefined (or configured) as CORESET #0, e.g., to ensure that the RedCap wireless device, with limited capability on supported bandwidth, receives the first PEI. The first PEI may comprise a plurality of indications, each indication being associated with a group of wireless devices of the RedCap type and indicating whether the group of wireless devices shall monitor a PO.

In an example embodiment, the configuration parameters of the at least second PEI configuration (dedicated for the non-RedCap wireless device type) may, for transmission of a second DCI comprising a second PEI, indicate: a second CORESET for a second PDCCH, one or more second SSBs associated with the second CORESET, one or more second search spaces, a second DCI format, a second PEI-RNTI dedicated for receiving the second PEI, a second time offset between the second PEI and a second PO. The second PO may be configured for the non-RedCap wireless device type. The second PEI may comprise a plurality of indications, each indication being associated with a group of wireless devices of the non-RedCap type and indicating whether the group of wireless devices shall monitor a PO.

In an example embodiment, the one or more first search spaces may be associated with higher aggregation level (e.g., 8, 16, 32 etc.), compared with the one or more second search spaces. The one or more first search spaces may be configured with longer monitoring periodicity than the one or more second search spaces. The first PEI-RNTI may be different from the second PEI-RNTI.

In an example embodiment, by configuring two PEI configurations, one for RedCap wireless device type, another one for non-RedCap wireless device type, a base station may flexibly transmit a first PEI based on a first PEI configuration dedicated for the RedCap wireless device type, when the base station determines to page a RedCap wireless device, and/or transmit a second PEI based on a second PEI configuration dedicated for the non-RedCap wireless device type, when the base station determines to page a non-RedCap wireless device. The first PEI configuration may be configured such that the RedCap wireless device may receive/detect the first PEI. The second PEI configuration may be configured such that the non-RedCap wireless device may receive/detect the second PEI. The first PEI configuration and the second PEI configuration may be separately and/or independently configured. Example embodiments may improve PEI transmission robustness for a RedCap wireless device and/or PEI transmission efficiency for a non-RedCap wireless device.

Based on the example embodiment of FIG. 32, separating the PEI configurations between the RedCap wireless device and the non-RedCap wireless device may improve power consumption of the RedCap wireless device. A RedCap wireless device may have lower paging rate than a non-RedCap wireless device, e.g., when the RedCap wireless device (e.g., sensor, camera, wearable device, etc.) has more uplink data transmission than downlink data transmission. The RedCap wireless device, by implementing existing technologies, may unnecessarily monitor the PEI with a same monitoring periodicity as a non-RedCap wireless device even though the RedCap wireless device has lower paging rate than the non-RedCap wireless device.

In an example embodiment, based on the RRC messages, the wireless device may determine which one of the PEI configurations the wireless device shall monitor the PEI based on. In response to the wireless device being a RedCap wireless device, the wireless device may determine to monitor a first PEI based on the first PEI configuration. In response to the wireless device being a non-RedCap wireless device, the wireless device may determine to monitor a second PEI based on the second PEI configuration.

In an example, monitoring a PEI based on a PEI configuration may comprisc monitoring a PDCCH, for receiving a DCI comprising the PEI, on one or more search spaces of a CORESET. The RRC messages may indicate, in the PEI configurations, the DCI format and the RNTI associated with the DCI, the one or more search spaces and/or the CORESET. In this specification, a PDCCH, on which a DCI comprising a PEI is received, may be referred to as a PEI PDCCH. A PDCCH, on which a DCI scheduling paging message is received, may be referred to as a paging PDCCH. A PEI PDCCH and a paging PDCCH may be separately and independently configured. In an example, a PEI PDCCH may be associated with a paging PDCCH.

In an example, the wireless device may monitor the PEI PDCCH in a PEI PDCCH monitoring occasion of a plurality of PEI PDCCH monitoring occasions associated with a PF. The PEI PDCCH monitoring occasions for PEI may be sequentially numbered from zero starting from the first PEI PDCCH monitoring occasion for PEI in the PF. A total number of the PEI PDCCH monitoring occasions in a PF may be determined based on PDCCH configuration parameters of the first PEI configuration. An index of the PEI PDCCH monitoring occasion, from the plurality of PEI PDCCH monitoring occasions, may correspond to an index (i_s) of a PO associated with the wireless device. The index (i_s) of the PO may be determined based on example embodiments described above with FIG. 28A and/or FIG. 28B.

In an example embodiment, the base station may transmit RRC messages comprising starting (or first) PEI PDCCH monitoring occasion indications (firstPDCCH-MonitoringOccasionOfPEI) for a plurality of POs in a PF, each PO being associated with a respective one of the indications. The wireless device may determine that a starting PEI PDCCH monitoring occasion number of (i_s+1)th PO may be the (i_s+1)th value of the firstPDCCH-MonitoringOccasionOfPEI. The firstPDCCH-MonitoringOccasionOfPEI may be separately and independently configured from the firstPDCCH-MonitoringOccasionOfPO, e.g., based on example embodiments described above with respect to FIG. 30. The firstPDCCH-MonitoringOccasionOfPO, configured in a PCCH IE, may be used to determine a staring paging PDCCH monitoring occasion number.

In an example embodiment, a [x*S+K]th PEI PDCCH monitoring occasion for PEI corresponding to a PO may correspond to the Kth transmitted SSB, where x=0, 1 . . . , X−1, K=1, 2 . . . , S. S may be the number of actual transmitted SSBs determined according to ssb-PositionsInBurst in SIB1. X may be the nrofPDCCH-MonitoringOccasionPerSSB-InPO if configured or may be equal to 1 otherwise. S and X may be implemented based on example embodiments described above with respect to FIG. 25 and FIG. 30.

In an example, in response to receiving the PEI indicating to monitor a paging PDCCH, the wireless device may monitor the paging PDCCH over a number of PDCCH monitoring occasions of a paging occasion, e.g., based on example embodiments described above with respect to FIG. 25, FIG. 28A, FIG. 28B, and/or FIG. 30.

In an example, in response to receiving the PEI indicating not to monitor a paging PDCCH, the wireless device may skip monitoring the paging PDCCH over the number of PDCCH monitoring occasions of a paging occasion, e.g., based on example embodiments described above with respect to FIG. 25, FIG. 28A, FIG. 28B, FIG. 29A, FIG. 29B, and/or FIG. 30.

In an example embodiment, the wireless device may reuse firstPDCCH-MonitoringOccasionOfPO to determine the starting PEI PDCCH monitoring occasion and the starting paging PDCCH monitoring occasion. The wireless device may determine the starting PEI PDCCH monitoring occasion number, from a plurality of PEI PDCCH monitoring occasions, of (i_s+1)th PO may be the (i_s+1)th value of the firstPDCCH-MonitoringOccasionOfPO parameter. The wireless device may determine the starting paging PDCCH monitoring occasion number, from a plurality of paging PDCCH monitoring occasions, of (i_s+1)th PO may be the (i_s+1)th value of the firstPDCCH-MonitoringOccasionOfPO parameter.

In an example embodiment, as shown in FIG. 31, based on the determined PEI PDCCH monitoring occasion(s), search space(s), CORESET, DCI format and/or PEI-RNTI, the wireless device may monitor the PEI PDCCH for receiving the first PEI dedicated for the RedCap wireless device type. The wireless device, based on the wireless device being the RedCap wireless device type, may skip monitoring the second PEI dedicated for the non-RedCap wireless device type. In response to detecting the first PEI indicating that the wireless device shall monitor the PO (or indicating that there is a paging message for the wireless device), the wireless device may monitor the paging PDCCH for receiving a paging DCI in a corresponding PO (e.g., 1st PO, dedicated for the RedCap wireless device type) associated with the first PEI. The wireless device may skip monitoring the second PO dedicated for the non-RedCap wireless device type. In an example, the wireless device may receive the paging DCI during monitoring the paging PDCCH in the first PO. The wireless device may receive the paging message comprising the UE_ID of the wireless device, based on the paging DCI.

In an example, a wireless device may be a non-RedCap wireless device type. Based on the wireless device being the non-RedCap wireless device type, the wireless device may monitor the second PEI dedicated for the non-RedCap wireless device type and/or may skip monitoring the first PEI dedicated for the RedCap wireless device type. In response to detecting the second PEI indicating that the wireless device shall monitor the PO (or indicating that there is a paging message for the wireless device), the wireless device may monitor the paging PDCCH for receiving a paging DCI in a corresponding PO (e.g., 2nd PO, dedicated for the non-RedCap wireless device type) associated with the second PEI. The wireless device may skip monitoring the first PO dedicated for the RedCap wireless device type. In an example, the wireless device may receive the paging DCI during monitoring the paging PDCCH in the second PO. The wireless device may receive the paging message comprising the UE_ID of the wireless device, based on the paging DCI.

Based on example embodiments of FIG. 32, separating PEI configurations for a RedCap wireless device type (or a RedCap type) and a non-RedCap wireless device type (or a non-RedCap type) may allow a base station to flexibly allocate radio resources for PEI and paging. In an example, when there are small number of RedCap wireless devices, the base station may configure same parameters of PEI (and/or paging) configuration for a RedCap type and a non-RedCap type, which may be referred to as shared PEI with shared paging configuration. In an example, when PEI signaling overhead is a consideration of the base station, the base station may configure same parameters of PEI for both RedCap type and a non-RedCap type and different parameters of paging for a RedCap type and a non-RedCap type, which may be referred to as shared PEI with separated paging. In an example, when paging signaling overhead is a consideration of the base station, the base station may configure separate parameters of PEI for a RedCap type and a non-RedCap type and same parameters of paging for a RedCap type and a non-RedCap type, which may be referred to as separated PEI with shared paging. In an example, when there are large number of RedCap wireless devices, the base station may configure different parameters of PEI (and/or paging) configuration for a RedCap type and a non-RedCap type, which may be referred to as separated PEI with separated paging configurations. FIG. 33A, FIG. 33B, FIG. 33C and FIG. 33D show various PEI and paging configurations based on example embodiment of FIG. 32.

Figure 33A:
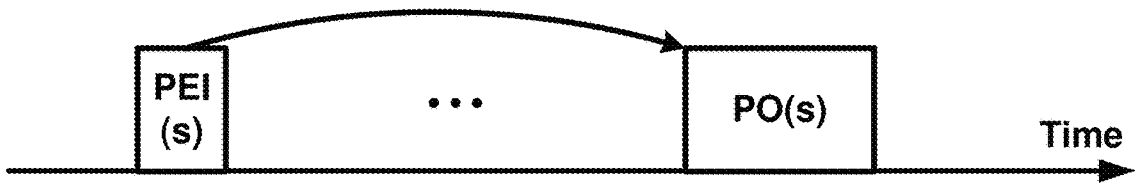
FIG. 33A, FIG. 33B, FIG. 33C and FIG. 33D illustrate example embodiments of PEI and PO configurations.

FIG. 33A shows an example embodiment of shared PEI with shared paging for a RedCap type and a non-RedCap type. In an example, a base station may transmit RRC messages (e.g., MIB, SIB1, etc.) comprising configuration parameters of first PEI/paging configuration for a RedCap type and second PEI/paging configuration for a non-RedCap type. The first PEI/paging configuration may be associated with same parameters as the second PEI/paging configuration. In an example, PEI PDCCH configuration of the first PEI may be same as PEI PDCCH configuration of the second PEI. In an example, PDCCH candidates for the first PEI may be different from PDCCH candidates for the second PEI, when configured with same CORESET and same search spaces. In an example, paging PDCCH configuration of the first paging may be same as paging PDCCH configuration of the second paging. In an example, when the base station determines shared PEI with shared paging for a RedCap type and a non-RedCap type, the base station may determine not to transmit the configuration parameters of the first PEI/paging configuration dedicated for the RedCap type. When the configuration parameters of the first PEI/paging configuration are absent in the RRC message, a wireless device may determine to use the configuration parameter of the second PEI/paging configuration regardless of whether the wireless device is a RedCap type or a non-RedCap type. Configuration of shared PEI with shared paging, based on example embodiment of FIG. 33A, may improve signaling overhead of the base station for PEI and paging.

Figure 33B:
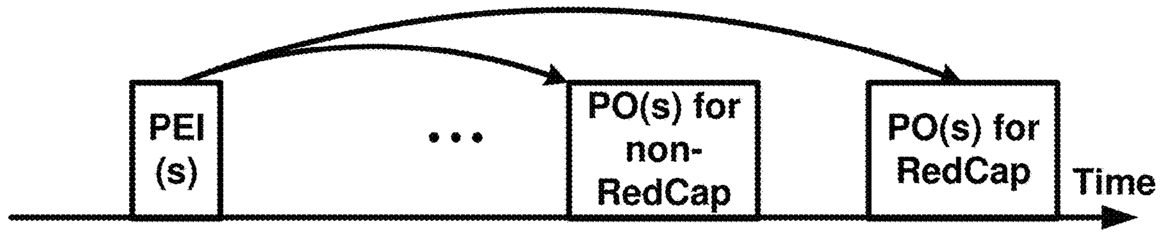

FIG. 33B shows an example embodiment of shared PEI with separate paging for a RedCap type and a non-RedCap type. In an example, a base station may transmit RRC messages (e.g., MIB, SIB1, etc.) comprising configuration parameters of first PEI/paging configuration for a RedCap type and second PEI/paging configuration for a non-RedCap type. The first PEI configuration may be associated with same parameters as the second PEI configuration. In an example, PEI PDCCH configuration of the first PEI may be same as PEI PDCCH configuration of the second PEI. The first paging configuration may be associated with different parameters as the second paging configuration. Paging PDCCH configuration of the first paging may be different from paging PDCCH configuration of the second paging. A wireless device may monitor the PEI PDCCH based on the PEI configuration regardless of whether the wireless device is a RedCap type or a non-RedCap type. Based on receiving the PEI indicating that there is a paging message for the wireless device, the wireless device may determine whether to monitor the first paging PDCCH or the second paging PDCCH based on whether the wireless device is a RedCap type or a non-RedCap type. Configuration of shared PEI with separated paging, based on example embodiment of FIG. 33B, may improve paging message delivery efficiency.

Figure 33C:
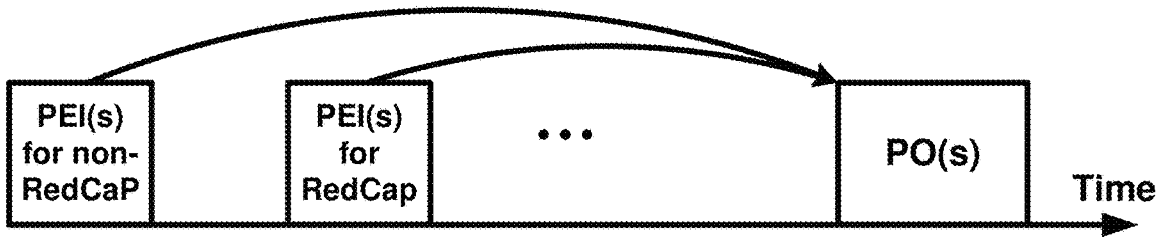

FIG. 33C shows an example embodiment of separated PEI with shared paging for a RedCap type and a non-RedCap type. In an example, a base station may transmit RRC messages (e.g., MIB, SIB1, etc.) comprising configuration parameters of first PEI/paging configuration for a RedCap type and second PEI/paging configuration for a non-RedCap type. The first PEI configuration may be associated with different parameters from the second PEI configuration. In an example, PEI PDCCH configuration of the first PEI may be different from PEI PDCCH configuration of the second PEI. The first paging configuration may be associated with same parameters as the second paging configuration. Paging PDCCH configuration of the first paging may be same as paging PDCCH configuration of the second paging. A wireless device may determine to monitor the first PEI or the second PEI based on whether the wireless device is a RedCap type or a non-RedCap type. Based on receiving the PEI indicating that there is a paging message for the wireless device, the wireless device may determine monitor the paging PDCCH regardless of whether the wireless device is a RedCap type or a non-RedCap type. Configuration of separated PEI with shared paging, based on example embodiment of FIG. 33C, may improve power consumption of a RedCap UE for monitoring PEI.

Figure 33D:
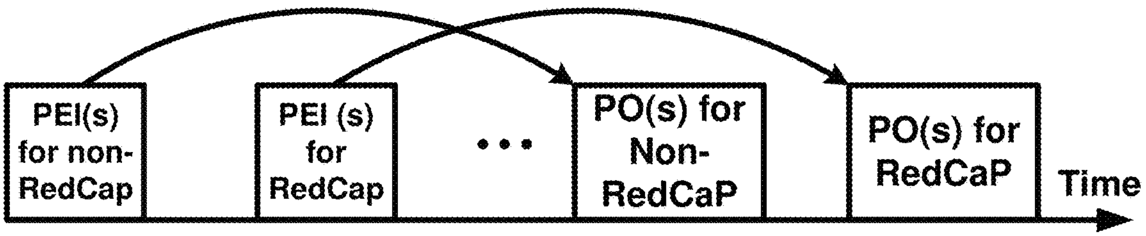

FIG. 33D shows an example embodiment of separated PEI with separated paging for a RedCap type and a non-RedCap type. In an example, a base station may transmit RRC messages (e.g., MIB, SIB1, etc.) comprising configuration parameters of first PEI/paging configuration for a RedCap type and second PEI/paging configuration for a non-RedCap type. The first PEI configuration may be associated with different parameters from the second PEI configuration. In an example, PEI PDCCH configuration of the first PEI may be different from PEI PDCCH configuration of the second PEI. The first paging configuration may be associated with different parameters from the second paging configuration. Paging PDCCH configuration of the first paging may be different from paging PDCCH configuration of the second paging. A wireless device may determine whether to monitor the first PEI or the second PEI based on whether the wireless device is a RedCap type or a non-RedCap type. Based on receiving the PEI indicating that there is a paging message for the wireless device, the wireless device may determine whether to monitor the first paging PDCCH or the second paging PDCCH based on whether the wireless device is a RedCap type or a non-RedCap type. Configuration of separated PEI with separated paging, based on example embodiment of FIG. 33D, may improve power consumption of a RedCap UE for monitoring PEI and PO.

In existing technologies, a first initial BWP of a cell may be configured for a RedCap wireless device for paging (e.g., paging search space, paging occasion, etc.) and RACH procedure, separately from a second initial BWP, which may be used for non-RedCap wireless device, of the cell. In existing technologies, PEI (associated with PEI search space, PEI MO etc.), different from paging and/or RACH procedure, may be configured only on the second initial BWP, of the cell, for non-RedCap wireless device. PEI and paging may be implemented based on example embodiments above with respect to FIG. 29A, FIG. 29B and/or FIG. 30.

However, regarding PEI, by implementing existing technologies, a wireless device may not be able to determine whether PEI is separately transmitted on different initial BWPs of the cell.

In an example, by implementing existing technologies, a RedCap wireless device may determine PEI (e.g., search space, PEI occasion, etc.) is configured on the second initial BWP of the cell, in which case, the RedCap wireless device may be required to monitor the PEI on the second initial BWP and then switch to the first initial BWP for receiving the paging DCI in response to receiving the PEI on the second initial BWP. Existing technologies may result in unnecessary power consumption for the RedCap wireless device for receiving a paging message.

In an example, by implementing existing technologies, a RedCap wireless device may determine PEI is configured on both the initial BWP and the second initial BWP of the cell, in which case, the RedCap wireless device and a non-RedCap wireless device may monitor (automatically) the PEI on both initial BWPs for receiving the PEI. Existing technologies may increase power consumption of a wireless device.

In an example, by implementing existing technologies, a RedCap wireless device may determine PEI and paging are configured on both the first initial BWP and the second initial BWP of the cell, e.g., without differentiation between RedCap and non-Redcap, in which case, the Redcap wireless device may monitor paging PDCCH on both the first initial BWP and the second initial BWP in response to receiving a PEI. Existing technologies may increase power consumption of a wireless device.

There is a need to reduce power consumption for PEI and paging reception when multiple initial BWPs are configured on a cell for RedCap wireless devices and non-RedCap wireless devices.

Example embodiments of FIG. 32, FIG. 33A, FIG. 33B, FIG. 33C, and/or FIG. 33D may be extended to improve power consumption of a RedCap UE for paging, when initial BWP of a cell is configured for paging.

Figure 34A:
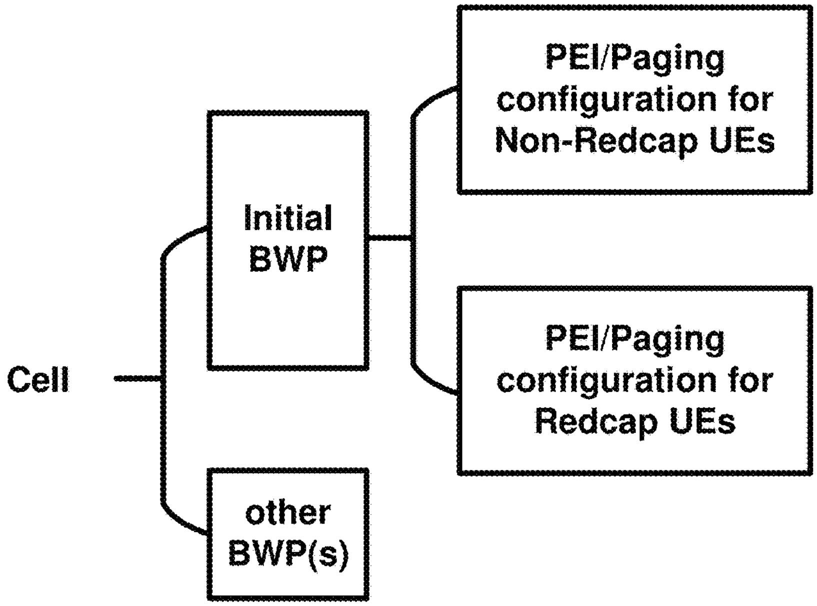
FIG. 34A and FIG. 34B illustrate example embodiments of PEI configurations.

FIG. 34A shows an example embodiment of PEI configurations (and/or paging configurations) for a RedCap type and a non-RedCap type on a same initial DL BWP of a cell (e.g., PCell, or PSCell). In an example embodiment, the base station may transmit RRC message (e.g., MIB, SIB1, etc.) comprising first PEI configuration (and/or paging configurations) for a RedCap type and second PEI configuration (and/or paging configurations) for a non-RedCap type on a same initial DL BWP. The SIB1 message may comprise a DownlinkConfigCommonSIB IE. The DownlinkConfigCommonSIB IE may comprise two PCCH-Config IEs. The first PEI configuration (and/or paging configurations) for a RedCap type may be comprised in a first PCCH configuration (e.g., 1st PCCH-Config IE). The second PEI configuration (and/or paging configurations) for a non-RedCap type may be comprised in a second PCCH configuration (e.g., 2nd PCCH-Config IE). 1st PCCH-Config IE and 2nd PCCH-Config IE may be comprised in SIB1 message. PEI-RNTI (configured or predefined) for the first PEI configuration may be different from PEI-RNTI (configured or predefined) for the second PEI. The base station may indicate that the 1st PCCH-Config IE is present based on indication parameters of the MIB. The base station may indicate that the 1st PCCH-Config IE is present based on one or more bit fields (e.g., a spare bit), of the MIB message, being set to a predefined value.

Figure 34B:
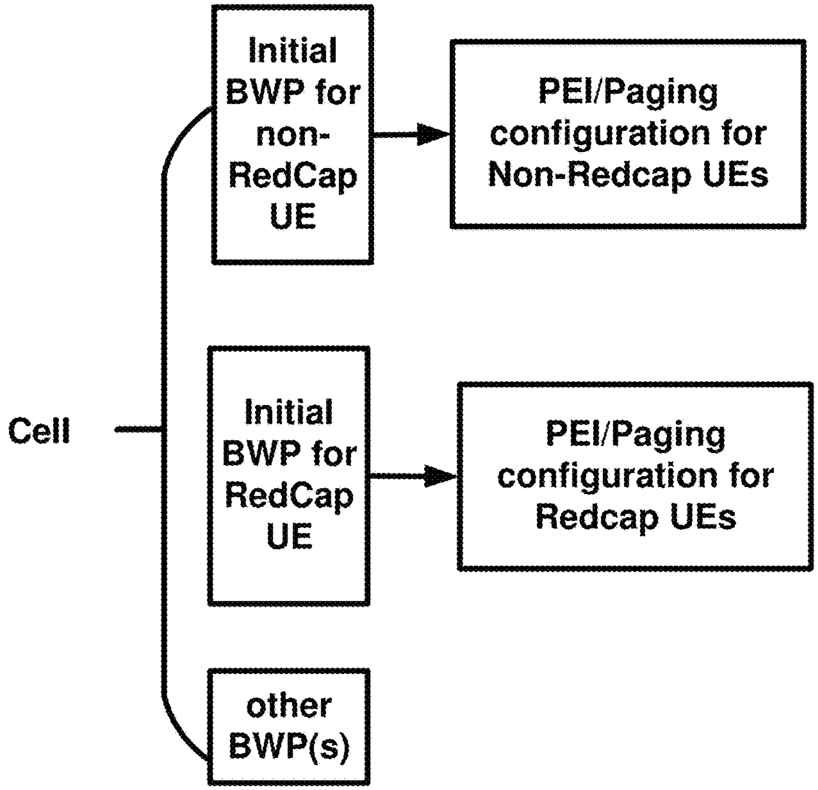

FIG. 34B shows an example embodiment of PEI configurations (and/or paging configurations) for a RedCap type and a non-RedCap type on different initial DL BWPs of a cell (e.g., PCell, or PSCell). In an example embodiment, the base station may transmit RRC message (e.g., MIB, SIB1, etc.) comprising first PEI configuration (and/or paging configurations) for a RedCap type and second PEI configuration (and/or paging configurations) for a non-RedCap type on different initial DL BWPs of the cell.

In an example, the SIB1 message may comprise two DownlinkConfigCommonSIB IEs. A first DownlinkConfigCommonSIB IE, of the two DownlinkConfigCommonSIB IEs, may indicate a first initial DL BWP for the RedCap type.

In an example, on the first initial DL BWP of the cell, the first DownlinkConfigCommonSIB IE may further indicate a first PCCH-Config IE for the RedCap type. The first PCCH-Config IE may comprise the first PEI configuration for the RedCap type.

In an example, a second DownlinkConfigCommonSIB IE, of the two DownlinkConfigCommonSIB IEs, may indicate a second initial DL BWP for the non-RedCap type.

In an example, on the second initial DL BWP of the cell, the second DownlinkConfigCommonSIB IE may further indicate a second PCCH-Config IE for the non-RedCap type. The second PCCH-Config IE may comprise the second PEI configuration for the non-RedCap type.

In an example, the first initial BWP for the RedCap type wireless device may be smaller than the second initial BWP for the non-RedCap type wireless device.

In an example, PEI-RNTI (configured or predefined) for the first PEI configuration may be same from PEI-RNTI (configured or predefined) for the second PEI configuration when the first PEI configuration and the second PEI configuration are on different initial DL BWPs.

In an example, the base station may indicate that the DownlinkConfigCommonSIB dedicated for the RedCap type is present based on indication parameters of the MIB. The base station may indicate that the DownlinkConfigCommonSIB dedicated for the RedCap type is present based on one or more bit fields (e.g., a spare bit), of the MIB message, being set to a predefined value.

In an example, in response to a wireless device being of the RedCap type, the wireless device may determine to use the first initial DL BWP for receiving a PEI and a corresponding paging DCI and paging message. In response to a wireless device being of the non-RedCap type, the wireless device may determine to use the second initial DL BWP for receiving a PEI and a corresponding paging DCI and paging message. In an example, a non-RedCap wireless device may not switch to the first initial DL BWP for receiving a PEI and/or a paging DCI/message. A RedCap wireless device may not switch to the second initial DL BWP for receiving a PEI and/or a paging DCI/message.

In the example embodiment, a wireless device may receive message indicating a first initial BWP of a cell comprising BWPs and a second initial BWP of the cell, wherein the first initial BWP is associated with a first wireless device type and the second initial BWP is associated with a second wireless device type. The wireless device may determine one of the first initial BWP and the second initial BWP based on a type of the wireless device, wherein the type is one of the first wireless device type and the second wireless device type. The wireless device may receive, via the determined initial BWP, both a PEI based on monitoring a PEI search space and a DCI scheduling a paging message in response to the PEI (e.g., indicating to monitor a paging PDCCH).

In the example embodiment, a wireless device may receive messages indicating configuration parameters of a PEI search space, a first initial BWP of a cell comprising BWPs and a second initial BWP of the cell, wherein the first initial BWP is associated with a first wireless device type and the second initial BWP is associated with a second wireless device type. The wireless device may determine one of the first initial BWP and the second initial BWP based on a type of the wireless device, wherein the type is one of the first wireless device type and the second wireless device type. The wireless device may, based on the type of the wireless device and via the determined initial BWP, receive a PEI based on monitoring the PEI search space according to the configuration parameters and receive, in response to the PEI, a DCI scheduling a paging message.

By implementing the example embodiments, based on a base station configuring PEI and paging on a same initial BWP and configuring different initial BWPs for different types (RedCap, non-RedCap, etc.) of wireless devices, a wireless device may stick to (e.g., without switching to another initial DL BWP) a same initial DL BWP for receiving a PEI and/or receiving a paging DCI scheduling a paging message for the wireless device in response to the PEI indicating to monitor a paging PDCCH. Example embodiments may allow the base station to transmit different PEIs on different initial DL BWPs for different types of wireless devices, without requesting the wireless devices to switch DL BWPs for receiving PEI and/or paging DCI/paging message. Example embodiments may increase PEI transmission overhead on different initial BWPs. With the increased PEI transmission overhead, example embodiments may reduce power consumption for RedCap wireless devices for receiving a paging message, given that the RedCap wireless devices are more power limited than non-RedCap wireless devices or the base station.

Example embodiments of FIG. 30, FIG. 32, FIG. 33A, FIG. 33B, FIG. 33C, FIG. 33D, FIG. 34A and/or FIG. 34B may be extended to improve power consumption of a RedCap UE for paging.

Figure 35:
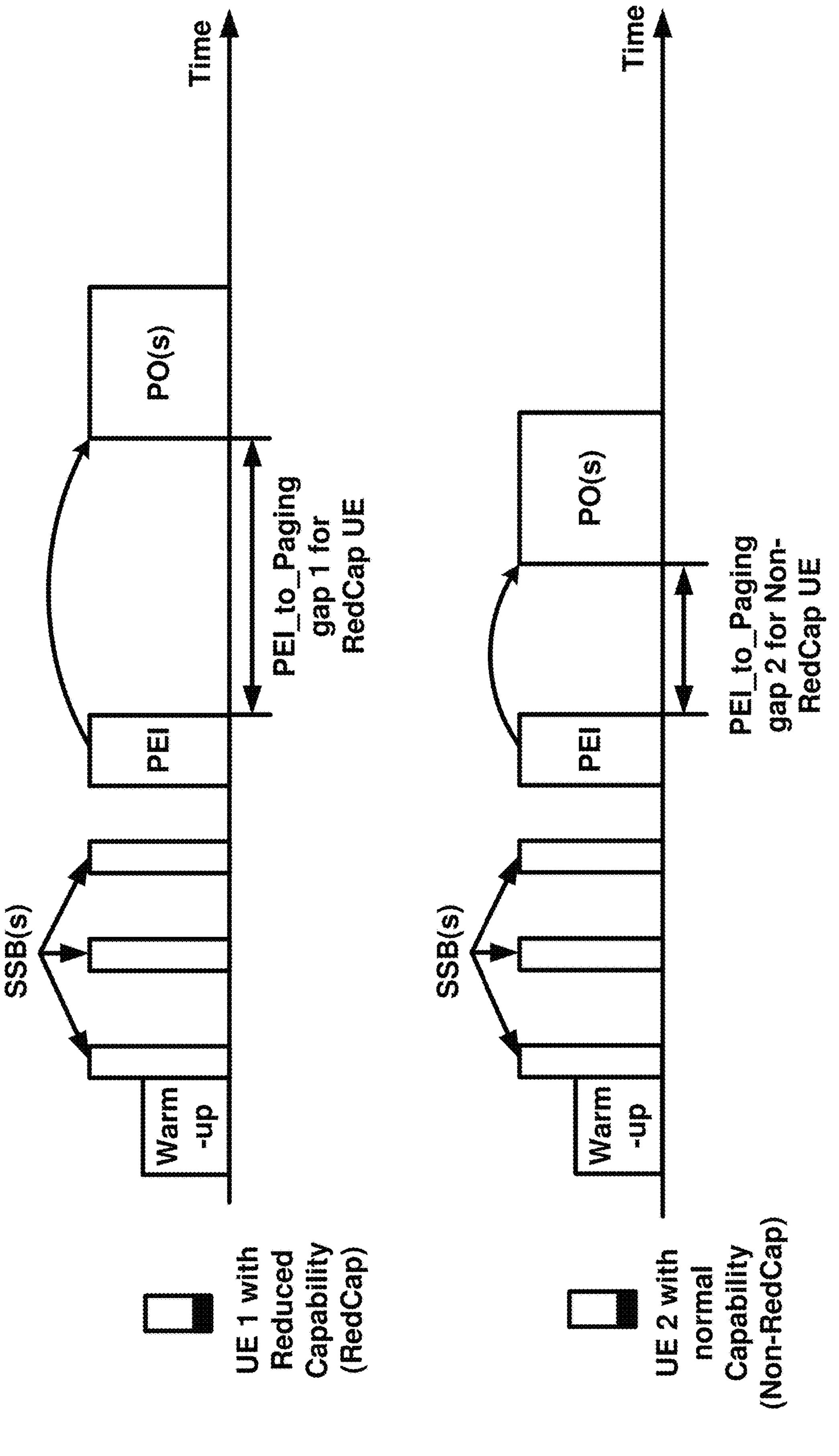
FIG. 35 illustrates an example of PEI based paging, according to some embodiments.

FIG. 35 shows an example embodiment of configuration of gap between a PEI and a PO for a RedCap type and a non-RedCap type. In an example, a base station may transmit (not shown in FIG. 35) RRC message (e.g., MIB, SIB1, etc.) comprising first PEI configuration (and/or paging configurations) for a RedCap type and second PEI configuration (and/or paging configurations) for a non-RedCap type. The first PEI (and/or paging) configuration and the second PEI (and/or paging) configuration may be implemented based on example embodiments described above with respect to FIG. 30, FIG. 32, FIG. 33A, FIG. 33B, FIG. 33C, FIG. 33D, FIG. 34A and/or FIG. 34B. In an example, a PEI configuration (the first PEI or the second PEI) may further indicate a gap between a PEI and a corresponding PO. The gap may be a number of slots (or symbols) between the last symbol of the last PEI PDCCH monitoring occasion and a first symbol of the starting paging PDCCH monitoring occasion.

In an example, the base station may configure a first gap, for a RedCap type, between a PEI and a corresponding PO, in the first PEI configuration. The base station may configure a second gap, for a non-RedCap type, between a PEI and a corresponding PO, in the second PEI configuration. In an example, the first gap may be greater than the second gap, e.g., due to limited processing capability of the RedCap type.

In an example, as shown in FIG. 35, a wireless device (e.g., UE1 with RedCap, or UE2 with non-RedCap) may warm up for preparing to monitor a PEI. The wireless device may warm up based on example embodiments described above with FIG. 28A and/or FIG. 28B. The wireless device may perform synchronization based on SSB(s). The wireless device may monitor the PEI based on the PEI configuration (e.g., the first PEI configuration or the second PEI configuration). The wireless device may monitor the PEI based on example embodiments described above with respect to FIG. 30, FIG. 32, FIG. 33A, FIG. 33B, FIG. 33C, FIG. 33D, FIG. 34A and/or FIG. 34B.

In response to receiving a PEI at a first slot, the wireless device may determine whether to apply the first gap or the second gap, for monitoring the PO, based on whether the wireless device is a RedCap type or a non-RedCap type. In response to the wireless device being the RedCap type (e.g., UE1 with RedCap), the wireless device may apply the first gap for monitoring the PO. The wireless device may monitor the PO starting at a second slot, wherein the time offset between the first slot and the second slot may be equal or greater than the first gap. In response to the wireless device being the non-RedCap type (e.g., UE2 with non-RedCap), the wireless device may apply the second gap for monitoring the PO. The wireless device may monitor the PO starting at a third slot, wherein the time offset between the first slot and the third slot may be equal or greater than the second gap.

Based on example embodiments of FIG. 35, a base station may flexibly configure different gaps between a PEI and a PO for different wireless device types (e.g., RedCap type, non-RedCap, etc.), e.g., based on different capabilities of the different wireless device types. Example embodiments may reduce possibility of miss-detecting a paging DCI after receiving a PEI for a RedCap wireless device.

Example embodiments of FIG. 30, FIG. 32, FIG. 33A, FIG. 33B, FIG. 33C, FIG. 33D, FIG. 34A, FIG. 34B and/or FIG. 35 may be extended to improve power consumption of a RedCap UE for paging.

Figure 36:
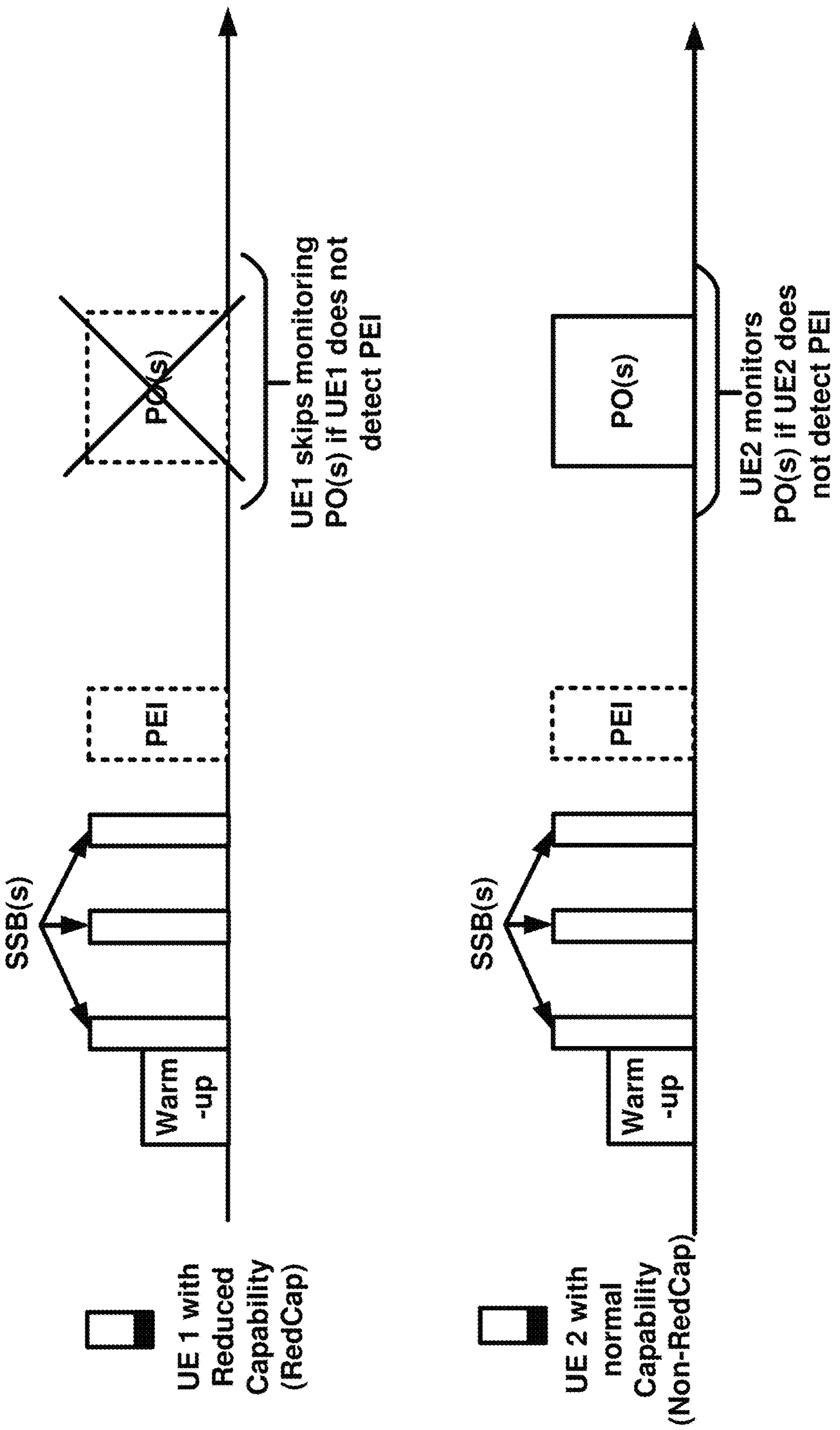
FIG. 36 illustrates an example embodiment of PEI based paging, according to some embodiments.

FIG. 36 shows an example embodiment of PEI detection for a RedCap type and a non-RedCap type. In an example, a base station may transmit (not shown in FIG. 36) RRC message (e.g., MIB, SIB1, etc.) comprising first PEI configuration (and/or paging configurations) for a RedCap type and second PEI configuration (and/or paging configurations) for a non-RedCap type. The first PEI (and/or paging) configuration and the second PEI (and/or paging) configuration may be implemented based on example embodiments described above with respect to FIG. 30, FIG. 32, FIG. 33A, FIG. 33B, FIG. 33C, FIG. 33D, FIG. 34A, FIG. 34B, and/or FIG. 35. In an example, the first PEI configuration may comprise a first parameter indicating whether the RedCap wireless device may skip monitoring a PO in response to not detecting a PEI. The second PEI configuration may comprise a second parameter indicating whether the non-RedCap wireless device may skip monitoring a PO in response to not detecting a PEI. The first parameter may be separately and/or independently configured from the second parameter. Configuring the wireless device's behavior of not detecting a PEI may align the base station with the wireless device regarding whether to monitor a PO in response to not detecting a PEI.

In an example, the base station may, based on a first value of the first parameter, indicate that the RedCap wireless device may skip monitoring a PO in response to not detecting a PEI (or any PEI before the corresponding PO), in the first PEI configuration. The base station may, based on a second value of the second parameter, indicate that the non-RedCap wireless device may monitor a PO in response to not detecting a PEI (or any PEI before the corresponding PO), in the second PEI configuration. Configuring different behaviors, when not detecting a PEI, for a RedCap type and a non-RedCap type, may improve power consumption and/or paging latency for a wireless device.

In an example embodiment, as shown in FIG. 36, a wireless device (e.g., UE1 with RedCap, or UE2 with non-RedCap) may warm up for preparing to monitor a PEI. The wireless device may warm up based on example embodiments described above with FIG. 28A and/or FIG. 28B. The wireless device may perform synchronization based on SSB(s). The wireless device may monitor the PEI based on the PEI configuration (e.g., the first PEI configuration or the second PEI configuration). The wireless device may monitor the PEI based on example embodiments described above with respect to FIG. 30, FIG. 32, FIG. 33A, FIG. 33B, FIG. 33C, FIG. 33D, FIG. 34A, FIG. 34B, and/or FIG. 35.

In an example embodiment, in response to not detecting the PEI, the wireless device may determine whether to skip monitoring a PO (or all POs in a PF) or monitor the PO based on whether the wireless device is a RedCap type or a non-RedCap type and based on RRC message. In response to the wireless device being a RedCap type (e.g., UE 1 with RedCap in FIG. 36), the wireless device may skip monitoring the PO(s) based on the RRC message indicating that a RedCap type wireless device shall skip monitoring the PO(s) in response to not detecting the PEI. In response to the wireless device being a non-RedCap type (e.g., UE 2 with non-RedCap in FIG. 36), the wireless device may monitor the PO(s) based on the RRC message indicating that a non-RedCap type wireless device shall monitor the PO in response to not detecting the PEI.

In an example embodiment, the base station may not configure the first parameter for a RedCap wireless device type. The first parameter may be absent in the RRC message. A RedCap wireless device may determine a default behavior, regarding monitoring PO, in response to not detecting a PEI, e.g., when the first parameter is absent in the RRC message. In an example embodiment, the RedCap wireless device may determine a first default behavior comprising skipping monitoring a PO (or any PO in a PF) in response to not detecting a PEI. In an example embodiment, the RedCap wireless device may determine a second default behavior comprising monitoring a PO (or any PO in a PF) in response to not detecting a PEI. The RedCap wireless device may determine to apply the first default behavior or the second default behavior by a predefined rule, or by configuration of the base station.

In an example embodiment, the base station may not configure the second parameter for a non-RedCap wireless device type. The second parameter may be absent in the RRC message. A non-RedCap wireless device may determine a default behavior, regarding monitoring PO, in response to not detecting a PEI, e.g., when the second parameter is absent in the RRC message. In an example embodiment, the non-RedCap wireless device may determine a default behavior comprising skipping monitoring a PO (or any PO in a PF) in response to not detecting a PEI. In an example embodiment, the non-RedCap wireless device may determine a default behavior comprising monitoring a PO (or any PO in a PF) in response to not detecting a PEI. The default behavior of the non-RedCap wireless device may be same as or different from the default behavior of the RedCap wireless device. The non-RedCap wireless device may determine to apply the first default behavior or the second default behavior by a predefined rule, or by configuration of the base station.

Based on the example embodiment of FIG. 36, a RedCap wireless device, by skipping monitoring a PO (or any PO in a PF) in response to not detecting a PEI, may reduce power consumption for paging, e.g., when the RedCap wireless device is power limited and/or is uplink data centric. Based on the example embodiment, a non-RedCap wireless device, by monitoring a PO (in a PF) in response to not detecting a PEI, may reduce latency of paging message delivery.

In an example embodiment, a base station may transmit, and/or a wireless device may receive, message indicating first parameters of a first PEI associated with a first wireless device type and second parameters of a second PEI associated with a second wireless device type. In response to the wireless device being the first wireless device type and based on the first parameters, the wireless device may monitor a first PDCCH for the first PEI. The wireless device may monitor, based on the first PEI, a first PO for a paging message. In response to the wireless device being the second wireless device type and based on the second parameters, the wireless device may monitor a second PDCCH for the second PEI. The wireless device, based on the second PEI, monitors a second PO for a paging message. The wireless device may receive the paging message comprising an identification of the wireless device.

In an example embodiment, the first parameters may indicate that the first PEI is configured with the wireless device in a RRC IDLE state or a RRC INACTIVE state. The message may comprise at least one of a MIB message and a SIB1 message.

In an example embodiment, the first parameters may indicate at least one of: a first control resource set for the first PDCCH associated with the first PEI, one or more first search spaces for the first PDCCH and a first time offset between the first PEI and the first PO.

In an example embodiment, the first control resource set may be associated with a control resource set index identifying the first control resource set. The first control resource set may be associated with at least one of: a frequency resource indication, a time domain duration indication and an indication of CCE to REG mapping type.

In an example embodiment, each of the one or more first search spaces may be associated with at least one of: a search space index identifying the search space, a control resource set index identifying a control resource set associated with the search space, one or more time domain resource allocation parameters of the search space, a search space type and a number of aggregation levels for the search space. The one or more time domain resource allocation parameters may comprise at least one of: a periodicity value of the first PDCCH, a slot offset of a starting point of the first PDCCH and a number of symbols of the first PDCCH.

In an example embodiment, the second parameters may comprise at least one of: a second control resource set for the second PDCCH associated with the second PEI, one or more second search spaces for the second PDCCH and a second time offset between the second PEI and the second PO.

In an example embodiment, the first control resource set may be same as the second control resource set. The one or more first search spaces may be same as the one or more second search spaces. The first time offset may be same as the second time offset.

In an example embodiment, the message may further comprise first parameters of the first PO associated with a first wireless device type and second parameters of the second PO associated with a second wireless device type.

In an example embodiment, the first parameters may comprise at least one of: a paging cycle, a number of paging frames in the paging cycle, a paging frame offset in the paging cycle, a number of total POs comprising the first PO in a paging frame, and a first PDCCH monitoring occasion for the first PO.

In an example embodiment, the first parameters of the first PO may comprise at least one of: a first control resource set for a second PDCCH for monitoring the first PO and one or more first search spaces for the second PDCCH.

In an example embodiment, the second parameters of the second PO may comprise at least one of: a second control resource set for a second PDCCH for monitoring the second PO and one or more second search spaces for the second PDCCH.

In an example embodiment, the first control resource set may be same as the second control resource set. The first control resources set and the second control resource set being same comprises the two control resource sets being with same configuration parameters. The one or more first search spaces may be same as the one or more second search spaces. The one or more first search spaces and the one or more second search spaces being same comprises the two search spaces being with same configuration parameters.

In an example embodiment, the first parameters may indicate that the first PDCCH is transmitted in a first initial bandwidth part (BWP), of a cell, associated with the first wireless device type.

In an example embodiment, the second parameters may indicate that the second PDCCH is transmitted in a second initial BWP, of the cell, associated with the second wireless device type.

In an example, the first initial BWP may be different from the second initial BWP.

In an example, the first initial BWP may be same as the second initial BWP.

In an example embodiment, the wireless device may monitor the first PDCCH (e.g., on the first initial BWP of the cell) with a first RNTI associated with the first PEI (PEI-RNTI) in response to the wireless device being the first wireless device type.

In an example, the first PEI-RNTI may be predefined as a fixed value or may be configured in the RRC message. The first PEI-RNTI may be same as a P-RNTI used for receiving a DCI scheduling a paging message. The first PEI-RNTI may be different from the P-RNTI. P-RNTI may be predefined with different values for different wireless device types (e.g., a RedCap type, a non-RedCap type). P-RNTI may be predefined with a same value for different wireless device types (e.g., a RedCap type, a non-RedCap type).

In an example embodiment, the wireless device may monitor the second PDCCH (e.g., in the second initial BWP of the cell) with a second PEI-RNTI in response to the wireless device being the second wireless device type.

In an example, the second PEI-RNTI may be predefined as a fixed value or may be configured in the RRC message. The second PEI-RNTI may be different from the first PEI-RNTI or may be same as the first PEI-RNTI. The second PEI-RNTI may be same as a P-RNTI used for receiving a DCI scheduling a paging message. The second PEI-RNTI may be different from the P-RNTI.

In an example embodiment, the wireless device, in response to belonging to the first wireless device type, may be configured with a first number of reception antenna. The wireless device, in response to belonging to the second wireless device type, may be configured with a second number of reception antenna, wherein the second number is greater than the first number.

In an example embodiment, the wireless device, in response to belonging to the first wireless device type, may be capable of operating within a first bandwidth. The wireless device, in response to belonging to the second wireless device type, may be capable of operating within a second bandwidth, wherein the second bandwidth is greater than the first bandwidth.

In an example embodiment, the wireless device may monitor the first PO (e.g., on the first initial BWP) in response to receiving the first PEI indicating that the wireless device monitors the first PO. Monitoring the first PO may comprise monitoring a second PDCCH for a DCI with a paging RNTI. The paging RNTI may be different from the first PEI-RNTI or the second PEI-RNTI. The DCI may indicate scheduling information of the paging message.

In an example embodiment, the wireless device may monitor the second PO (e.g., on the second initial BWP) in response to receiving the second PEI indicating that the wireless device monitors the second PO.

In an example embodiment, a base station may transmit a SIB message comprising first parameters of a first PEI associated with a first wireless device type and second parameters of a second PEI associated with a second wireless device type. The base station may transmit, based on the first parameters, the first PEI via a first PDCCH for a first wireless device with the first wireless device type. The base station may transmit, in a first PO, a first DCI to the first wireless device based on the transmitting the first PEI. The base station may transmit, based on the first DCI, a first paging message to the first wireless device. The base station may transmit, based on the second parameters, the second PEI via a second PDCCH for a second wireless device with the second wireless device type. The base station may transmit, in a second PO, a second DCI to the second wireless device based on the transmitting the second PEI. The base station may transmit, based on the second DCI, a second paging message to the second wireless device.

In an example embodiment, a wireless device may receive, from a base station, message comprising parameters of a PO and a plurality of time offsets, each time offset being associated with a respective one of a plurality of wireless device types. Each time offset may indicate a time offset value between a PEI and the PO. The wireless device may monitor the PEI at a first slot occurring at a first time offset before a second slot. The first time offset may be determined, from the plurality of time offsets, based on the wireless device being a first wireless device type of the plurality of wireless device types. The second slot may be determined based on the parameters of the PO. The second slot may be determined based on an identifier of the wireless device. The wireless device may monitor, at the second slot, based on the PEI indicating to monitor the PO, the PO for receiving a downlink control information scheduling the paging message. The wireless device may receive, based on receiving the downlink control information, the paging message.

In an example embodiment, a wireless device may receive message comprising parameters of a PEI and a PO, a first parameter associated with a first wireless device type and indicating to monitor the PO in response to not detecting the PEI, and a second parameter associated with a second wireless device type and indicating to skip monitoring the PO in response to not detecting the PEI. The wireless device may monitor a first PDCCH for receiving the PEI based on the parameters. The wireless device may monitor the PO for receiving a DCI scheduling the paging message based on not detecting the PEI and the wireless device being the first wireless device type. The wireless device may receive, based on receiving the downlink control information, the paging message.

What is claimed is:

1. A wireless device comprising one or more processors and memory storing instructions that, when executed by the one or more processors, cause the wireless device to:
- receive one or more radio resource control (RRC) messages comprising configuration parameters of a cell, wherein the configuration parameters comprise:
  - a first number of physical downlink control channel (PDCCH) monitor occasions (MOs), per synchronization signal block (SSB) of SSBs, in a paging occasion;
  - a parameter indicating a quantity of the SSBs;
  - a first starting location indication of first PDCCH MOs of a paging early indication (PEI) occasion; and
  - a second starting location indication of second PDCCH MOs of the paging occasion;
- receive a PEI based on monitoring a second number of the first PDCCH MOs of the PEI occasion, wherein:
  - the second number of the first PDCCH MOs starts based on the first starting location indication; and
  - the second number is determined based on:
    - the first number; and
    - the quantity of the SSBs; and monitor, in response to the PEI indicating to monitor the paging occasion, a third number of the second PDCCH MOs of the paging occasion, wherein:

the third number of the second PDCCH MOs starts based on the second starting location indication; and the third number is equal to the second number.

2. The wireless device of claim 1, wherein the configuration parameters indicate that the PEI is configured with the wireless device in a radio resource control (RRC) idle state or an RRC inactive state.

3. The wireless device of claim 2, wherein the first number is determined to be used for both: the first PDCCH MOs of the PEI occasion; and the second PDCCH MOs of the paging occasion.

4. The wireless device of claim 3, wherein the second PDCCH MOs, of the paging occasion, and the first PDCCH MOs, of the PEI occasion, are in a same downlink initial bandwidth part (BWP) of the cell comprising a plurality of BWPs.

5. The wireless device of claim 4, wherein the first PDCCH MOs of the PEI occasion are different from the second PDCCH MOs of the paging occasion.

6. The wireless device of claim 5, wherein the wireless device monitors the first PDCCH MOs of the PEI occasion for receiving a downlink control information, comprising the PEI, with a first radio network temporary identifier (RNTI) associated with the PEI, wherein the first RNTI is different from a second RNTI used for monitoring the second PDCCH MOs of the paging occasion.

7. The wireless device of claim 6, wherein the instructions further cause the wireless device to receive a paging message based on receiving, during the monitoring the second PDCCH MOs of the paging occasion, a downlink control information indicating the paging message.

8. The wireless device of claim 1, wherein the cell comprises a plurality of downlink bandwidth parts (BWPs), wherein the plurality of BWPs comprise:

a first initial downlink BWP configured for a reduced capability (Redcap) wireless device type; and a second initial downlink BWP configured not for the Redcap wireless device type.

9. The wireless device of claim 8, wherein the wireless device monitors the first PDCCH MOs and the second PDCCH MOs on the first initial downlink BWP based on the wireless device being the Redcap wireless device type.

10. The wireless device of claim 9, wherein the configuration parameters indicate:

a first search space associated with the first PDCCH MOs; and a second search space associated with the second PDCCH MOs.

11. The wireless device of claim 10, wherein the first search space and the second search space are configured on the first initial downlink BWP based on the wireless device being the Redcap wireless device type.

12. The wireless device of claim 11, wherein the first PDCCH MOs of the PEI occasion are different from the second PDCCH MOs of the paging occasion.

13. The wireless device of claim 12, wherein the wireless device monitors, in the first initial downlink BWP, the first PDCCH MOs of the PEI occasion for receiving a downlink control information, comprising the PEI, with a first RNTI associated with the PEI, wherein the first RNTI is different from a second RNTI used for monitoring the second PDCCH MOs of the paging occasion.

14. The wireless device of claim 13, wherein the instructions further cause the wireless device to receive, in the first initial downlink BWP, a paging message based on receiving, during the monitoring the second PDCCH MOs of the paging occasion, a downlink control information indicating the paging message.

15. The wireless device of claim 8, wherein the wireless device monitors the first PDCCH MOs and the second PDCCH MOs on the second initial downlink BWP based on the wireless device not being the Redcap wireless device type.

16. The wireless device of claim 15, wherein the configuration parameters indicate:

a first search space associated with the first PDCCH MOs; and a second search space associated with the second PDCCH MOs.

17. The wireless device of claim 16, wherein the first search space and the second search space are configured on the second initial downlink BWP based on the wireless device not being the Redcap wireless device type.

18. The wireless device of claim 17, wherein the first PDCCH MOs of the PEI occasion are different from the second PDCCH MOs of the paging occasion.

19. The wireless device of claim 18, wherein the wireless device monitors, in the second initial downlink BWP, the first PDCCH MOs of the PEI occasion for receiving a downlink control information, comprising the PEI, with a first RNTI associated with the PEI, wherein the first RNTI is different from a second RNTI used for monitoring the second PDCCH MOs of the paging occasion.

20. The wireless device of claim 19, wherein the instructions further cause the wireless device to receive, in the second initial downlink BWP, a paging message based on receiving, during the monitoring the second PDCCH MOs of the paging occasion, a downlink control information indicating the paging message.

* * * * *